(12) United States Patent
Yamada

(10) Patent No.: US 6,445,598 B1
(45) Date of Patent: Sep. 3, 2002

(54) DC-DC CONVERTER

(75) Inventor: Tomoyasu Yamada, Niiza (JP)

(73) Assignee: Sanken Electric Co., Ltd. (JP)

( * ) Notice: Subject to any disclaimer, the term of this patent is extended or adjusted under 35 U.S.C. 154(b) by 0 days.

(21) Appl. No.: 09/913,180

(22) PCT Filed: Dec. 8, 2000

(86) PCT No.: PCT/JP00/08705

§ 371 (c)(1),
(2), (4) Date: Aug. 3, 2001

(87) PCT Pub. No.: WO01/43265

PCT Pub. Date: Jun. 14, 2001

(30) Foreign Application Priority Data

Dec. 9, 1999 (JP) .......................................... 11-350065

(51) Int. Cl.⁷ ............................................ H02M 3/335
(52) U.S. Cl. ............................... 363/21.12; 363/21.15; 363/97
(58) Field of Search ................................ 363/20, 21.01, 363/21.12, 21.15, 95, 97

(56) References Cited

U.S. PATENT DOCUMENTS

| | | | |
|---|---|---|---|
| 5,003,451 A | * | 3/1991 | Gradl et al. .................... 363/56 |
| 5,414,611 A | * | 5/1995 | Muto et al. .................... 363/21 |
| 5,719,755 A | | 2/1998 | Usui ............................ 363/19 |
| 5,991,172 A | * | 11/1999 | Jovanovic et al. ............. 363/21 |
| 6,069,802 A | * | 5/2000 | Priegnitz ..................... 363/21 |
| 6,088,243 A | * | 7/2000 | Shin ........................... 363/21 |
| 6,122,180 A | * | 9/2000 | Seo et al. ..................... 363/21 |
| 6,272,024 B2 | * | 8/2001 | Uchida ...................... 363/21.12 |
| 6,304,473 B1 | * | 10/2001 | Telfus et al. .................. 363/97 |

FOREIGN PATENT DOCUMENTS

| | | |
|---|---|---|
| JP | 04000262 A | 1/1992 |
| JP | 08289543 A | 11/1996 |
| JP | 09084343 A | 3/1997 |
| JP | 10150769 A | 6/1998 |

* cited by examiner

Primary Examiner—Adolf Deneke Berhane
(74) Attorney, Agent, or Firm—Woodcock Washburn LLP

(57) ABSTRACT

A serial circuit of the primary winding (21) of a transformer (2), a switching device (3) and a current-detecting resistor (4) is connected between a pair of dc terminals (18, 19). A smoothing capacitor (7) is connected to the secondary winding (22) of the transformer (2) via a diode (6). A resonance capacitor (5) is connected in parallel with the serial circuit of the switching device (3) and the current-detecting resistor (4). The current detection signal, the output voltage detection signal, and the switch voltage detection signal are combined to provide control pulses for the switching device (3). A control circuit (13) includes a minimum non-conducting period determination circuit for setting a first and a second minimum nonconducting period with hysteresis. The nonconducting periods of the switching device are placed under the limitation of the minimum nonconducting periods when the load is light. The zero-voltage switching of the switching device (3) is effected upon lapse of the minimum non-conducting periods and upon completion of the release of the stored energy from the transformer (2).

27 Claims, 31 Drawing Sheets

DC-DC CONVERTER

TECHNICAL FIELD

This invention relates to a dc-to-dc converter capable of adaptation to variations in load or input voltage.

BACKGROUND ART

As disclosed for example in the U.S. Pat. No. 5,719,755, a typical prior art comprises a direct-current power supply, a transformer having a primary, a secondary and a tertiary winding, a switching device, a rectifying and smoothing circuit, and a control circuit. Connected across the dc power supply via the transformer primary, the switching device is turned on and off under the direction of the control circuit.

The rectifying and smoothing circuit may be either of two different types. The first type comprises a rectifying diode and a capacitor. The rectifying diode is so connected to the transformer as to be reverse-biased by a voltage induced in the transformer secondary during the conducting periods of the switching device connected to the transformer primary, and forward-biased by a voltage inducted in the transformer secondary during the nonconducting periods of the switching device. The output voltage of the rectifying diode is smoothed by the capacitor.

The second type of rectifying and smoothing circuit has a rectifying diode that is so connected to the transformer secondary as to be forward-biased by the voltage induced in the transformer secondary during the conducting periods of the switching device. The output of this rectifying diode is connected to a choke coil, thence to a smoothing capacitor, and a diode is provided to form a closed circuit in combination with the choke coil and the smoothing capacitor.

The voltage regulator with the first type of rectifying and smoothing capacitor is commonly referred to as the flyback or reverse switching regulator, and that with the second type as the forward switching regulator.

There are strong demands for dc-to-dc converters of higher operating efficiency. Improving the efficiency of dc-to-dc converter depends to a large measure upon reduction of the power loss of the switching device. To this end the U.S. Patent cited above employs what is termed a quasiresonant capacitor, which is connected in parallel with the switching device. Connected in parallel with the switching device, the capacitor is gradually charged while the switching device is off, causing a gradual rise in the voltage across the capacitor and across the switching device. With use of a bipolar transistor or a field-effect transistor as the switching device, current will continue flowing therethrough after it is turned off, due to the carrier storage of the semiconductor. With the provision of the resonant capacitor as above, however, the voltage across the switching de vice does not rise too sharply after it is turned off. The result is the reduction of the switching loss, or of the loss of power equivalent to the product of the current through, and the voltage across, the switching device. Also reduced is the voltage surge or the noise when the switching device is turned off.

Preparatory to causing conduction through the switching devices the voltage across the same is gradually reduced by the resonance of the inductance of the transformer primary and the capacitance of the capacitor connected in parallel with the switching device. The switching device is turned on when that voltage is reduced to zero or thereabouts. Thus is accomplished the zero-voltage switching of the switching device, with consequent reduction of the switching loss.

In such a quasiresonant switching regulator, incorporating means for holding the output voltage constant, variations in the voltage requirement of the load manifest themselves as changes in the on-off rate (herein-after referred to as the switching frequency) of the switching device. A drop in the voltage requirement of the load, for instance, results in an increase in switching frequency. A higher switching frequency means that the switching device is actuated a greater number of times per unit length of time. Since the switching device causes a loss each time it is actuated, a loss per unit length of time also increases as the switching device is actuated oftener per unit length of time. Consequently, despite use of the quasiresonant capacitor, the efficiency of the noted prior art switching regulator did not necessarily improve.

It has been known to set a limit upon the switching frequency during operation under a light load, as taught for instance by Japanese Unexamined Patent Publication No. 8-289543. This objective has so far been attained by compulsorily imposing a lower limit on the nonconducting periods of the switching device. The actual nonconducting periods of the switching device are not permitted to fall short of the mandatory minimal nonconducting period thus imposed.

In a dc-to-dc converter with the predetermined minimum required nonconducting period, in the event of a substantive drop in the voltage requirement of the load, the switching device is not immediately turned on, but upon lapse of the predetermined minimum nonconducting period, upon completion of the production of the flyback voltage due to the release of the energy that has been stored on the transformer during the preceding conducting period of the switching device. With the completion of the production of the flyback voltage during the minimum nonconducting period, so-called ringing will occur due to the inductance of the transformer winding and the parasitic capacitance or resonant capacitance of the switching device. The switching device is turned on in the course of this ringing. The voltage across the switching device may be high due to the ringing at the end of the minimum nonconducting period, so that the switching device is turned on when the voltage across the same grows sufficiently low after the expiration of the minimum nonconducting period. This known method of controlling the switching device succeeded in material curtailment of the switcing loss.

It has later proved, however, with the fixed minimum nonconducting period, as has been the case heretofore, the switching frequency has tended to become unstable in the event of fluctuations in the input voltage or in the voltage requirement of the load. Let us consider the case in which the voltage requirement of the load changes from a first, relatively heavy state, such that the flyback voltage is generated longer than the minimum nonconducting period, to a second, relatively light state in which the flyback voltage is generated shorter than the minimum nonconducting period. The instability of the switching frequency has occurred just when the duration of the flyback voltage becomes less than the minimum non-conducting period.

The foregoing discussion of instability in switching frequency will be better understood from a consideration of FIGS. 6 and 7. The indicia $V_1$ in these figures denotes the voltage across the switching device, the voltage being due to the transformer flyback voltage and ringing voltage. The indicia $T_1$, at $V_{13}$ in FIG. 6 denotes the predetermined minimum non-conducting period.

Under a relatively heavy load, as represented by FIG. 6, the duration $T_0$ of the flyback voltage is longer than the minimum nonconducting period $T_1$. The switching device will then be turned on immediately upon expiration of the flyback voltage, resulting in the continuation of the known self-excited oscillation. Then, with a gradual lessening of the load, the conducting periods $T_{on}$ of the switching device will grow less, and so will the durations $T_0$ of the flyback voltage, until at last the flyback voltage duration becomes shorter than the minimum nonconducting period $T_1$.

As will be understood from FIG. 7, the swticing device will be inhibited from turning on at the end of the duration $T_0$ of the flyback voltage when the flyback voltage duration becomes less than the minimum nonconducting period $T_1$, as above. The switching device will be turned on when the voltage across the same becomes approximately zero after the end of the minimum nonconducting period $T_1$. The nonconducting period of the switching device will increase if the device is held turned off until the voltage across the same becomes approximately zero, instead of until the end of the minimum nonconducting period. The result will be a drop in the output voltage.

The dc-to-dc converter under consideration is usually equipped to keep its output voltage constant. Therefore, in order to compensate for the voltage drop, the conducting period of the switching device will become longer. The duration $T_0$ of the flyback voltage will grow longer in proportion with the conducting period of the switching device, until the flyback voltage duration exceeds the minimum conducting period again. The nonconducting period of the switching device will then be not limited to the minimum nonconducting period $T_1$. With the longer conducting period, however, the resulting rise in output voltage will cause a decrease again in the conducting period, until the flyback voltage duration $T_0$ again becomes less than the minimum nonconducting period $T_1$. Then the nonconducting period will again be under the limitation of the minimum non-conducting period $T_1$.

With the nonconducting periods of the switching device limited as above according to the prior art, the conducting and nonconducting periods of the switching device changed cyclically, resulting in instability in switching frequency. The switching frequency instability resulted in turn in variation in the frequency of the noise generated by the switching device. The variable frequency noise was difficult of suppression. The switching frequency instability also caused noise production by the transformer due to magnetostriction, and instability in the on-off control of the switching device.

In view of the foregoing state of the above, the present invention has it as an object to provide a dc-to-dc converter that is improved in the efficiency of operation under a light load, in stability of operation, and in noise production.

DISCLOSURE OF INVENTION

The present invention will be briefly explained using the reference characters seen in the attached drawings showing the embodiments of the invention. The reference characters, however, are meant purely for a better understanding of the invention and should not be taken in a limitative sense.

The dc-to-dc converter according to the invention, for delivering direct-current power to a load 26, comprises a dc power supply 1 for providing a unidirectional voltage, a switching device 3 connected between the terminals 18 and 19 of the power supply 1 and having a first and a second main terminal and a control terminal, inductance means 2 or 2a connected in series with the switching device and adapted to store energy during the conducting periods of the switching device and to release the energy during the nonconducting periods of the switching device, a rectifying and smoothing circuit 6 connected to the inductance means, output voltage detector means 8 and 10 for detecting a signal indicative of the output voltage of the rectifying and smoothing circuit, switch voltage detector means 11 or 11a or 11b for providing a signal indicative of a voltage between the first and the second main terminal of the switching device, and switch control means 13.

The switch control means 13 is connected to the output voltage detector means 8 and 10 and the switch voltage detector means 11 or 11a or 11b and the switching device 3 for producing a switch control signal for on-off control of the switching device 3 and for applying the switch control signal to the control terminal of the switching device. The switch control means 13 performs the functions of:

1. Determining the conducting periods $T_{on}$, of the switching device 3 so as to keep constant the output voltage in response to the output of the output voltage detector means 8 and 10.

2. Forming a signal indicative of a first minimum nonconducting period $T_1$, to which the nonconducting periods $T_{off}$ of the switching device are to be limited.

3. Forming a signal indicative of a second minimum nonconducting period $T_2$ longer than the first minimum nonconducting period $T_1$.

4. Selectively providing the first and the second minimum nonconducting period signals.

5. Detecting the duration $T_0$ of the flyback voltage from the inductance means 2 or 2a.

6. Judging whether the flyback voltage duration $T_0$ is shorter than the first minimum nonconducting period $T_1$ or not.

7. Judging whether the flyback voltage duration $T_0$ is longer than the second minimum nonconducting period $T_2$ or not.

8. Limiting the nonconducting periods $T_{off}$ of the switching device 3 under the second minimum nonconducting period $T_2$ when the flyback voltage duration $T_0$ proves to be shorter than the first minimum nonconducting period $T_1$.

9. Limiting the nonconducting periods $T_{off}$ of the switching device 3 under the first minimum nonconducting period $T_1$ when the flyback voltage duration $T_0$ proves to be longer than the second minimum nonconducting period $T_2$.

10. Terminating the nonconducting periods $T_{off}$ of the switching device 3 when the signal indicative of the voltage of the switching device, obtained by the switch voltage detector means 11 or 11a or 11b upon termination of the first $T_1$ or second $T_2$ minimum nonconducting period, grows equal to or less than a predetermined reference value $Vr_1$ or $Vr_2'$.

As indicated in claim 2, the switch control means 13 preferably comprises switch control signal forming means 46, 46a, 47, 50 or 50a, a minimum nonconducting period signal generator circuit 73, 120 or 120', flyback voltage duration detector means 101 or 130, and judgment means 102 or 133. The switch control signal forming means 46, 46a, 47, 50 or 50a is connected to the output voltage detector means 8 or 10 and the switch voltage detector means 11, 11a or 11b in order to form the switch control signal for on-off control of the switching device 3. The functions of the switch control signal forming means 46, 46a, 47, 50 or 50a include:

1. Determining the conducting periods $T_{on}$ of the switching device 3 so as to keep the output voltage constant in response to the output from the output voltage detector means 8 and 10.

2. Terminating the nonconducting periods $T_{off}$ of the switching device 3 when the signal indicative of the voltage across the switching device, obtained from the switch voltage detector means 11, 11a or 11b, grows equal to or less than the predetermined reference value $Vr_1$ or $VR_2'$.

The minimum nonconducting period signal generator circuit 73, 120 or 120' selectively puts out a signal indicative of the first minimum nonconducting period $T_i$, and a signal indicative of the second minimum nonconducting period $T_2$, which is longer than the first period $T_1$, for limiting the nonconducting periods $T_{off}$ of the switching device 3. These first and second minimum nonconducting period signals are delivered to the switch control signal forming means.

The flyback voltage duration detector means 101 or 130 detects the duration To of the flyback voltage due to the inductance means 2 or 2a.

The judgment means 102 or 133 is connected to the minimum nonconducting period signal generator circuit and the flyback voltage detector means. The functions of the judgment means 102 or 133 include:

1. Ascertaining whether the flyback voltage duration $T_0$, detected by the flyback voltage duration detector means 101 or 130 is shorter than the first minimum nonconducting period $T_1$ or not.

2. Ascertaining whether the flyback voltage duration $T_0$ is longer than the second minimum nonconducting period $T_2$ or not.

3. Causing the minimum nonconducting period signal generator circuit 73, 120 or 120' to deliver the signal indicative of the second minimum nonconducting period $T_2$ to the switch control signal forming means when the flyback voltage duration $T_0$ proves to be shorter than the first minimum nonconducting period $T_1$.

4. Causing the minimum nonconducting period signal generator circuit 73 or 120 to deliver the signal indicative of the first minimum nonconducting period $T_1$ to the switch control signal forming means when the flyback voltage duration $T_0$ proves to be longer than the second minimum nonconducting period $T_2$.

As set forth in claim 3, the time difference Ta between the first minimum nonconducting period $T_1$ and the second minimum nonconducting period $T_2$ is preferably from 0.1 to 10 microseconds.

As set forth in claim 4, a resonant capacitor should preferably be provided.

As set forth in claim 5, means 12 should preferably be provided for combining the output from the current detector means 4, the output from the output voltage detector means 8, and the output from the switch voltage detector means 11 or 11a. The resulting output from the combining means may be fed into the first and the second comparison means 46 and 47. The switch control means will then be more effectively integrated and reduced in cost.

As set forth in claim 6, initialization signal generator means 51 should preferably be provided. Also, the minimum nonconducting period signal generator circuit 77 should preferably comprise a sawtooth voltage generator circuit 72, a source 91 of a reference voltage for determination of the minimum nonconducting periods, a comparator 92 for minimum nonconducting period determination, and a nonconducting period pulse forming circuit 95.

As set forth in claim 7. the control pulse forming circuit 50, 50a or 50b should preferably comprise a first circuit 71, 71a or 71b and a second circuit 96.

As set forth in claim 8, the first circuit 71, 71a or 71b should preferably comprise a wave-shaping circuit 77 and a flip-flip 78.

As set forth in claims 9 and 10, the first circuit 71 or 71a for termination of the nonconducting periods should preferably comprise two flip-flops.

As set forth in claim 11, the second circuit 98 should preferably take the form of a NOR gate 96a.

As set forth in claim 12, the minimum nonconducting period pulse forming circuit 95 should preferably comprise an AND gate 97 and a flip-flop 100.

As set forth in claim 13, the flyback voltage duration detector means 101 should preferably be connected to the first circuit 71 and the second circuit 96.

As set forth in claim 14, the reference voltage source 91 for determination of the minimum nonconducting period should preferably take the form of a voltage-dividing circuit.

As set forth in claim 15, the output from the switch voltage detector means 11 may not be input to the combining means 12a for output voltage control.

As set forth in claim 16, a sawtooth voltage V4a may be formed from the output voltage detection signal, and this sawtooth voltage utilized for determination of the moment for terminating the nonconducting periods.

As set forth in claim 17, the inductance means should preferably take the form of a transformer having a primary, a secondary and a tertiary winding 21, 22 and 23.

As set forth in claim 18, the switch voltage detector means 11 may be connected in parallel with the switching device 3.

As set forth in claim 19, the output voltage detector means may be connected to the tertiary winding 23.

As set forth in claim 20, the switch voltage detector means 11 may include a delay capacitor 34.

As set forth in claim 21, the switch voltage detector means 11 may comprise a diode 31 and a resistor 33.

As set forth in claim 22, the inductance means may take the form of a reactor 2a, and the output smoothing capacitor 7 connected in parallel with its winding 21 via a diode 6.

As set forth in claim 23, a maximum nonconducting period may be predetermined.

As set forth in claim 24, the output of the switch voltage detector means 11, 11a or 11b may be connected to a switch, by which control by the output from the switch voltage detector means may be suspended.

As set forth in claim 25, two minimum nonconducting period signal generators 121 and 122 may be provided.

As set forth in claim 26, the flyback voltage duration detector circuit 130 may be connected directly to the inductance means.

As set forth in claim 27, the judgment means may take the form of a phase comparator 133.

The invention as claimed gains the following advantages:

1. With the minimum nonconducting periods $T_1$ or $T_2$ set up, any great decrease in the nonconducting periods $T_{off}$ of the switching device can be prevented when the load is light. An increase in switching loss per unit length of time is thus restricted, contributing to the higher efficiency of operation under light load.

2. The second minimum nonconducting period $T_2$ will be set up when the duration $T_0$ of the flyback voltage falls short of the first minimum nonconducting period $T_1$ by reason of a drop of the load. Stable switching operation will continue in the face of fluctuations in the load or input voltage as the nonconducting periods of the switching device 3 are fixed at the second minimum nonconducting period $T_2$.

3. The first minimum nonconducting period $T_1$ will be set up when the duration $T_0$ of the flyback voltage exceeds the second minimum nonconducting period $T_2$ because of a rise of the load. In this case, too, stable switching operation will continue as the nonconducting periods of the switching device are fixed at the first minimum nonconducting period $T_1$.

4. In short a smooth transition is accomplished from a first switching state in which the switching device is turned on and off without the limitation of the first minimum nonconducting period because of a relatively great load, to a second switching state in which the switching device is turned on and off under the limitation of the second minimum nonconducting period $T_2$ because of a relatively small load, or vice versa. The switching between the two minimum nonconducting periods $T_1$ and $T_2$ according to the instant invention may be likened to the hysteresis operation of a comparator or Schmidt trigger circuit with a known hysteresis characteristic. With such a smooth transition between the two switching states, not only is the switching frequency stabilized, but also the production of unpredictable frequency noise is precluded, and so is the production of audible noise due to magnetostriction from the inductance means.

The setting of the time difference between the first $T_1$ and the second $T_2$ minimum nonconducting period as in claim 3 will surely provide the desired hysteresis effect.

The provision of the resonant capacitance 5 as in claim 4 will stably lead to resonance, and the zero-voltage turning-off of the switching device 3 will be favorably accomplished, realizing a decrease in switching loss.

The formation of the composite signal as in claim 5 will enable transmission of a plurality of pieces of information through common conductors and terminals, making it easier to integrate the switch control signal forming means.

According to the inventions of claims 6–12, the switch control signal will be formed by simple circuit means.

According to the inventions of claims 13 and 14, the hysteresis operation can be readily effected.

According to the inventions of claims 15 and 16, the control of the output voltage and the detection of the end of each nonconducting period can be implemented independently, so that the required circuitry will be easier of designing.

According to the invention of claim 17, the switching device side and the load side will be more easily separated electrically.

According to the invention of claim 18, the voltage across the switching device will be accurately detected.

According to the invention of claim 19, the output voltage will be easily detected.

According to the inventions of claims 20 and 21, the switch voltage will be easily detected.

According to the invention of claim 22, a high output voltage will be easily obtained by virtue of the reactor.

According to the invention of claim 23, the dc-to-dc converter will be stably started up by virtue of the maximum nonconducting period.

According to the invention of claim 24, the dc-to-dc converter will operate stably when the voltage requirement of the load is very low, as in standby mode, as then the switch control signal is formed which has the maximum nonconducting period.

According to the inventions of claims 2 and 26, the required circuitry will be easier of designing.

BEST MODE FOR CARRYING OUT THE INVENTION

First Preferred Form

Figure 1:
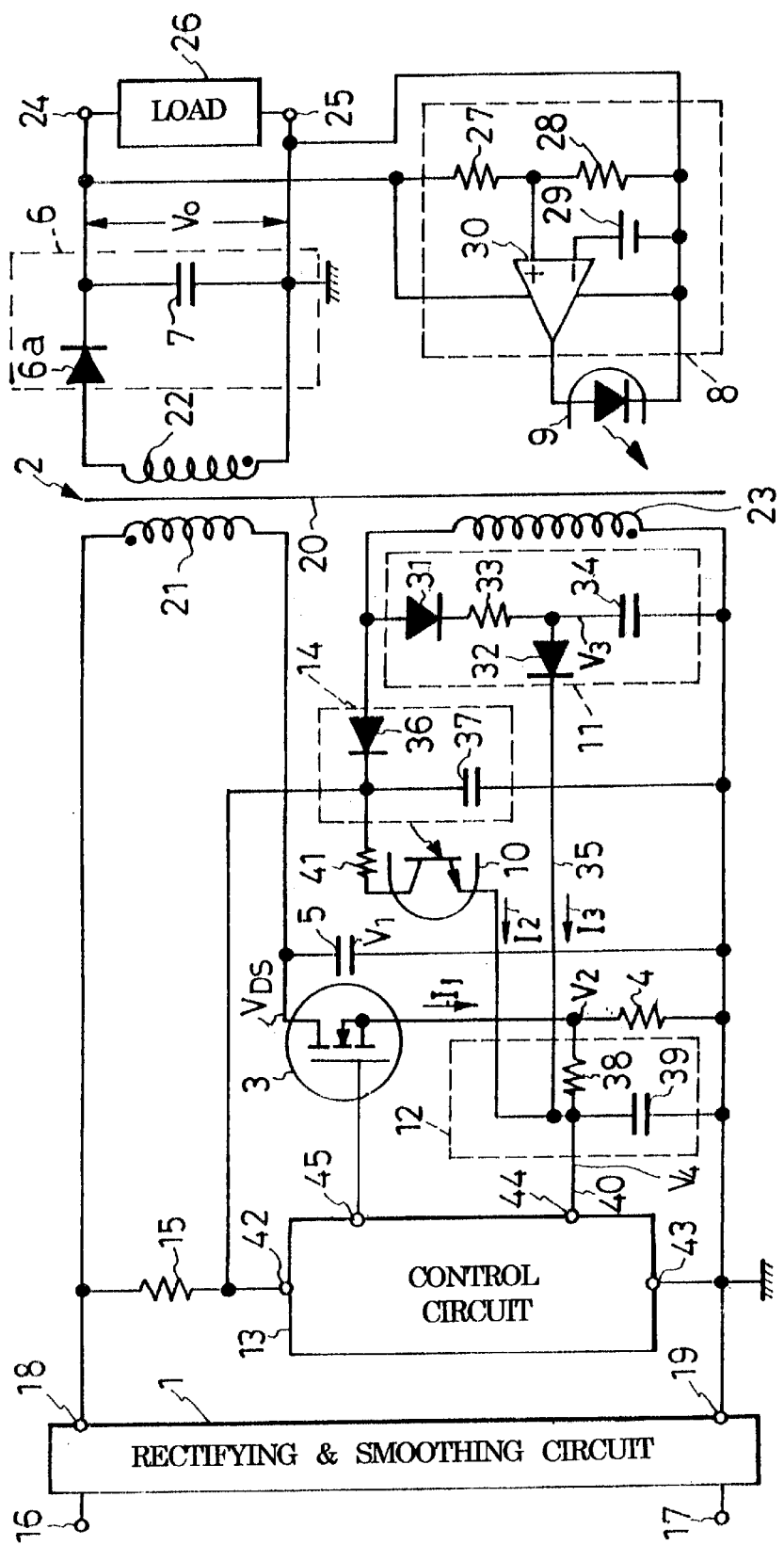
FIG. 1 is a circuit diagram of a first preferred form of dc-to-dc converter according to the invention.

A first preferred form of dc-to-dc converter according to the invention will now be described with reference to FIGS. 1–9. Commonly known as the flyback switching regulator, the first preferred form of dc-to-dc converter shown in FIG. 1 comprises a rectifying and smoothing circuit 1 as a direct-current power supply, a transformer 2 as inductance means, a switching device 3 in the form of an N-channel insulated-gate field-effect transistor, a resistor 4 as current detector means, a resonant capacitor 5, an output rectifying and smoothing circuit 6 comprising an output rectifying diode 6a and an output smoothing capacitor 7, an output voltage detector circuit 8, a light-emitting diode 9, a phototransistor 10, a switch voltage detector circuit 11 as switch voltage detector means, a summing circuit 12, a switch control circuit 13 as switch control means, a rectifying and smoothing circuit 14 as a control power supply, and a startup resistor 15.

The rectifying and smoothing circuit 1 has a pair of ac input terminals 16 and 17 for connection to a commercial ac power supply, and a pair of dc output terminals 18 and 19 for providing unstabilized or nonconstant dc voltage. The rectifying and smoothing circuit may be replaced by a battery.

The transformer 2 comprises a magnetic core 2, a primary winding 21, a secondary winding 22, and a tertiary winding 23, all the windings being wound on the core. The three transformer windings 21, 22 and 23 are electromagnetically coupled together and possess the polarities indicated by the dots in FIG. 1. The transformer primary 21 has inductance. As is well known, the transformer 2 stores energy during the conducting periods of the switching device 3 and releases the energy during its nonconducting periods.

The switching device 3 has a drain as a first main terminal, a source as a second main terminal, and a gate as a control terminal. The drain is connected to the first dc terminal 18 via the transformer primary 21, the source to the grounded second dc terminal 19 via the current-detecting resistor 4, and the gate to the control circuit 13.

Designed for reduction of switching loss and noise, the resonant capacitor 5 is connected in parallel with the switching device 3 via the current-detecting resistor 4. This resonant capacitor functions to cause a gradual rise of the drain-source voltage $V_{DS}$ of the switching device 3 when the latter is turned off, and to make the drain-source voltage zero by resonance immediately before it is turned on. The electrostatic capacitance of the resonant capacitor 5 is therefore materially less than that of a smoothing capacitor, not shown, that is customarily included in the rectifying and smoothing circuit 1, or that of the output smoothing capacitor 7. The purposes of the resonant capacitor 5, however, could be served by the stray capacitance between the drain and source of the switching device 3.

To the transformer secondary 22 is connected the output rectifying and smoothing circuit 6 comprising a diode 6a and a capacitor 7. The output rectifying diode 6a is connected in parallel with a line between the transformer secondary 22 and the output smoothing capacitor 7. The output rectifying diode 6a is so polarized as to be reverse biased by a voltage induced in the transformer secondary 22 when the switching device 3 is on, and forward biased by a voltage induced in the transformer secondary when the switching device is off.

As disclosed in U.S. Pat. No. 5,719,755, supra, an FET or like switch could be connected in parallel with the output rectifying diode 6a. The output smoothing capacitor 7 is connected in parallel with the transformer secondary 22 via the output rectifying diode 6a. The smoothing capacitor 7 is connected to the pair of converter output terminals 24 and 25, between which is shown connected a load 26.

The output voltage detector circuit 8 is connected between the converter output terminals 24 and 25, or across the smoothing capacitor 7, in order to keep constant the output voltage $V_O$ between the converter output terminals 24 and 25. The output voltage detector circuit 8 comprises two resistors 27 and 28, a reference voltage source 29 such as a constant voltage diode, and a differential amplifier 30. The two output voltage detecting resistors 27 and 28 are connected in series with each other and between the pair of output terminals 27 and 28. The differential amplifier 30 has a positive input connected to the junction between the output voltage detecting resistors 27 and 28, and a negative input connected to the reference voltage source 29.

The light-emitting diode 9 is connected between the output of the differential amplifier 30 and the grounded converter output terminal 25. Thus, as the differential amplifier 30 puts out a voltage indicative of a difference between the voltage detected at the junction between the resistors 27 and 28 and the reference voltage from the source 29, the light-emitting diode 29 will emit light with an intensity proportional to the differential amplifier output voltage. Notwithstanding the showing of FIG. 1, the positive input of the differential amplifier 30 could be connected to the reference voltage source 29, its negative input to the junction between the resistors 27 and 28, and the light-emitting diode 9 between the output of the differential amplifier and the converter output terminal 24.

Optically coupled to the light-emitting diode 9, the phototransistor 10 changes in resistance in inverse proportion to the optical output of the light-emitting diode. The current $I_2$ flowing through the phototransistor 10 is therefore proportional to the output voltage $V_O$ between the pair of output terminals 24 and 25. The output voltage detector means for voltage feedback control is comprised of the output voltage detector circuit 8, the light-emitting diode 9, and the phototransistor 10. The output voltage detector means could be termed a voltage feedback control signal forming circuit.

The switch voltage detector circuit 11 comprises a first 31 and a second 32 diode, a resistor 3, and a delay capacitor 34.

The delay capacitor 34 is connected on one hand to one extremity of the transformer tertiary 23 via the first diode 31 and the diode 33, and, on the other hand, directly to the other extremity of the transformer tertiary 23. This transformer tertiary is electromagnetically coupled to the transformer primary 21, which is connected in parallel with the switching device 3 via the rectifying and smoothing circuit 1, so that there is obtained across the transformer tertiary 23 a voltage proportional to the voltage $V_{DS}$ across the switching device 3 and the voltage $V_1$ across the resonant capacitor 5. Being approximately equal to the drain-source voltage $V_{DS}$ of the switching device 3, the voltage $V_1$ across the capacitor 5 may be referred to as the voltage across the switching device hereinafter in this specification.

The delay capacitor 34 of the switch voltage detector circuit 11 has extremely low electrostatic capacitance compared to that of the output smoothing capacitor 7. Additionally, the diode 31 is so oriented as to be conductive during the nonconducting periods of the switching device 3. For these reasons, as will be understood from a consideration of FIGS. 6 and 7, the waveform of the output from the switch voltage detector circuit 11, or the voltage $V_3$ across the delay capacitor 34, is analogous with that of the voltage $V_1$ across the resonant capacitor 5 during the nonconducting periods of the switching device 3. The voltage across the transformer tertiary 23 and the voltage $V_3$ across the delay capacitor 34 contain the information of the voltage $V_{DS}$ of the switching device 3, so that the voltage across the delay capacitor 34 may be regarded as that across the switching device.

The second diode 32 of the switch voltage detector circuit 11 is connected to the delay capacitor 34 and so oriented as to conduct simultaneously with the first diode 31. The cathode of the second diode 32 is connected by way of a conductor 35 to the summing circuit 12, so that current $I_3$ will flow from the switch voltage detector circuit 11 to the summing circuit 12.

Intended for use as a power supply for control purposes, the rectifying and smoothing circuit 14 comprises a diode 36 and a capacitor 37. The diode 36 is so oriented as to conduct in response to the voltage across the transformer tertiary 23 during the nonconducting periods of the switching device 3. The capacitor 37 is connected in parallel with the transformer tertiary 23 via the diode 36, so that this capacitor is charged in response to the voltage developing across the transformer tertiary while energy is being released from the transformer 2 during the nonconducting periods of the switching device 3. Furthermore, being connected to the first dc supply terminal 18 via the startup resistor 15, the capacitor 37 is charged from the output voltage of the rectifying and smoothing circuit 1 when this dc-to-dc converter is set into operation.

The summing circuit 12 comprises a resistor 38 and a capacitor 39. The resistor 38 is connected between the output conductor 40 of the summing circuit 12 and the current detector resistor 4. The capacitor 39 is connected between the output conductor 40 and the ground. The phototransistor 10 for voltage feedback control is connected via a current limiting resistor 41 between the rectifying and smoothing circuit 14 and the output extremity of the resistor 38. The output conductor 35 of the switch voltage detector circuit 11 is connected to the output extremity of the resistor 38. There is therefore obtained on the output conductor 40 of the summing circuit 12 a sum signal $V_4$ which represents an addition, at an appropriate ratio, of the voltage $V_2$ across the current detecting resistor 4, the voltage $V_3$ of the switch voltage detector circuit 11, and the voltage of the output voltage detector circuit 8.

The switch control circuit 13 for on-off control of the switching device 3 may take the form of a monolithic integrated circuit having four terminals 42, 43, 44 and 45. The first terminal 42 is a supply terminal connected to the smoothing circuit 14. The second terminal 43 is grounded, being connected to the ground terminal 19 of the rectifying and smoothing circuit 4. The third terminal 44 is connected to the output conductor 40 of the summing circuit 12. The fourth terminal 45 is connected to the control terminal, or gate, of the switching device 3.

The switch control circuit 13 possesses the functions of:

1. Determining the conducting periods $T_{on}$ of the switching device 3 in response to the output from the output voltage detector means 8 and 10 so as to keep the output voltage constant.

2. Forming a signal indicative of a first minimum nonconducting period $T_1$ for limiting the nonconducting periods $T_{off}$ of the switching device 3.

3. Forming a signal indicative of a second minimum nonconducting period $T_2$ which is longer than the first minimum nonconducting period $T_1$.

4. Selectively putting out the first and the second minimum nonconducting period signals.

5. Detecting the duration $T_0$ of the flyback voltage from the inductance means 2.

6. Judging whether the flyback voltage duration $T_0$ is shorter than the first minimum nonconducting period $T_1$ or not.

7. Judging whether the flyback voltage duration $T_0$ is longer than the second minimum nonconducting period $T_2$ or not.

8. Limiting the nonconducting periods $T_{off}$ of the switching device 3 under the second minimum nonconducting period $T_2$ when the flyback voltage duration $T_0$ proves to be shorter than the first minimum nonconducting period $T_1$.

9. Limiting the nonconducting periods $T_{off}$ of the switching device 3 under the first minimum nonconducting period $T_1$ when the flyback voltage duration $T_0$ proves to be longer than the second minimum nonconducting period $T_2$.

10. Terminating the nonconducting periods $T_{off}$ of the switching device 3 when the signal indicative of the voltage across the switching device, obtained by the switch voltage detector means 11 upon termination of the first $T_1$ or second $T_2$ minimum nonconducting period, grows equal to or less than a predetermined reference value $Vr_1$.

Figure 2:
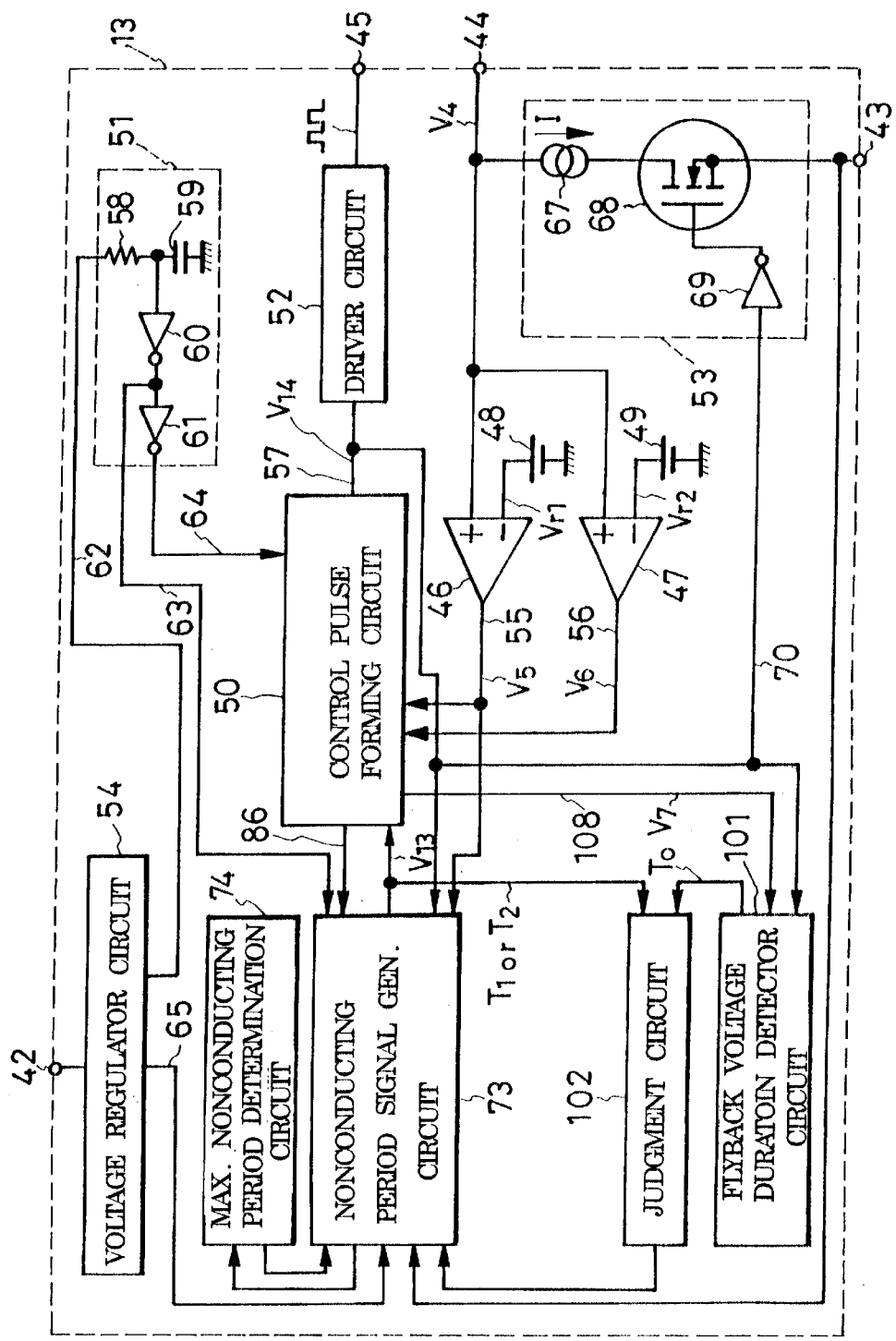
FIG. 2 is a circuit diagram showing in more detail the control circuit of the dc-to-dc converter of FIG. 1.

As illustrated in detail in FIG. 2, the switch control circuit 13 broadly comprises the following components for the fulfillment of the foregoing ten functions: two comparators 46 and 47, two reference voltage sources 48 and 49, a control pulse forming circuit 50, an initialization signal generator circuit 51, a driver circuit 52, an impedance change circuit 53, a voltage regulator circuit 54, a nonconducting period signal generator circuit 73, a maximum nonconducting period determination circuit 74, a flyback voltage duration detector circuit 101, and a judgment circuit 102.

Those components of the dc-to-dc converter of FIGS. 1 and 2 which take active roll for on-off control of the switch 3 will be referred to in combination as a switch control signal forming circuit. The switch control signal forming circuit comprises the comparators 48 and 49 and control pulse forming circuit 50 of the FIG. 2 control circuit 13, and the current detecting resistor 4 and summing circuit 12 of FIG. 1.

Referring more specifically to FIG. 2, the first comparator 46 of the switch control circuit 13 has a positive input connected to the third terminal 44 of the switch control circuit for inputting the sum signal $V_4$, a negative input connected to the first reference voltage source 48, and an output connected by way of a conductor 55 to the control pulse forming circuit 50 and the nonconducting period signal generator circuit 73. The first reference voltage source 48 generates a first reference voltage $V_{r1}$ corresponding to the peak of the current $I_1$ shown in FIGS. 6 and 7. Therefore, comparing this first reference voltage $V_{r1}$ and the sum signal $V_4$, the first comparator 46 provides an output $V_5$ of FIGS. 6 and 7. This output $V_5$ includes pulses that are high when the sum signal $V_4$ is higher than the first reference voltage $V_{r1}$. The first comparator 46 functions primarily to determine the conducting periods $T_{on}$ of the switching device 3.

The second comparator 47 of the switch control circuit 13 has a positive input connected to the terminal 44 for inputting the sum signal $V_4$, a negative input connected to the second reference voltage source 49, and an output connected by way of a conductor 56 to the control pulse forming circuit 50. The second reference voltage $V_{r2}$ from the source 49 is intermediate the first reference voltage $V_{r1}$ and the value of the sum signal $V_4$ at a moment, indicated at $t_5$ in FIG. 6 and at $t_4$ in FIG. 7, that is immediately before the moment of completion of energy release from the transformer 2. As indicated also in FIGS. 6 and 7, the resulting output $V_6$ from the second comparator 47 includes pulses that are high when the sum signal $V_4$ is higher than the second reference voltage $V_{r2}$.

The control pulse forming circuit 50 of the switch control circuit 13 creates switch control pulses in response to the outputs $V_5$ and $V_6$ from the first and the second comparators 46 and 47, for delivery to the driver circuit 52 by way of a conductor 57. The control pulse forming circuit 50 will be detailed later. The driver circuit 52 amplifies the incoming switch control pulses preparatory to delivery to the control terminal (gate) of the switching device 3 via the terminal 45.

For initializing or resetting the control pulse forming circuit 50, the initialization signal generator circuit 51 of the switch control circuit 13 comprises a resistor 58, a capacitor 59, and two inverter or NOT circuits 60 and 61. The resistor 58 has one extremity thereof connected to the voltage regulator circuit 54 by way of a conductor 62, and the other extremity grounded via the capacitor 59. The first NOT circuit 60 is connected to the junction between resistor 58 and capacitor 59. The second NOT circuit 61 is connected to the first NOT circuit 60. The first NOT circuit 60 is connected by way of a conductor 63 to the nonconducting period signal generator circuit 73 for sending a first reset signal or initialization signal thereto. The second NOT circuit 61 is connected by way of a conductor 64 to the control pulse forming circuit 50 for sending a second reset signal or initialization signal thereto.

When the output voltage of the voltage regulator circuit upon application of a supply voltage to the supply terminal 42, FIG. 2, of the switch control circuit 13, the capacitor 59 of the initialization signal generator circuit 51 will be charged with some delay. The first NOT circuit 60 will be high or in a state of logical one until the voltage of the capacitor 59 reaches the threshold of the first NOT circuit, whereas the second NOT circuit 61 will be low or in a state of logical zero. After the capacitor 59 has been charged sufficiently, the first NOT circuit 60 will stay low, and the second NOT circuit 61 high.

Connected to the supply terminal 42, the voltage regulator circuit 54 is designed to supply a stable dc voltage to the nonconducting period signal generator circuit 73 by way of a conductor 65, in addition to the initialization signal generator circuit 51. Although not shown in FIG. 2, the voltage regulator circuit 54 powers other circuits of the switch control circuit 13.

The impedance change circuit 53 of the switch control circuit 13 comprises a constant current circuit 67, an FET 68, and a NOT circuit 69. The constant current circuit 67 and the FET 68 are connected in series with each other, and this serial connection between the terminal 44 for inputting the sum signal $V_4$ and the ground terminal 43. The NOT circuit 69 has its input connected by way of a conductor 70 to the output conductor 57 of the control pulse forming circuit 50, and its output to the control terminal of the FET 68.

Therefore, when the switching device 3 is on, that is, when a control pulse is being produced by the control pulse forming circuit 50 on its output conductor 57, the FET 68 will be off, with the result that the impedance change circuit 53 will provide an infinitely great impedance value. On the other hand, when the switching device 3 is off, with no switch control pulse generated, the conductors 57 and 70 will be both low, so that the NOT circuit 69 will be high, causing conduction through the FET 68. An impedance of prescribed magnitude has now been inserted, so to say, between the input terminal 44 and the ground terminal 43. The constant current circuit 67 could be replaced by a resistance of relatively great magnitude.

A reference back to FIG. 1 will reveal that the impedance change circuit 53 is connected in parallel with the capacitor 39. Therefore, during the nonconducting periods of the switching device 3, the impedance of the impedance change circuit 53 will be connected in parallel with the serial circuit of the resistors 4 and 38, with a consequent drop in the voltage of the sum signal $V_4$ at the input terminal 44. There will thus be a less difference in level between the sum signal when the switching device 3 is off and that when the switching device is on.

The constant current circuit 67 of the impedance change circuit 53 has its current value so determined that the sum signal $V_4$ crosses the first reference voltage $V_{r1}$ at or about the bottom of the ringing waveform after the release of the energy that has been stored on the transformer 2. This impedance change circuit 53 might therefore be a part of the summing circuit 12. The impedance of the impedance change circuit 53 is so determined that the peak value of the sum signal $V_4$ during the conducting periods $T_{on}$ is held lower than that of the sum signal during the nonconducting periods $T_{off}$. The impedance change circuit 53 will be unnecessary in cases where the voltage level of the sum signal $V_4$ is not very high during the nonconducting periods $T_{off}$ of the switching device 3.

The nonconducting period signal generator circuit 73 generates a signal indicative of the lengths of time during which the switching device 3 is to be held off. The first and second minimum nonconducting periods $T_1$ and $T_2$ according to the present invention are also indicated by the output signal of this generator circuit 73, so that it could be termed a minimum nonconducting period signal generator circuit. The nonconducting period signal generator circuit 73 will be detailed presently.

The maximum nonconducting period determination circuit 74 puts out a signal indicative of the maximum nonconducting period for the switching device 3. The details of this maximum nonconducting period determination circuit 74 will also be set forth subsequently.

The flyback voltage duration detector circuit 101 is for detecting the duration $T_0$ of the duration of the flyback voltage according to this invention. The flyback voltage duration detector circuit 101 will also be detailed subsequently.

The judgment circuit 102 compares the first minimum nonconducting period $T_1$ or second minimum nonconducting period $T_2$ from the nonconducting period signal generator circuit 73 and the flyback voltage duration $T_0$ from the flyback voltage duration detector circuit 101, for controlling the nonconducting period signal generator circuit 73 accordingly. The judgment circuit 102 will also be detailed subsequently.

Figure 3:
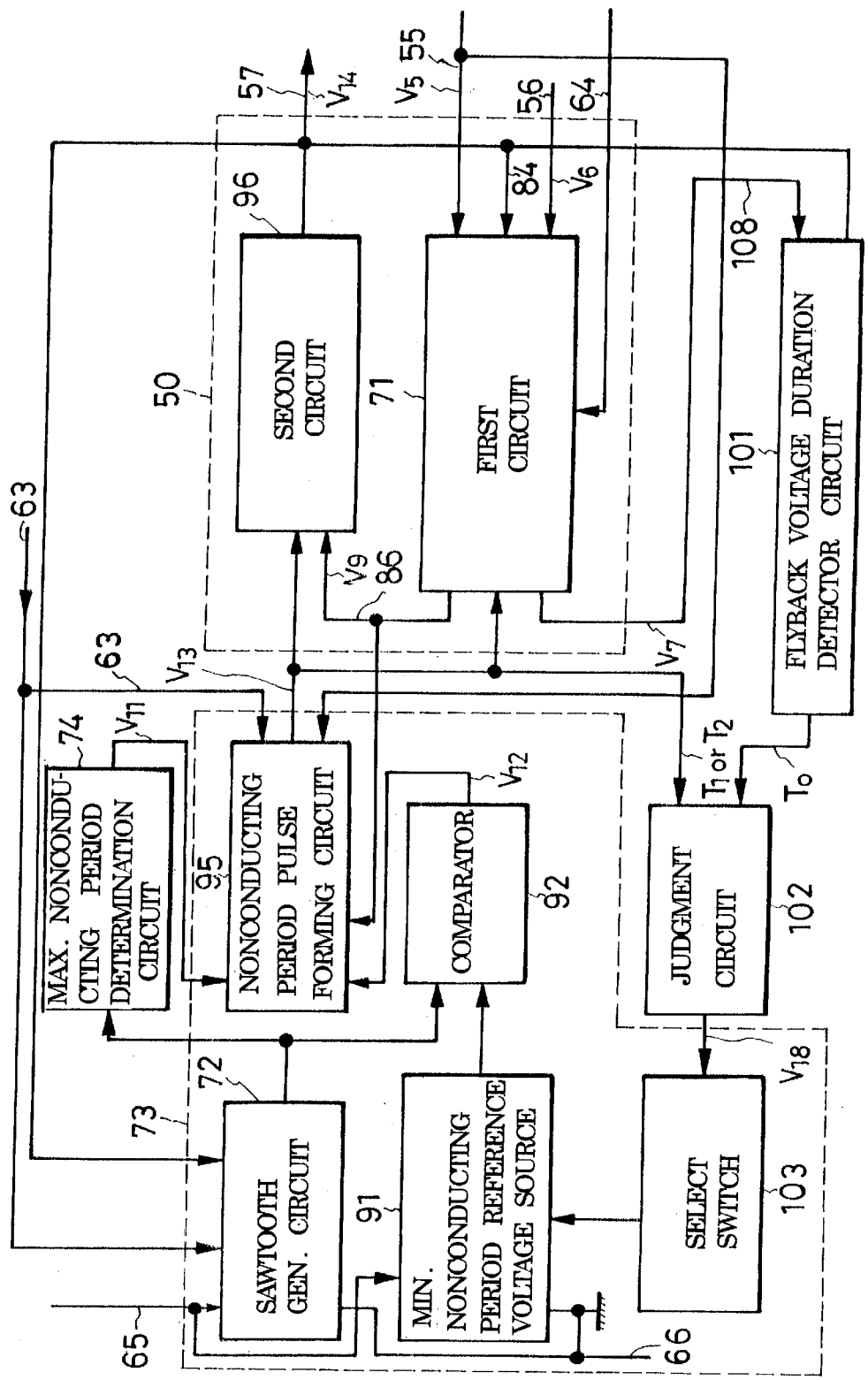
FIG. 3 is a block diagram showing in more detail the pulse generator circuit of the dc-to-dc converter of FIG. 1.

FIG. 3 illustrates the control pulse forming circuit 50 and nonconducting period signal generator circuit 73 of FIG. 2 in more detail and together with the maximum nonconducting period determination circuit 74, the flyback voltage duration detector circuit 101, and the judgment circuit 102. As is apparent from this figure, the control pulse forming circuit 50 is constituted of a first circuit 71 and a second circuit 96. The first circuit 71 is for determination of the moment at which each nonconducting period of the switching device 3 is to be terminated. The second circuit 96 is to create pulses for closing the switch 3 in response to the signal $V_9$ on the output conductor 86 of the first circuit 71 and the output $V_{13}$ from the nonconducting period signal generator circuit 73. The details of the first and the second circuit 71 and 96 will be explained later.

The nonconducting period signal generator circuit 73 broadly comprises a sawtooth generator circuit 72, a reference voltage source 91 for minimum nonconducting period determination, a comparator 92, and a nonconducting period pulse forming circuit 95. All these will be detailed presently.

Figure 4:
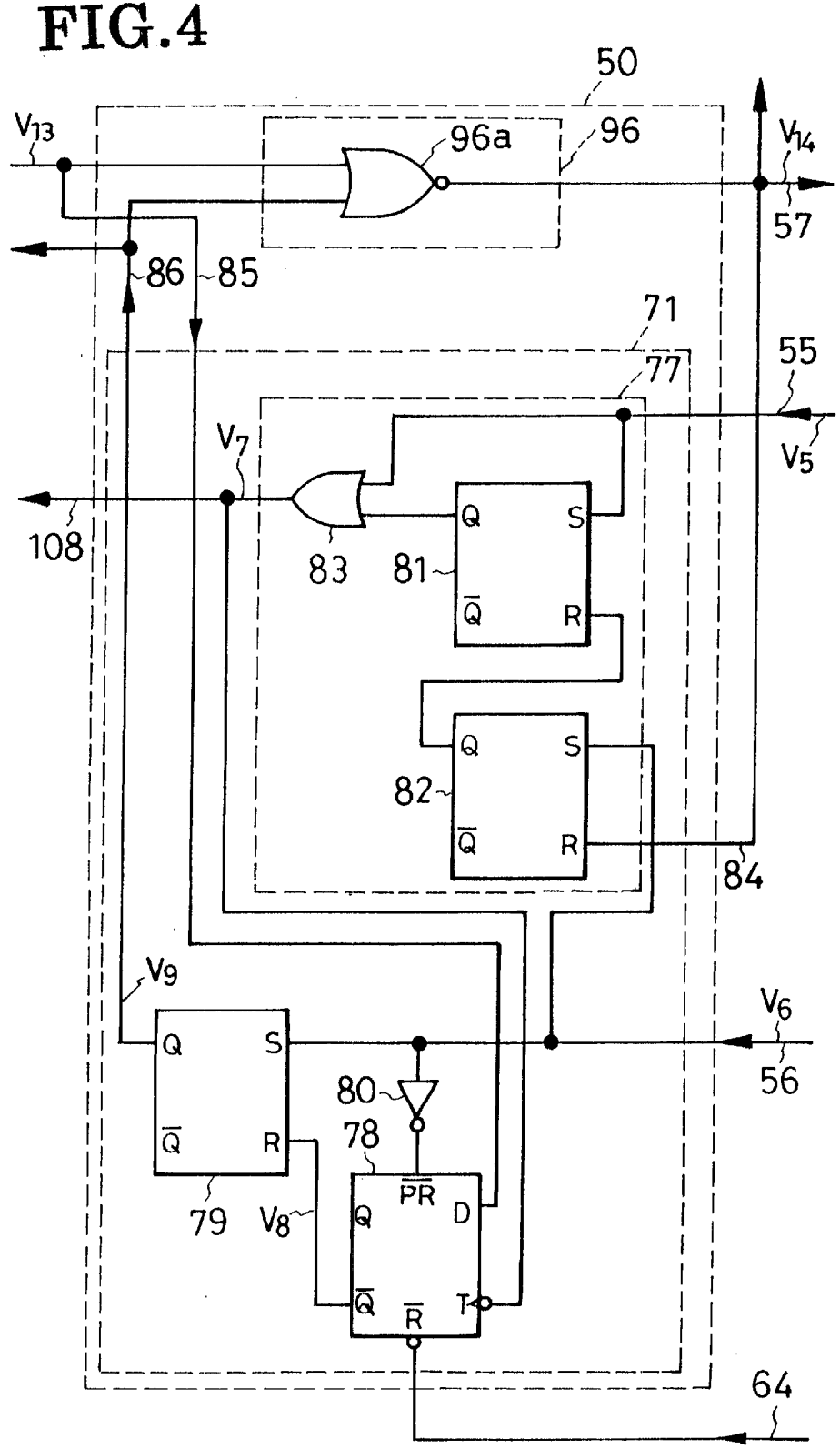
FIG. 4 is a circuit diagram showing in more detail the nonconducting period terminating circuit of FIG. 3.

FIG. 4 is a detailed illustration of the control pulse forming circuit 50 of FIG. 3. The first circuit 71 included in the control pulse forming circuit 50 is for determination of the final moment of each nonconducting period $T_{off}$ or the starting moment of each conducting period $T_{on}$, of the switching device 3. As illustrated in FIG. 4, the first circuit 71 comprises a wave-shaping circuit 77, two flip-flops 78 and 79, and a NOT circuit 80.

Figure 6:
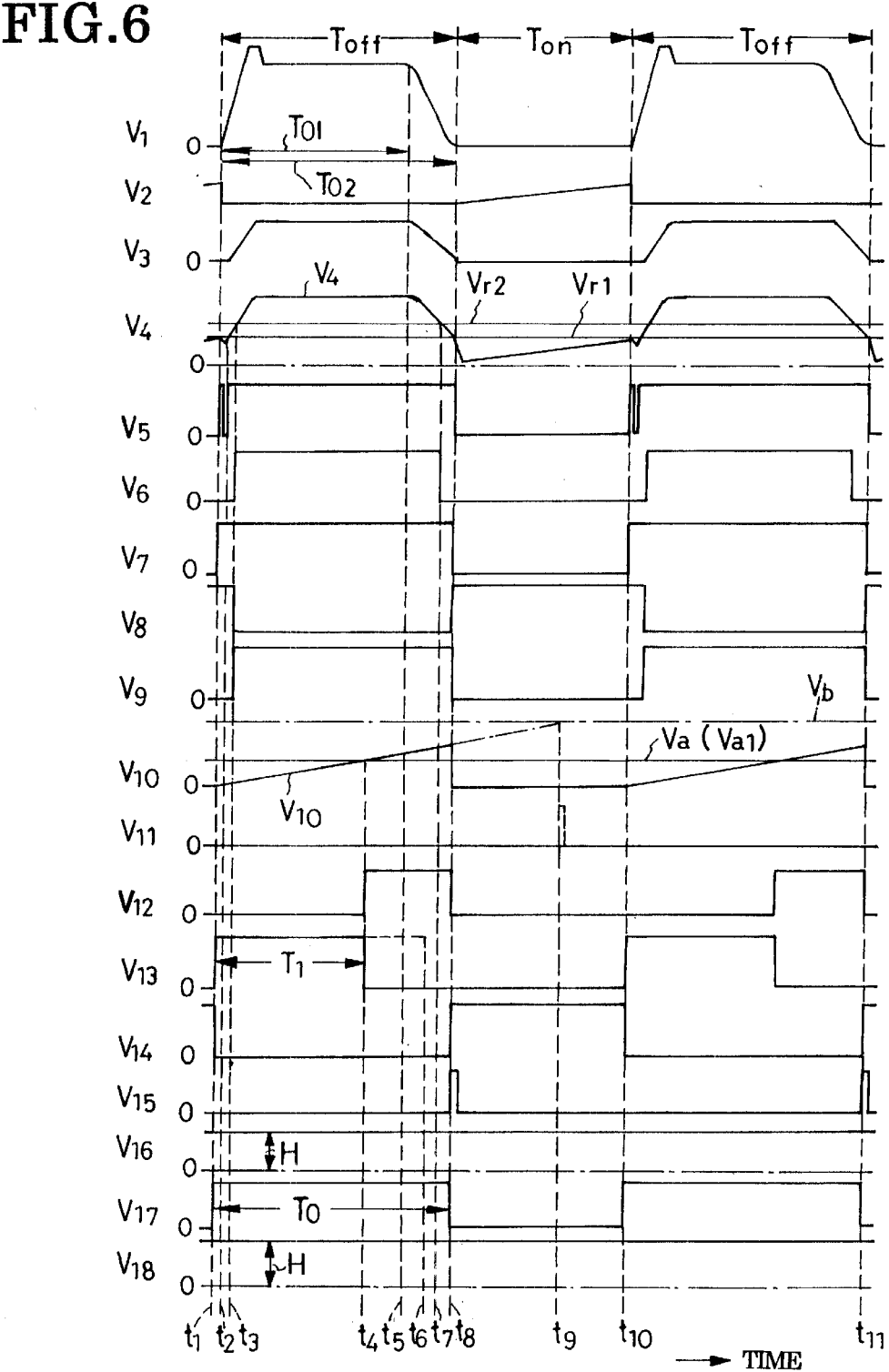
FIG. 6 is a waveform diagram of the voltages appearing at $V_1$–$V_{18}$ of FIGS. 1–5 when the dc-to-dc converter of FIG. 1 is heavily loaded.
Figure 7:
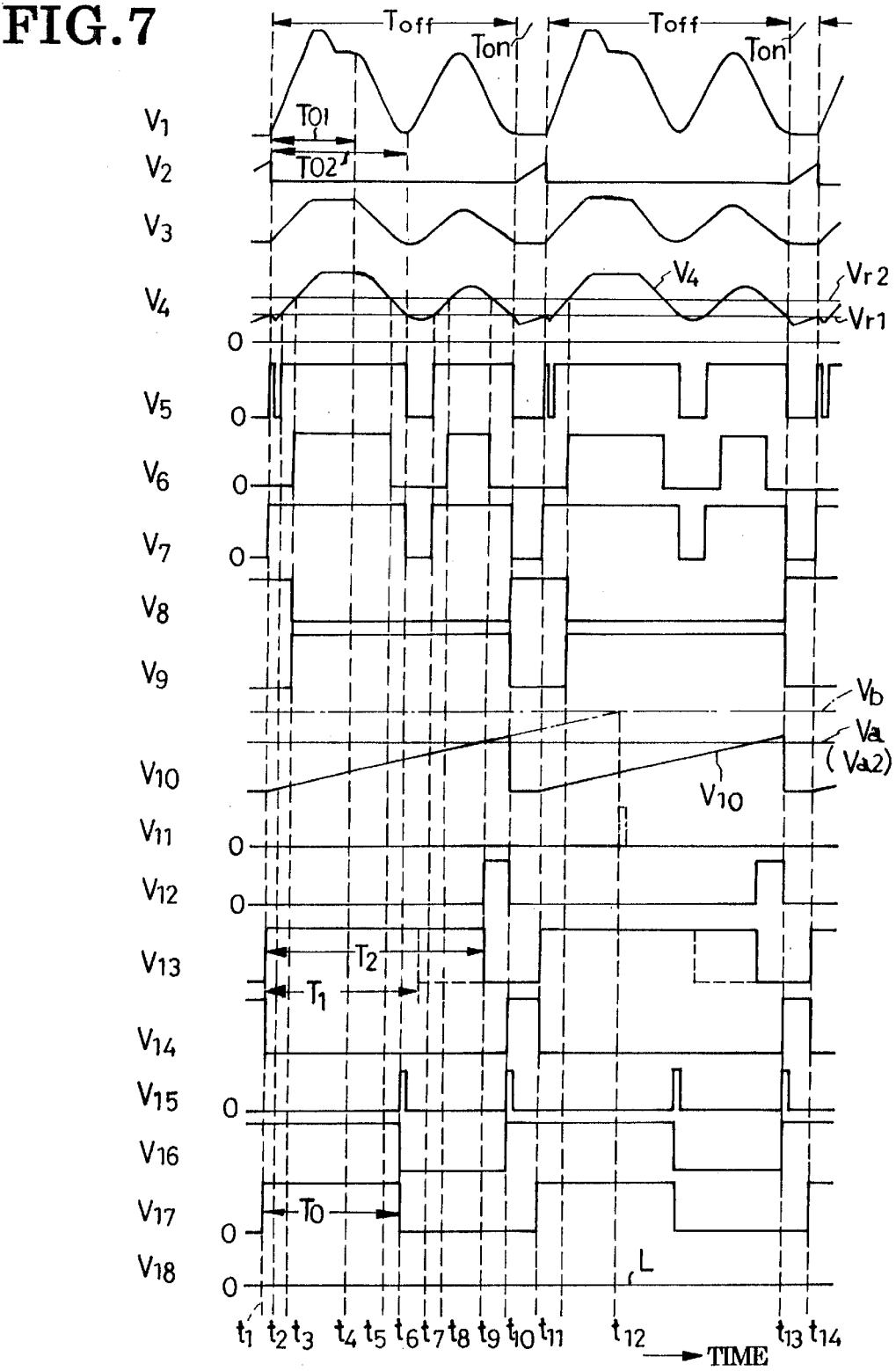
FIG. 7 is a waveform diagram of the voltages appearing at $V_1$–$V_{18}$ of FIGS. 1–5 when the dc-to-dc converter of FIG. 1 is lightly loaded.

Included in the first circuit 71, the wave-shaping circuit 77 comprises two flip-flops 81 and 82 and an OR gate 83 in order to translate the waveform indicated at $V_5$ in FIGS. 6 and 7 into the waveform seen at $V_7$ in the same figures. The flip-flop 81 is an RS flip-flop, with priority to resetting, having a set input S connected to the first comparator 46, FIG. 2, by way of the conductor 55, and a reset input R connected to the positive output Q of the other RS flip-flop 82. The OR gate 83 has one input connected to the conductor 55 for inputting the output $V_5$ from the first comparator 46, and the other input connected to the Q output of the flip-flop 81. The output from the OR gate 83 is therefore as shown at $V_7$ in FIGS. 6 and 7. This wave-shaped output $V_7$ from the circuit 77 takes the form of pulses each lasting as from $t_1$ to $t_8$ in FIG. 6 and from $t_1$ to $t_6$ and from $t_7$ to $t_{10}$ in FIG. 7.

A comparison of $V_5$ and $V_7$ in FIG. 6 will show that the output pulses $V_7$ of the wave-shaping goes high upon commencement of each nonconducting period $T_{off}$ and stays so throughout that period, without the temporarily drop seen in the first comparator output $V_5$ shortly after the beginning of each nonconducting period.

More specifically, as the current detection voltage $V_2$ due to the resistor 4, which is included in the sum signal $V_4$, overshoots (not shown) the first reference voltage $V_{r1}$ at $t_1$ in FIGS. 6 and 7, the sum signal $V_4$ will first upwardly, then downwardly, and again upwardly, cross the first reference voltage $V_{r1}$. Consequently, the first comparator output $V_5$ will go low after briefly going high at $t_1$ in FIGS. 6 and 7, and again go high at $t_2$. Thanks to the wave-shaping circuit 77, however, there can be obtained the output $V_7$ in the form of pulses from which is absent the low state immediately before $t_2$. The flip-flop 82 has a set input S connected to the conductor 56 over which is sent the second comparator output $V_6$, and a reset input R connected to a conductor 84.

The D flip-flop 78 of the first circuit 71, which is designed for determination of the moment at which is to be terminated each nonconducting period, has a clock input T connected to the wave-shaping circuit 77, a data input D connected to a nonconducting period pulse forming circuit 95 by way of a conductor 85, a preset input PR connected to the output conductor 56 of the second comparator 47 via the NOT circuit 80, and a reset input $\overline{R}$ connected to the initialization signal generator circuit 51 by way of the conductor 64. Thus the flip-flop 78 is reset by the initialization signal supplied over the conductor 64, preset by the output $V_6$ from the second comparator 47 when the sum signal $V_4$ upwardly crosses the second reference level $V_{r2}$ as at $t_3$, clocked by the trailing edges, as at $t_8$ in FIG. 6, of the output pulses $V_7$ of the wave-shaping circuit 77 in order to input the signal $V_{13}$ of FIG. 6, for instance, and puts out from its inverting output $\overline{Q}$ the signal indicated at $V_8$ in FIGS. 6 and 7.

The other flip-flop 79 of the first circuit 71 for determination of the ending moments of the nonconducting periods is an RS flip-flop with priority to setting. This flip-flop 79 has a set input S connected to the conductor 56 for inputting the second comparator output $V_6$, and a reset input R connected to the inverting output $\overline{Q}$ of the D flip-flop 78. Further this flip-flop 79 has a positive-phase output Q connected by way of a conductor 86 to a NOR gate 96a constituting the second circuit 96 and to the nonconducting period pulse forming circuit 95, FIGS. 3 and 5, for delivering thereto the signal $V_9$ indicated in FIGS. 6 and 7.

The output signal $V_9$ of the flip-flop 79 is high as from $t_3$ when the sum signal $V_4$ first crosses the second reference voltage $V_{r2}$, to the moment the sum signal crosses the first reference voltage $V_{r1}$ for the last time, as at $t_8$ in FIG. 6 or $t_{10}$ in FIG. 7, during one nonconducting period $T_{off}$. The moment, as at $t_8$ in FIG. 6 or $t_{10}$ in FIG. 7, when the sum signal $V_4$ crosses the first reference voltage $V_{r1}$ for the last time in any nonconducting period $T_{off}$ is the ending moment of that nonconducting period and therefore the starting moment of the next conducting period $T_{on}$. Determined by the first circuit 71 for terminating the nonconducting periods, the moment $t_8$ in FIG. 6 or too in FIG. 7 is at the end of the additional period $t_4$–$t_8$ of FIG. 6 or additional period $t_9$–$t_{10}$ of FIG. 7 following the end, at $t_4$ in FIG. 6 or $t_9$ in FIG. 7, of each minimum nonconducting period $T_1$ or $T_2$ indicated at $V_{13}$ in FIGS. 6 and 7.

Since the output from the positive-phase output Q of the D flip-flop 78 is the same as that from the flip-flop 79, this flip-flop 79 could be omitted, and the positive-phase output Q of the D flip-flop 78 connected directly to the output conductor 86. The nonconducting periods $T_{off}$ in this embodiment of the invention are each the sum of the first or second minimum nonconducting period $T_1$ or $T_2$ and the additional period which is subject to change depending upon the magnitude of the load 26.

Constituting the second circuit 96, FIGS. 3 and 4, the NOR gate 96a puts out control pulses indicated at $V_{14}$ in FIGS. 6 and 7. The connections of this NOR gate 96a will be detailed later.

Figure 5:
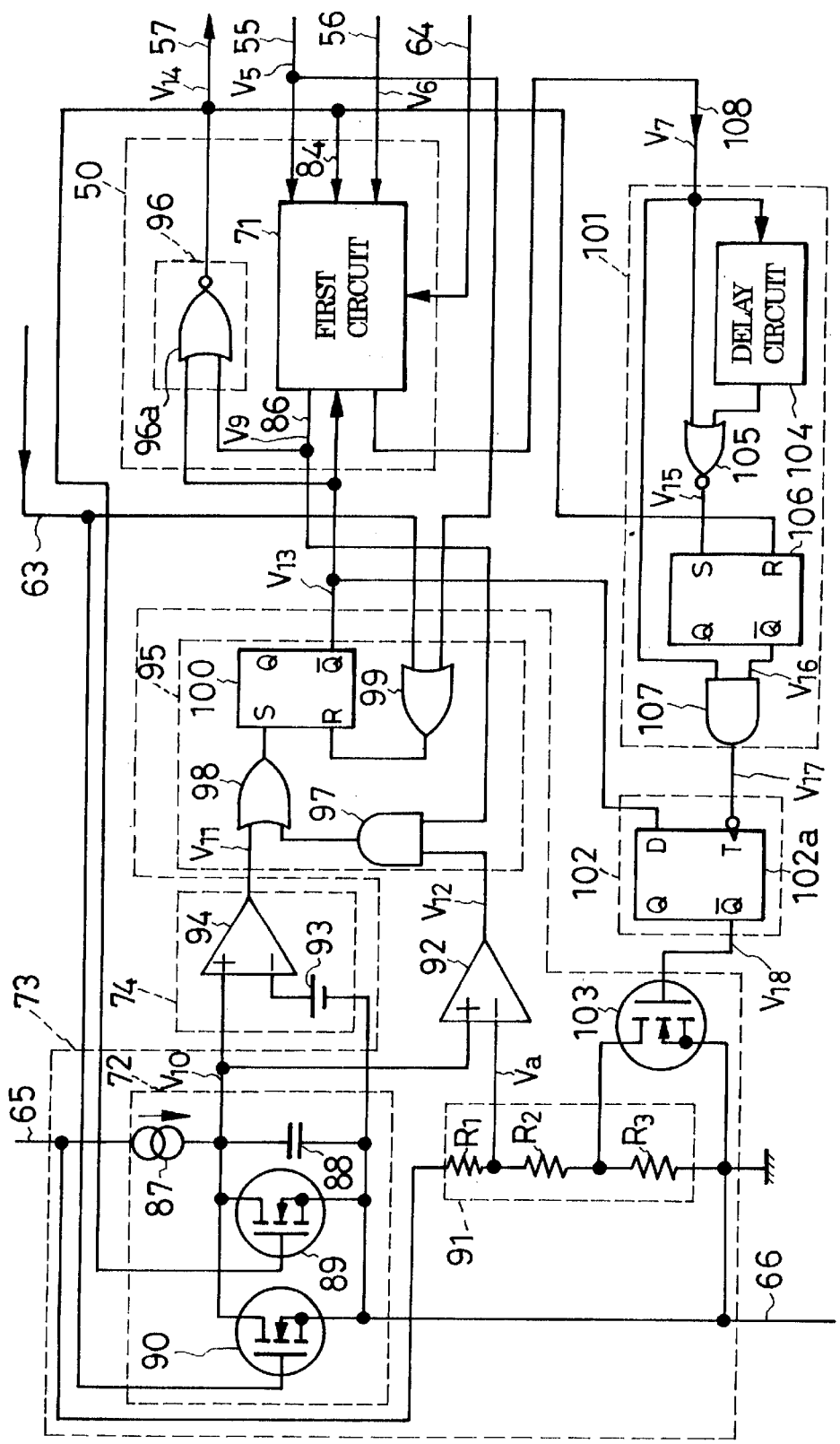
FIG. 5 is a circuit diagram showing in more detail the sawtooth generator circuit, minimum nonconducting period determination circuit, maximum nonconducting period determination circuit, control pulse forming circuit, and reference voltage switching circuit of FIG. 3.

FIG. 5 is a detailed illustration of the nonconducting period signal generator circuit 73, maximum nonconducting period determination circuit 74, flyback voltage duration detector circuit 101, and judgment circuit 102 of FIG. 3.

Included in the nonconducting period signal generator circuit 73, sawtooth voltage generator circuit 72 comprises a constant current circuit 87, a capacitor 88, a first 89 and a second 90 discharge switch. The capacitor 88 is connected to a supply conductor 65 via the constant current circuit 87 on one hand and, on the other hand, grounded by way of the conductor 66. Each in the form of an FET, the two discharge switches 89 and 90 are each connected in parallel with the capacitor 88. The first discharge switch 89 has its control terminal connected to a control pulse output conductor 57. The second discharge switch 90 has its control terminal connected to the first resetting conductor 63. The capacitor 88 is therefore discharged when the switch 89 or 90 is closed, and charged from the constant current circuit 87 when the switches 89 and 90 are both open. As the voltage across the capacitor rises with a gradient, there is obtained a sawtooth voltage indicated at $V_{10}$ in FIGS. 6 and 7.

The reference voltage source 91 for minimum nonconducting period determination is shown as a serial circuit of three resistors $R_1$, $R_2$ and $R_3$. This serial resistor circuit is connected to the supply conductor 65 on one hand and, on the other hand, to the grounded conductor 66.

The comparator 92 for minimum nonconducting period determination has a positive input connected to the output of the capacitor 88, or to that of the sawtooth generator circuit 72, and a negative input connected to the junction, or voltage-dividing point, between the resistors $R_1$ and $R_2$. Thus, comparing the sawtooth voltage $V_{10}$ and the reference voltage $V_a$ from its source 91, as in FIGS. 6 and 7, the comparator 92 will provide an output $V_{12}$.

In order to provide a hysteresis effect, the reference voltage source 91 for minimum nonconducting period determination is placed under the control of a switch 103, putting out a first reference voltage $V_{a1}$ for minimum nonconducting period determination when the dc-to-dc converter is heavily loaded as in FIG. 6, and a second reference voltage $V_{a2}$ for minimum nonconducting period determination when the converter is more lightly loaded as in FIG. 7. As a result, the output $V_{12}$ from the comparator 92 will go high at different moments depending upon whether the converter is heavily or lightly loaded, as at $t_4$ under heavy load as in FIG. 6 and at $t_9$ under light load as in FIG. 7.

As is apparent from the waveform $V_{12}$ in FIGS. 6 and 7, the comparator 92 put out pulses indicative of the ending moments of the minimum nonconducting periods. The pulses indicative of the complete minimum nonconducting periods $T_1$ and $T_2$ are shown at $V_{13}$ in FIGS. 6 and 7. These pulses indicative of the complete minimum nonconducting periods are formed by the nonconducting period pulse forming circuit 95.

The nonconducting period pulse forming circuit 95 comprises an AND gate 97, two OR gates 98 and 99, and an RS flip-flop 100 with priority to setting. The AND gate 97 has one input connected to the comparator 92 for minimum nonconducting period determination, and another input connected by way of the conductor 86 to the flip-flop 79 of the first circuit 71 for determination of the ending moments of the nonconducting periods. The OR gate 98 has one input connected to the comparator 94 of the maximum nonconducting period determination circuit 74, and another input connected to the AND gate 97. The flip-flop 100 has a set input S connected to the OR gate 98 and a reset input R connected to the OR gate 99 and produces from its inverting output $\overline{Q}$ minimum nonconducting period pulses $V_{13}$ or maximum nonconducting period pulses. These output pulses $V_{13}$ of the flip-flop 100 during normal operation have durations indicative of the minimum nonconducting periods of the switching device 3. The inverting output $\overline{Q}$ of the flip-flop 100 of the nonconducting period pulse forming circuit 95 is connected to one of the inputs of the NOR gate 96 for forming control pulses.

In this particular embodiment of the invention the flip-flop 100 of the nonconducting period pulse forming circuit 95 puts out pulses indicative of the minimum nonconducting periods $T_1$ or $T_2$ during normal operation, and, at the time of startup, pulses indicative of the maximum nonconducting periods in response to the output from the comparator 94 for maximum nonconducting period determination. It is thus seen that the nonconducting period pulse forming circuit 95 functions for production of both minimum and maximum nonconducting period pulses. The configuration of the control circuit 13 is simplified accordingly. Notwithstanding this advantage, however, the nonconducting period pulse forming circuit 95 may be used solely for production of pulses indicative of the minimum nonconducting periods $T_1$ or $T_2$, and a separate circuit provided for production of maximum nonconducting period pulses.

For switching between first minimum nonconducting period $T_1$ and second minimum nonconducting period $T_2$, the switch 103 is connected in parallel with the resistor $R_3$ of the reference voltage source 91 of voltage-divider construction for minimum nonconducting period determination. The switch 103 is to be turned on when the converter is heavily loaded, thereby setting the reference voltage $V_{a1}$, FIG. 6, for first minimum nonconducting period determination, and off when the converter is lightly loaded, thereby setting the reference voltage $V_{a2}$, FIG. 7, for second minimum nonconducting period determination.

The reference voltage $V_{a1}$ for first minimum nonconducting period determination, obtained as above when the switch 103 is closed, is defined as $$V_{a1}=E[R_2/(R_1+R_2)]$$

where E is the voltage between the supply conductor 65 and the ground. The reference voltage $V_{a2}$ for second minimum nonconducting period determination, obtained as above when the switch 103 is open, is defined as $$V_{a2}=E[(R_2+R_3)/(R_1+R_2+R_3)]$$

The maximum nonconducting period determination circuit 74, FIG. 5, serves for starting up the dc-to-dc converter, as well as for dc-to-dc conversion under extremely light load. This converter is alternately turned on and off, with a constant nonconducting period, while starting up. For determination of this constant nonconducting period, the maximum nonconducting period determination circuit 74 comprises a reference voltage source 93 for maximum nonconducting period determination and a comparator 94.

As indicated in both FIGS. 6 and 7, the reference voltage source 93 for maximum nonconducting period determination generates a reference voltage $V_b$ which is higher than the reference voltage $V_a$ for minimum nonconducting period determination. This reference voltage $V_b$ for maximum nonconducting period determination is of such a level as not to cross the sawtooth voltage $V_{10}$ during normal operation, that is, when the converter is both heavily and lightly loaded.

The comparator 94 of the maximum nonconducting period determination circuit 74 has a positive input connected to the capacitor 88 of the sawtooth generator circuit 72, and a negative input connected to the reference voltage source 93. The output $V_{11}$ from this comparator 94 is therefore high when the sawtooth voltage $V_{10}$ grows higher than the reference voltage $V_b$. In FIGS. 6 and 7, both plotted on the assumption that the converter is in normal operation, the sawtooth voltage $V_{10}$ does not cross the reference voltage $V_b$, so that the output $V_{11}$ from the comparator 94 is shown to stay low (zero).

During a startup period, on the other hand, the output voltage $V_O$ of the converter will be low, and so will be the peak value of the sum signal $V_4$, with the result that the first circuit 71 for nonconducting period termination will not operate normally. Its output $V_9$ will remain low. The nonconducting period pulse forming circuit 95 will then form control pulses according to the output from the maximum nonconducting period determination circuit 74.

Shown also in FIG. 5, the flyback voltage duration detector circuit 101 is for detection of the period of time during which the transformer 2 is generating a flyback voltage. The output from this circuit 101 is indicated at $V_{17}$ in FIGS. 6 and 7. The output $V_{17}$ is shown high from $t_1$ to $t_8$ and low from $t_8$ to $t_{10}$ in FIG. 6, and high from $t_1$ to $t_6$ and low from $t_6$ to $t_{11}$ in FIG. 7. In short this output $V_{17}$ is a signal that is high from the starting moment of each nonconducting period $T_{off}$ to the moment the sum signal $V_4$ first crosses the first reference voltage $V_{r1}$ following the completion of the release of the energy that has been stored on the transformer 2. It takes the form of pulses in agreement with the periods during which the flyback voltage is being generated from the transformer 2.

For the sake of explanation and illustration the period $T_0$ during which the flyback voltage is being generated is hereby defined as $$T_{01} \leq T_0 \leq T_{02}$$

where, as indicated in FIG. 6, $T_{01}$ is the period of time from the moment the switching device 3 is turned off to the moment the flyback voltage starts dwindling, and $T_{02}$ is the period of time from the moment the switching device 3 is turned off to the moment the ringing voltage first reaches its lowest level.

Thus, although the flyback voltage period $T_0$ is shown to be equal to $T_{02}$ in FIGS. 6 and 7, in practice it can be anywhere between $T_{01}$ and $T_{02}$. The period from the end of $T_{01}$ to the end of $T_{02}$ is equal to a half-cycle of the ringing voltage, this half-cycle being included in the flyback voltage period in this application. The flyback voltage period $T_0$ is proportional to each conducting period $T_{on}$ of the switching device 3.

In order to detect the flyback voltage period $T_0$ on the basis of the output signals $V_7$ and $V_{14}$ of the control pulse forming circuit 50, the fly-back voltage period detector circuit 101 comprises a delay circuit 104, a NOR gate 105, an RS flip-flop 106 with priority to resetting, and an AND gate 107. The delay circuit 104 is connected by way of a conductor 108 to the wave-shaping circuit 77, FIG. 4, of the first circuit 71, for imparting a slight delay to the output $V_7$ of the wave-shaping circuit. The output of the delay circuit 104 is connected to one end of the NOR gate 105, to the other input of which is directly connected the output conductor 108 of the wave-shaping circuit 77. As indicated in FIGS. 6 and 7, the resulting output $V_{15}$ from the NOR gate 105 will contain pulses of a brief duration as at $t_8$ in FIG. 6 and at $t_6$ and $t_{10}$ in FIG. 7. The duration of these NOR gate output pulses is equal to the time delay imparted to the wave-shaping circuit output $V_7$ by the delay circuit 104.

The flip-flop 106 of the flyback voltage duration detector circuit 101 has a set input S connected to the NOR gate 105, and a reset input R connected to the output conductor 57 of the control pulse forming circuit 50. The resulting $\overline{Q}$ output from this flip-flop 106 is indicated at $V_{16}$ in FIGS. 6 and 7. The flip-flop output $V_{16}$ will stay high when the converter is heavily loaded as in FIG. 6, and be low from $t_6$ to $t_{10}$ when the converter is lightly loaded as in FIG. 7.

The AND gate 107 of the flyback voltage duration detector circuit 101 has its input connected to the flip-flop 106 for inputting its output signal $V_{16}$, and to the wave-shaping circuit 77, FIG. 4, by way of the conductor 108. The output of the AND gate 107 is connected to the clock input T of a D flip-flop 102a constituting the judgment means 102. The flip-flop 102a is therefore clocked by the trailing edge of each pulse $V_{17}$ indicative of the duration $T_0$ of the flyback voltage.

The flip-flop 102a of the judgment means 102 functions to judge: (a) whether each flyback voltage duration $T_0$ as indicated by the output $V_{17}$ from the flyback voltage duration detector circuit 101 is shorter than the first minimum nonconducting period $T_1$ or not; and (b) whether each flyback voltage duration $T_0$ is longer than the second minimum nonconducting period duration $T_2$ or not. The flip-flop 102a controls the switch 103 according to the results of such judgments.

In order to make the foregoing judgments the flip-flop 102a has its data input D connected to the inverting output $\overline{Q}$ of the flip-flop 100 of the minimum nonconducting period pulse forming circuit 95, and its inverting output $\overline{Q}$ connected to the control terminal or gate of the FET switch 103. The output $V_{18}$ of the flip-flop 102a will stay high when the converter is heavily loaded as in FIG. 6, and low when the converter is lightly loaded as in FIG. 7. A change in the output state of the flip-flop 102a will occur at $t_6$ and $t_{13}$ in FIG. 8. The switch 103 will be closed when the flip-flop output $V_{18}$ is high, and open when it is low.

Figure 8:
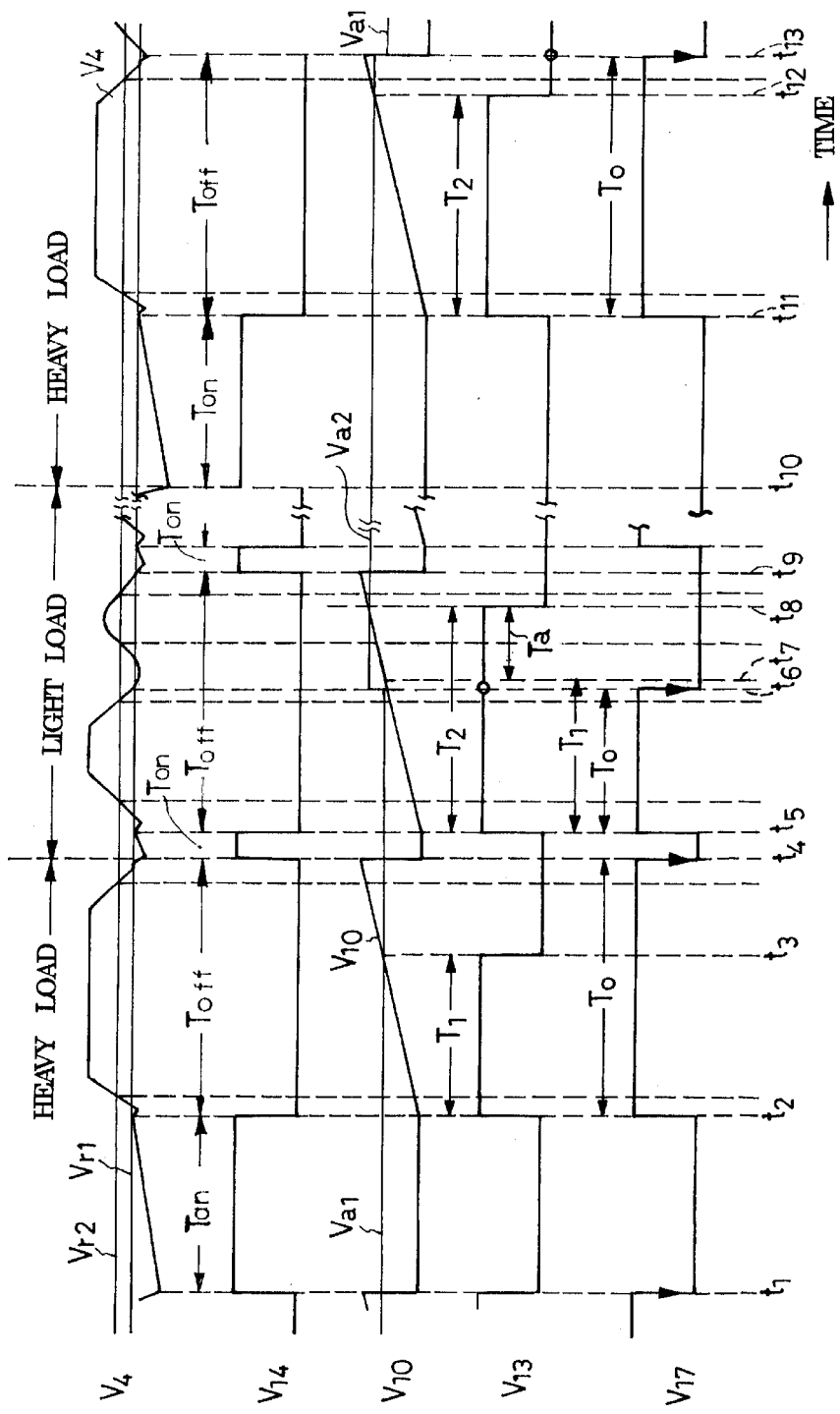
FIG. 8 is a waveform diagram explanatory of changes in $V_4$, $V_{14}$, $V_{10}$, $V_{13}$ and $V_{17}$ due to a change from a heavy to a light load on the dc-to-dc converter of FIG. 1.
Figure 9:
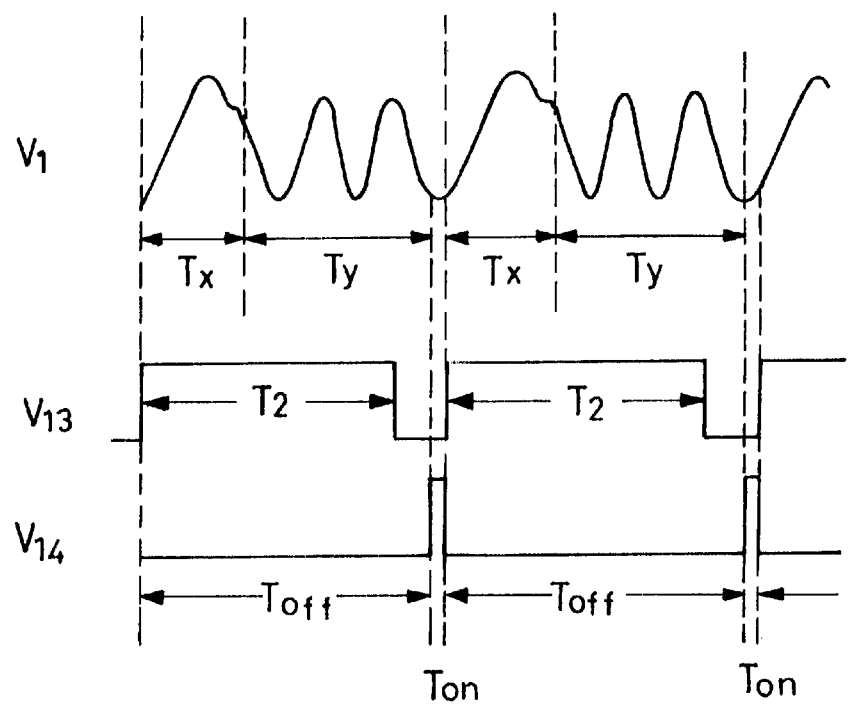
FIG. 9 is a waveform diagram explanatory of the states of $V_1$, $V_{13}$ and $V_{14}$ when the load on the dc-to-dc converter of FIG. 1 is even lower than the light state of FIG. 7.

FIG. 8 is explanatory of how the switch 103 switches between the two reference voltages $V_{a1}$ and $V_{a2}$. This figure is plotted on the assumption that the converter is heavily loaded before $t_4$ and after $t_{10}$, and lightly loaded between $t_4$ and $t_{10}$. Before $t_4$, therefore, the switch control pulse $V_{14}$ has a relatively long duration, as from $t_1$ to $t_2$, and the first minimum nonconducting period $T_1$ is set up.

With a gradual decrease of the load 26, the resulting rise in the output voltage $V_O$ will cause a decrease in the durations of the switch control pulses $V_{14}$, as from $t_4$ to $t_5$ in FIG. 8. Since less energy will be stored on the transformer 2, such stored energy will be released in a shorter period of time, causing a decrease in the flyback voltage duration $T_0$. Then the sum signal $V_4$ will cross the first reference voltage $V_{r1}$ at $t_6$, whereupon the output $V_{17}$ of the flyback voltage duration detector circuit 101 will go low thereby causing the flip-flop 102a of the judgment means 102 will take in the output $V_{13}$ from the nonconducting period pulse forming circuit 95.

It will be observed from FIG. 8 that the output $V_{13}$ from the nonconducting period pulse forming circuit 95 is high at $t_6$. The flip-flop 102a is thus enabled to ascertain that the flyback voltage duration $T_0$ is now shorter than the first minimum nonconducting period $T_1$, so that its inverting output will go low at $t_6$. With the switch 103 thus opened, the reference voltage for minimum nonconducting period determination will be switched from $V_{a1}$ to $V_{a2}$.

Consequently, when the converter is lightly loaded as from $t_4$ to $t_{10}$ in FIG. 8, the sawtooth voltage $V_{10}$ will not cross the reference voltage $V_{a1}$ for first minimum nonconducting period determination but will do cross at $t_8$ the reference voltage $V_{a2}$ for second minimum nonconducting period determination. Thereupon the minimum nonconducting period pulse $V_{13}$ will terminate. The minimum nonconducting period $T_2$ under light load, as represented by $V_{13}$, will therefore be $T_1+T_a$, or longer by $T_a$ than the minimum nonconducting period $T_1$ under heavy load. The switching of the reference voltage from $V_{a1}$ to $V_{a2}$, or the switching of the minimum nonconducting period from $T_1$ to $T_s$, is comparable to the hysteresis operation of a known hysteresis comparator or Schmidt trigger circuit.

For the best results, the first minimum nonconducting period $T_1$ may be from about two to about ten microseconds; the second minimum nonconducting period $T_2$ from about three to about fifteen microseconds; and the difference $T_a$ between $T_1$ and $T_2$ from about 0.1 to about ten microseconds, preferably from two to five microseconds. The longer the difference $T_a$, the more stable will be the hysteresis operation. Should the difference $T_a$ exceed a certain limit, however, the nonconducting periods $T_{off}$ of the switching device 3 would be inconveniently long. In this particular embodiment of the invention, $T_1$ is set at five microseconds, $T_2$ at eight microseconds, and $T_a$ at three microseconds.

On being heavily loaded again at $t_{10}$ in FIG. 8, the duration of each switch control pulse $V_{14}$, indicative of one conducting period $T_{on}$, will grow longer, as from $t_{10}$ to $t_{11}$, an so will the nonconducting period $T_{off}$, as from $t_{11}$ to $t_{13}$. The reference voltage $V_a$ for minimum nonconducting period determination will not change from $V_{a2}$ to $V_{a1}$ at $t_{12}$, but at $t_{13}$ when the output $V_{17}$ from the flyback voltage duration detector circuit 101 goes low. The minimum nonconducting period signal $V_{13}$, on the other hand, will go low at $t_{12}$ when the sawtooth voltage $V_{10}$ crosses the reference voltage $V_{a2}$ for second minimum nonconducting period determination.

The flip-flop 102a, FIG. 5, of the judgment circuit 102 will input the low state of the minimum nonconducting period signal $V_{13}$ at $t_{13}$, closing the switch 103 by the high output signal from its inverting output. Thus, in other words, the flip-flop 102a will ascertain at $t_{13}$ that the flyback voltage duration $T_0$ as represented at $V_{17}$ in FIG. 8 has grown longer than the second minimum nonconducting period $T_2$, commanding a change from the second reference voltage $V_{a2}$ back to the first reference voltage $V_{a1}$. The supply of the reference voltage $V_{a1}$ for first minimum nonconducting period determination will be resumed at $t_{13}$. Although not specifically illustrated in FIG. 8, it is understood that the first minimum nonconducting period $T_1$ is set up at $t_{13}$ in that figure, like the minimum nonconducting period signal $V_{13}$ of FIG. 6.

Upon connection of the ac input terminals 16 and 17, FIG. 1, of the rectifying smoothing circuit 1 to the ac power supply, a stabilized dc voltage will be put out by the voltage regulator circuit 54, FIG. 2, the switch control circuit 13. The initialization signal generator circuit 51, FIG. 2, of the switch control circuit 13 will produce a reset pulse on its output conductor 63, and a "negative" reset pulse on its other output conductor 64, if the circuit 51 is supplied with a constant voltage of, say, 5.8 volts. The reset pulse on the conductor 63 will close the second discharge switch 90, FIG. 5, of the sawtooth generator circuit 72, thereby causing the capacitor 88 to be discharged. The reset pulse on the conductor 63 will also be delivered to the reset input R of the flip-flop 100, FIG. 5, of the nonconducting period pulse forming circuit 85 via the OR gate 99. The flip-flop 100 will be thus initialized, with its output $V_{13}$ high.

The reset pulse on the output conductor 64 of the initialization signal generator circuit generator circuit 51, on the other hand, will be thereby directed to the reset input R of the flip-flop 78, FIG. 4, of the first circuit 71 of the control pulse forming circuit 50. This flip-flop 78 will thus be also initialized, with its inverting output high. Reset by this high output from the flip-flop 78, the other flip-flop 79 of the first circuit 71 will be initialized with its output $V_9$ low.

One input to the NOR gate 96, FIGS. 4 and 5, of the control pulse forming circuit 50 will be high, and the other input low, at startup time, so that its output will be low. The initial state of the switching device 3 will therefore be off.

After having been initialized, the capacitor 88, FIG. 5, of the sawtooth generator circuit 72 will be charged from the constant current circuit 87, with its voltage $V_{10}$ increasing with gradient. As the voltage across the output smoothing capacitor 7 will be low at startup time, so will be the output voltage of the output voltage detector circuit 8, the voltage across the transformer tertiary 23, and the voltage $V_3$ of the switch voltage detector circuit 11. Consequently, the sum signal $V_4$, FIGS. 6 and 7, will have a voltage less than the second reference voltage $V_{r2}$, so that no change will occur in the output $V_6$ of the second comparator 47, FIG. 2. The first circuit 71 of the control pulse forming circuit 50 will then provide a low output $V_9$ on its output conductor 86.

This low output $V_9$ on the conductor 86 will be thereby directed into the AND gate 97, FIG. 5, of the nonconducting period pulse forming circuit 95. The resulting output from the AND gate 97 will be low irrespective of the output $V_{12}$ from the comparator 92 for minimum nonconducting period determination. Therefore, at startup time, the control pulses $V_{14}$ are formed from the output $V_{11}$ from the maximum nonconducting period determination circuit 74.

When the voltage $V_{10}$ across the capacitor 88 of the sawtooth generator circuit 72 builds up to the reference voltage $V_b$ for maximum nonconducting period determination, as indicated by the broken line in FIGS. 6 and 7, the output $V_{11}$ from the comparator 94 will go high, also as indicated by the broken line in the same figures. The flip-flop 100 will then be set, with its output $V_{13}$ going low. Since then both inputs to the NOR gate 96a of the control pulse forming circuit 50 will be low, its output $V_{14}$ will be high, resulting in the closure of the switching device 3. The first discharge switch 89 of the sawtooth generator circuit 72 will be closed at the same time, causing the capacitor 88 to discharge.

Upon closure of the switching device 3, there will be, with delay due to the inductance of the transformer primary 21, a gradual increase in the magnitude of the current flowing through the switching device 3 and current detecting resistor 4. The sum signal $V_4$ will increase in step with the voltage $V_2$ across the resistor 4, crossing the first reference voltage $V_{r1}$ which is designed to limit the eddy current. Thereupon the output $V_5$ from the first comparator 46 will instantaneously go high, resetting the flip-flop 100, FIG. 5, via the OR gate 99. The resulting output $V_{13}$ from this flip-flop 100 will be high. As the output $V_{14}$ from the NOR gate 96a thus goes low, the switching device 3 will be turned off. The first discharge switch 89 will also go off, permitting the capacitor 88 to be charged again.

With the opening of the switching device 3, the output rectifying diode 6a will conduct, with the consequent charging of the smoothing capacitor 7, owing to the voltage across the transformer secondary 22 due to the release of the energy that has been stored on the core 20 of the transformer 2 during the conducting period of the switch. When the voltage $V_{10}$ across the capacitor 88 of the sawtooth generator circuit 72 rises back to the reference voltage Vb for maximum nonconducting period determination, the comparator 94 will again go high thereby setting the flip-flop 100. As its output goes low, the output $V_{14}$ from the NOR gate 96 will go high and so cause the switch 3 to be closed.

The foregoing cycle of operation at startup time will repeat itself until the sum signal $V_4$ rises to the second reference voltage $V_{r2}$. The maximum nonconducting period during this startup period, which is determined by the maximum nonconducting period determination circuit 74, is from $t_1$ to $t_9$ in FIG. 6 and, in practice, may be from forty to fifth microseconds.

The sum signal $V_4$ will cross the second reference voltage $V_{r2}$ with a gradual rise in the voltage across the output smoothing capacitor 7 as a result of the on-off control of the switching device 3 based on the maximum nonconducting period determination circuit 74. Thereupon the output $V_6$ from the second comparator 47 will be as from $t_3$ to $t_7$ in FIG. 6, and the output $V_9$ from the first circuit 71 for nonconducting period termination will be high as from $t_3$ to $t_8$ in FIG. 6. The high state on the output conductor 86, FIGS. 4 and 5 of the first circuit 71 will enable the output $V_{12}$ from the comparator 92 to pass through the AND gate 97. Comparing the sawtooth voltage $V_{10}$ and the reference voltage $V_a$ from the source 91 for minimum nonconducting period determination, the comparator 92 will provide the output $V_{12}$ that is high as from $t_4$ to $t_8$ in FIG. 6.

For smooth transition between heavy load mode and light load mode, the reference voltage Va for minimum nonconducting period determination is set at the first minimum nonconducting period determination voltage $V_{a1}$ when the converter is heavily loaded as in FIG. 6, and at the second minimum nonconducting period determination voltage $V_{a2}$ under light load. The first minimum nonconducting period $T_1$, determined by the reference voltage $V_{a1}$, and the second minimum nonconducting period $T_2$, determined by the reference voltage $V_{a2}$, are switched from one to the other as follows:

The first minimum nonconducting period $T_1$ is set up by closing the switch 103 when the high state of the output $V_{13}$ from the nonconducting period pulse forming circuit 95, lasting from $t_1$ to $t_4$ in FIG. 6, is shorter than the high state, from $t_1$ to $t_8$, of the output $V_{17}$ from the flyback voltage duration detector circuit 101. The second minimum nonconducting period $T_2$ is set up by opening the switch 103 when the high state, from $t_1$ to $t_9$ in FIG. 7, of the output $V_{13}$ from the nonconducting period pulse forming circuit 95 is longer than the high state, from $t_1$ to $t_6$, of the output $V_{17}$ from the flyback voltage duration detector circuit 101. That is to say that the switch 103 is held on to maintain the first minimum nonconducting period $T_1$ when, as indicated from $t_2$ to $t_4$ in FIG. 8, the high state of the output $V_{17}$ from the flyback voltage duration detector circuit 101, or the duration $T_0$ of the flyback voltage, is longer than the first minimum nonconducting period $T_1$ lasting from $t_2$ to $t_3$.

Thereafter, when the high state of the output $V_{17}$ from the flyback voltage duration detector circuit 101, or the duration $T_0$ of the flyback voltage, becomes shorter than the first minimum nonconducting period $T_1$, as from $t_5$ to $t_6$ in FIG. 8, the switch 103 will go off, with the consequent setting of the second minimum nonconducting period $T_2$ as fro $t_5$ to $t_8$. At the time of transition from light to heavy load, the high state $T_0$ of the output $V_{17}$ from the flyback voltage duration detector circuit 101 will grow longer than the second minimum nonconducting period $T_2$, as from $t_{11}$ to $t_{13}$ in FIG. 8. The switch 103 will then be closed to set the first minimum nonconducting period determination reference voltage $V_{a1}$, with the result that the first minimum nonconducting period $T_1$ is set at $t_{13}$.

Should the reference voltage $V_a$ of the minimum nonconducting period determination reference voltage source 91 be held constant irrespective of the variable voltage requirement of the load, the nonconducting period $T_{off}$ and conducting periods $T_{on}$ of the switching device 3 might change irregularly, as has been explained previously.

In contrast, according to the invention, hysteresis operation is set in at the moments of reversal of the time relationship between the flyback voltage duration $T_0$ and the first or second minimum nonconducting period $T_1$ or $T_2$. A smooth switching is thus accomplished from a mode in which the nonconducting periods $T_{off}$ are limited by the minimum nonconducting period, and a mode in which they are not. Irregular variation in switching frequency is thus avoided.

The operation of FIG. 6 will occur if the converter is heavily loaded at the time of startup. When the switching device 3 is turned off at $t_1$ in FIG. 6, the capacitor 5 connected in parallel therewith will be charged, giving rise to a gradual increase in the voltage $V_1$ across the capacitor. The zero-voltage switching of the switching device 3 is thus accomplished, with consequent reduction of switching loss. Noise production at turnoff is also curtailed.

The nonconducting periods of the switching device 3 are determined by comparison of the sum signal $V_4$ with the first and the second reference voltage $V_{r1}$ and $V_{r2}$. When the output voltage $V_0$ exceeds the reference value, the output voltage of the voltage detector circuit 8 will increase, and so will the sum signal $V_4$. As a result, constituted of the voltage $V_2$ across the current detecting resistor 4 during the conducting periods $T_{on}$ and the output from the output voltage detector circuit 8, the sum signal $V_4$ in the form of a triangular wave will reach the reference voltage $V_1$ in a shorter period of time. The conducting periods $T_{on}$ of the switching device 3 will then become shorter, and less energy will be stored on the transformer 2, until the output voltage $V_0$ returns to normal.

The reversal of the foregoing operation will occur, resulting in longer conducting periods $T_{on}$, when the output voltage $V_0$ becomes less than normal. As the conducting periods $T_{on}$ change, so, in proportion, will the nonconducting periods $T_{off}$. The switching frequency changes for controlling the output voltage $V_0$. The switching device 3 turns on when the voltage $V_1$ across the same, or the drain-source voltage $V_{ds}$ drops to a minimum or thereabouts due to the resonance of the capacitor 5 and the inductance of the transformer primary 21. Thus is the zero-voltage switching of the device 3 accomplished when it is turned on, again resulting in less switching loss.

Both conducting periods $T_{on}$ and nonconducting periods $T_{off}$ of the switching device 3 will shorten in the event of a change in the load 26 from the heavy state of FIG. 6 in a lightening direction, that is, a direction in which the resistance value of the load increases. The high state of the output $V_{17}$ from the flyback voltage duration detector circuit 101, or the duration $T_0$ of the flyback voltage, will become less than the first minimum nonconducting period $T_1$. Then the second minimum nonconducting period $T_2$ will be set up, and the nonconducting periods $T_{off}$ will be prevented from becoming shorter than the second minimum nonconducting period $T_2$.

In the light load mode of FIG. 7 the switching device 3 will be prevented from turning on at $t_6$ when the sum signal $V_4$ first crosses the first reference voltage $V_{r1}$ following the release of the stored energy from the transformer 2; instead, the switching device 3 will turn on at $t_{10}$ which is one cycle of the resonance waveform later than $t_6$. The voltage $V_1$ across the switching device 3 is approximately zero at $t_{10}$ in FIG. 7, as at $t_6$, so that zero-voltage switching is accomplished for less switching loss.

In the event of further lessening of the load from that assumed in FIG. 7, the conducting periods $T_{on}$ of the switching device 3, as represented by the pulses of $V_{14}$, will get shorter. The periods $T_X$ from the start of the nonconducting periods to the end of the release of the stored energy will also grow shorter, and the pseudoresonance periods $T_y$ longer. The switching device 3 will be turned on at the first bottom of the resonance waveform following the end of each minimum nonconducting periods $T_2$.

The first disclosed embodiment of the invention gains the following advantages:

1. As the minimum nonconducting period $T_2$ is set up, the nonconducting periods of the switching device 3 do not become less than this minimum nonconducting period. The number of switchings per unit length of time is therefore reduced, and the mean value of the switching losses of the switching device 3 is also reduced, resulting in improvement of the efficiency of the converter under light load. The production of switching noise is also curtailed.

2. Switching between the first and the second minimum nonconducting periods $T_1$ and $T_2$ is effected by comparing these minimum nonconducting periods with the flyback voltage duration $T_0$, so that smooth transition is made between switching operation under the limitation of the second minimum nonconducting period $T_2$ and that not under its limitation. As a result, switching operation under the limitation of the second minimum nonconducting period is stabilized, and so is the constant-voltage control of the output voltage $V_0$. Irregular change in switching frequency is also restricted, so that noise production is easier to contain. The production of audible magnetostrictive noise from the transformer 2 is also preventable.

3. Despite the setting of the minimum nonconducting periods $T_1$ and $T_2$, switching loss is minimized by virtue of the zero-voltage turning-on of the switching device by pseudoresonance.

4. The switching frequency under light load can be held as low as less than 150 kilohertz (e.g. 100 kilohertz) even if the switching frequency under heavy or normal load is set relatively high. The minimum switching frequency under normal load can therefore be held relatively high. As loss at the transformer 2 is lessened, it can be reduced in size.

5. Being under the limitation of the second minimum nonconducting period $T_2$, the nonconducting periods $T_{off}$ under light load are relatively long, and so are the conducting periods $T_{on}$. In supplying given power to the load 26, an increase in the nonconducting periods $T_{off}$ leads to an increase in the conducting periods $T_{on}$. Longer conducting periods $T_{on}$ make it easier to distinguish between the current detection signal $V_2$ and the noise. In short the first comparator 46 has a greater noise margin. Additionally, in cases where no improvement in noise margin is desired, the conducting periods $T_{on}$ of the switching device 3 can be controlled over a greater range than heretofore.

6. As the sum signal $V_4$ is formed for introduction into the control circuit 13 of integrated circuit design, this control circuit need not have two independent input terminals for the first and second comparators 46 and 47. The integrated circuit is therefore simpler in construction, making possible the reduction of the manufacturing cost of the control circuit 13.

7. The output from the sawtooth generator circuit 72 is shared by the comparator 92 for minimum nonconducting period determination and the comparator 94 for maximum nonconducting period determination. The control circuit 13 is thus made simpler in construction, smaller in size, and less expensive of manufacture.

8. Being constituted of the two circuits 71 and 96 of logic circuit design, the control pulse forming circuit 50 is easier of fabrication.

Second Preferred Form

A second preferred form of dc-to-dc converter according to the invention will now be described with reference to FIG. 10. In this FIG. 10, as well as in FIGS. 11–31 showing third to twelfth embodiments of the invention, parts substantially similar to the parts shown in FIGS. 1–9 will be identified by like reference characters, and their description will be omitted. Further, in the course of the description of the second to twelfth embodiments of the invention, reference will be had as required to FIGS. 1–9.

Figure 10:
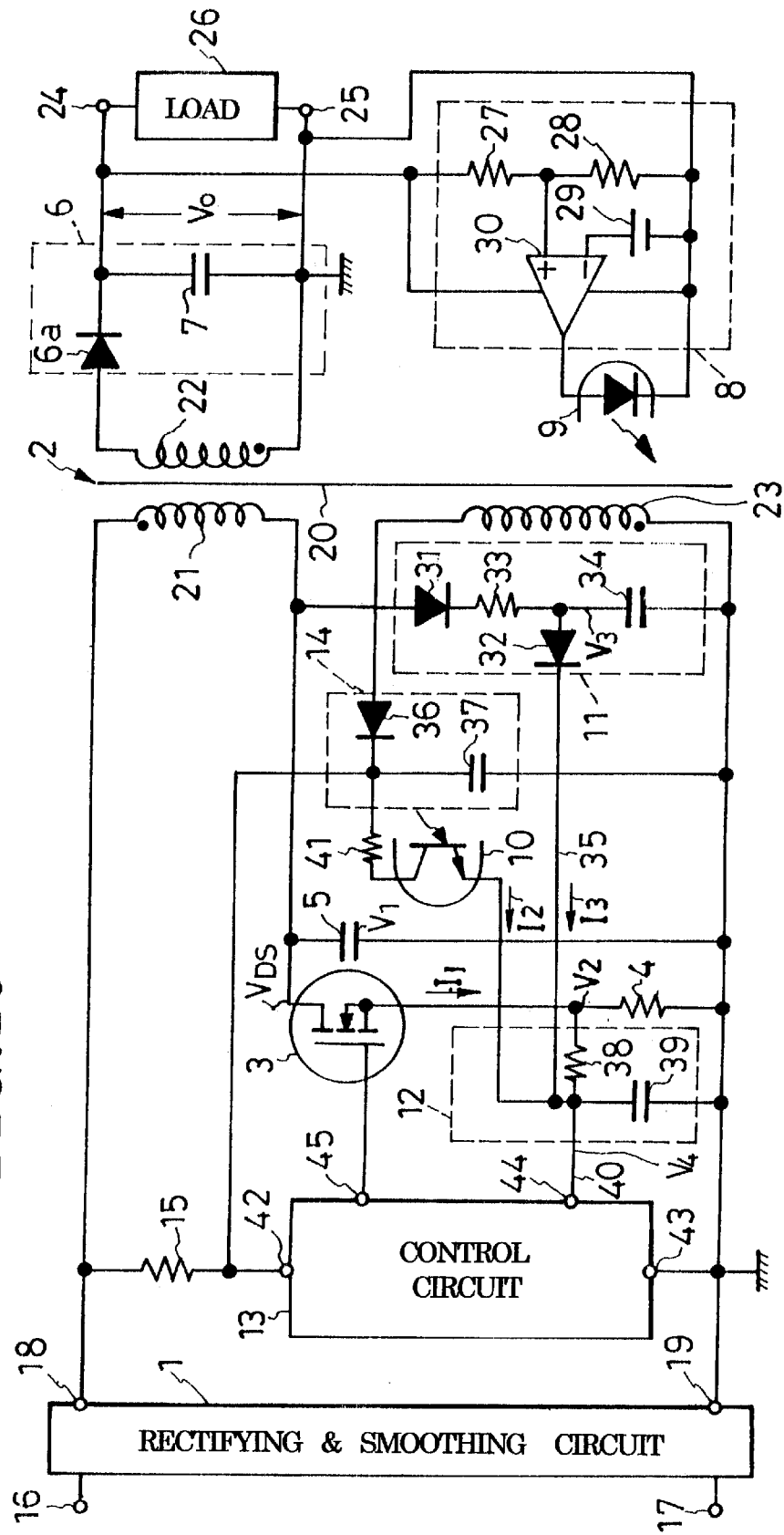
FIG. 10 is a circuit diagram of a second preferred form of dc-to-dc converter according to the invention.

The second preferred form of dc-to-dc converter shown in FIG. 10 is similar to the FIG. 1 converter except that the switch voltage detector circuit 11 is directly connected in parallel with the serial connection of the switching device 3 and the current-detecting resistor 4. The FIG. 10 converter is well adapted for applications where the voltage $V_1$ is low when the switching device 3 is off. If the voltage $V_1$ across the switching device 3 is high when it is off, either the resistor 33 of the switch voltage detector circuit 11 may be made higher, or the impedance of the FIG. 2 impedance switching circuit 53 when the switching device is off may be made lower. This second embodiment gains the same advantages as does the first.

Third Preferred Form

Figure 11:
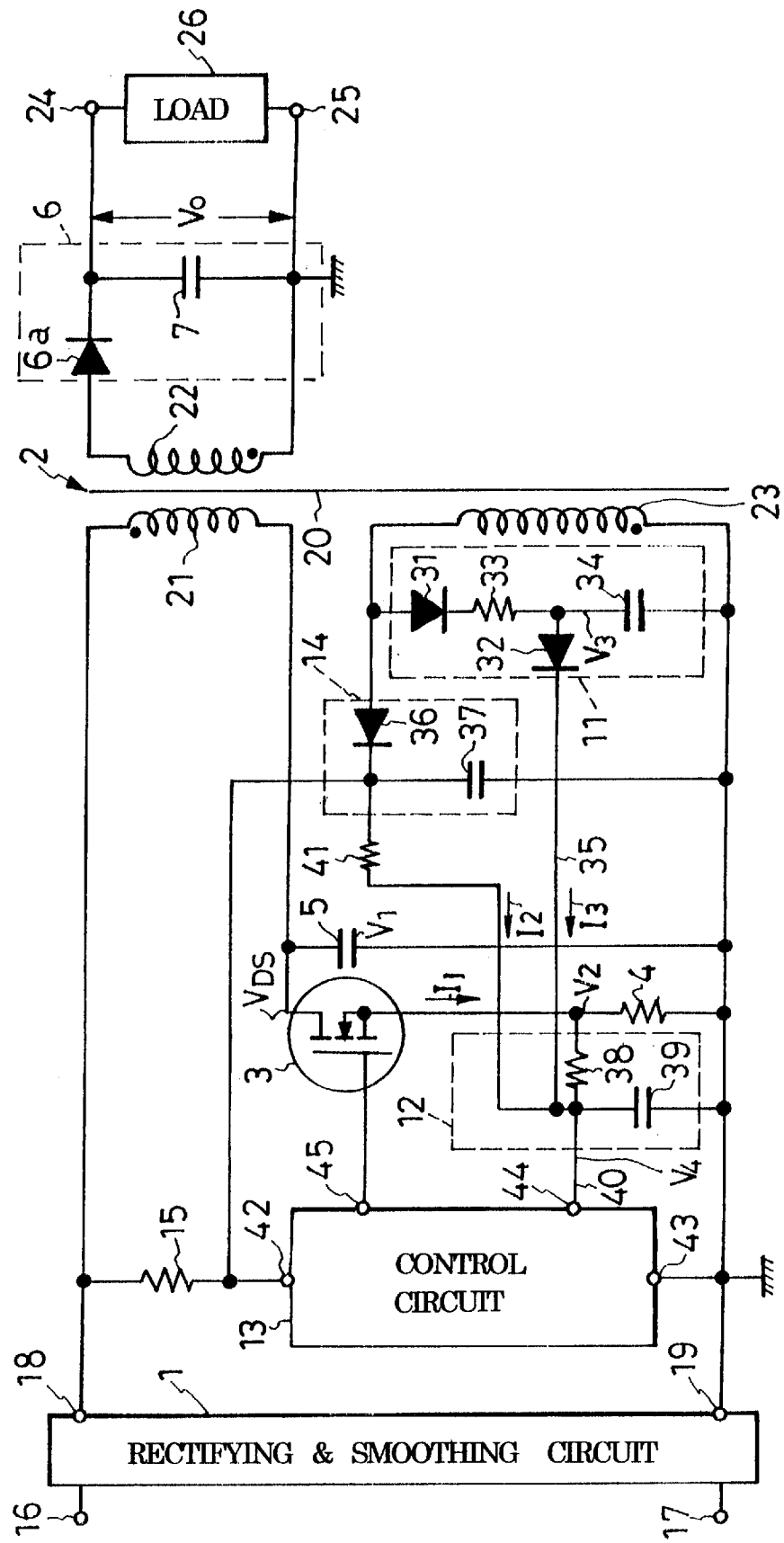
FIG. 11 is a circuit diagram of a third preferred form of dc-to-dc converter according to the invention.

The third preferred form of dc-to-dc converter shown in FIG. 11 is equivalent to the FIG. 1 converter except for the absence of the output voltage detector circuit 8, light-emitting diode 9, and phototransistor 10. The smoothing capacitor 37 of the control power supply is connected to the summing circuit 12 via the resistor 41. Being charged to a voltage proportional with the voltage across the output rectifying and smoothing capacitor 7 when the switching device 3 is off, the capacitor 37 will have a voltage approximately in proportion with the output voltage $V_0$. The output voltage $V_0$ is therefore detectable from the voltage across the capacitor 37.

In FIG. 11 the rectifying and smoothing circuit 14 and transformer tertiary 23 conjointly function as a control power supply and, additionally, as an output voltage detector circuit. The voltage across the capacitor 37 will be applied via the resistor 41 to the summing circuit 12 thereby to be formed into the sum signal $V_4$. The resistor 41 functions in this case for output voltage detection or as a part of the summing circuit 12. Thus, differing from the FIG. 1 embodiment only in the method of detecting the output voltage $V_0$, this third embodiment possesses the same advantages as the first.

Fourth Preferred Form

Figure 12:
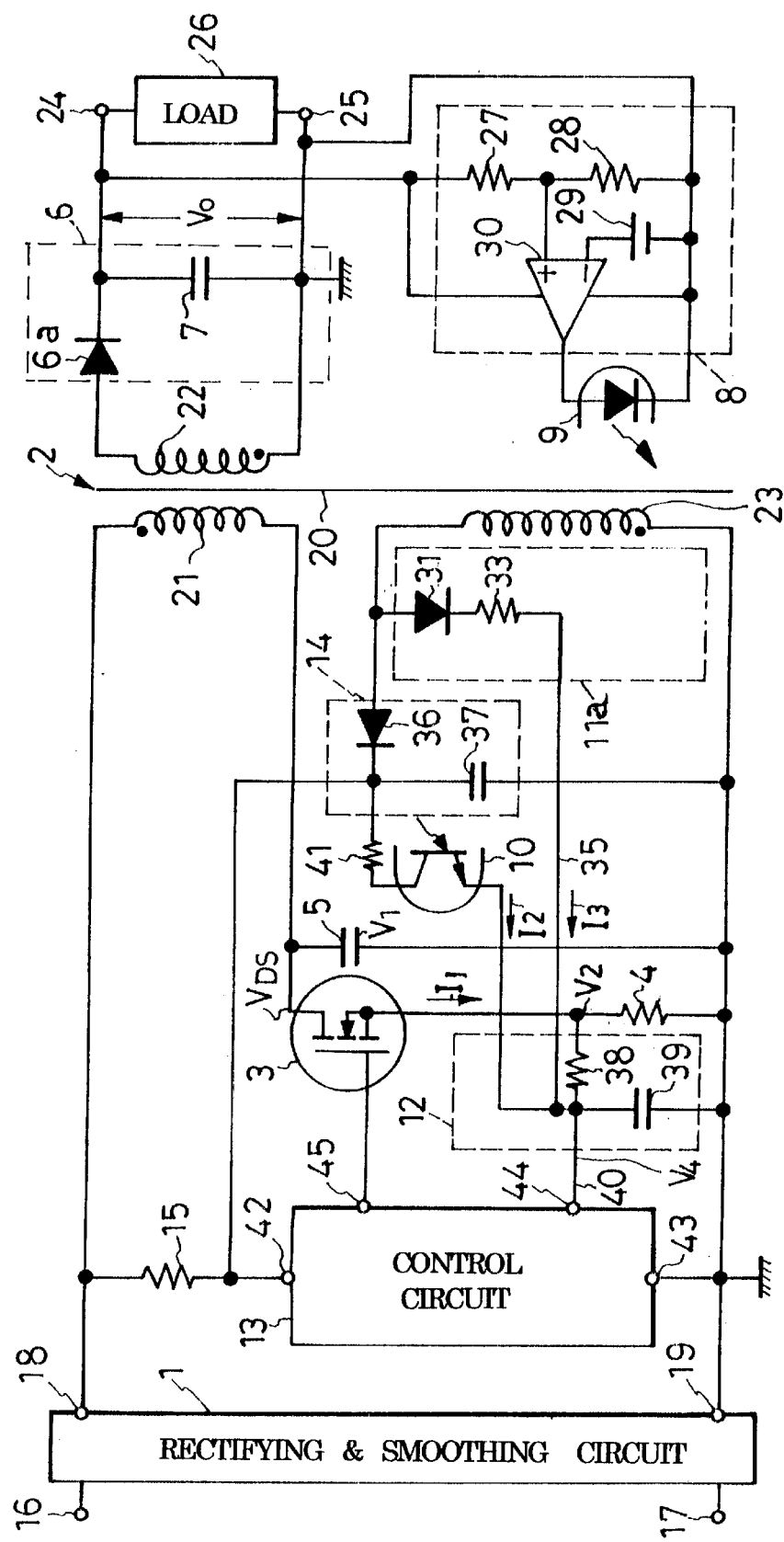
FIG. 12 is a circuit diagram of a fourth preferred form of dc-to-dc converter according to the invention.

In FIG. 12 is shown a fourth preferred form of dc-to-dc converter according to the invention, which is akin to the FIG. 1 converter in having a switch voltage detector circuit 11a that is similar in construction to the FIG. 1 switch voltage detector circuit 11 except for the absence of the diode 32 and the capacitor 34. The modified switch voltage detector circuit 11a is composed of the diode 31 and resistor 33, and the transformer tertiary 23 is connected to the summing circuit 12 via the diode 31 and resistor 33.

The delay due to the capacitor 34 of the FIG. 1 embodiment is not available in this FIG. 12 embodiment. However, there can be obtained the sum signal $V_4$ containing the delayed component of the voltage $V_1$ across the switching device 3 during its nonconducting periods by virtue of the stray capacitance of the modified switch voltage detector circuit 11a and of the capacitor 39 of the summing circuit 12.

Being akin to the FIG. 1 embodiment except for the switch voltage detector circuit 11a, the FIG. 12 embodiment possesses the same advantages therewith.

Fifth Preferred Form

Figure 13:
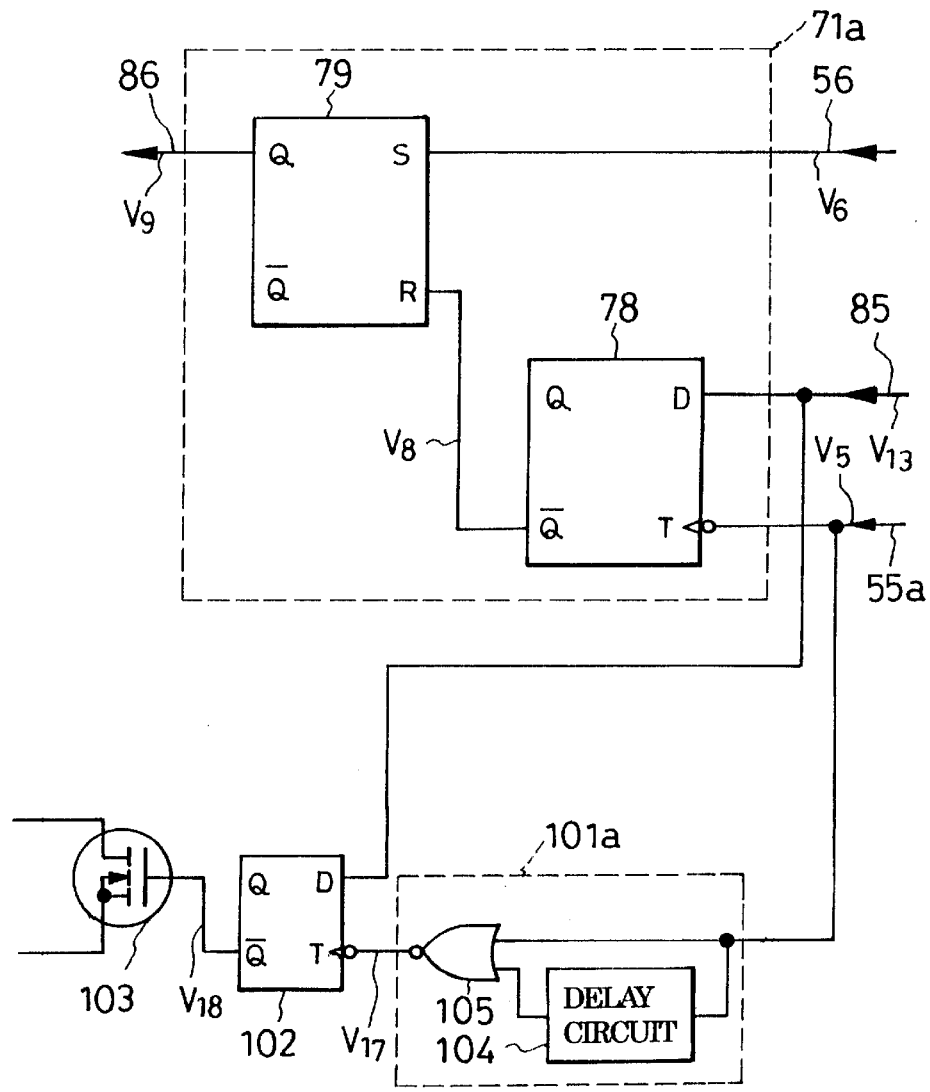
FIG. 13 is a circuit diagram of a conducting period terminating circuit and reference voltage switching circuit of a fifth preferred form of dc-to-dc converter according to the invention.
Figure 14:
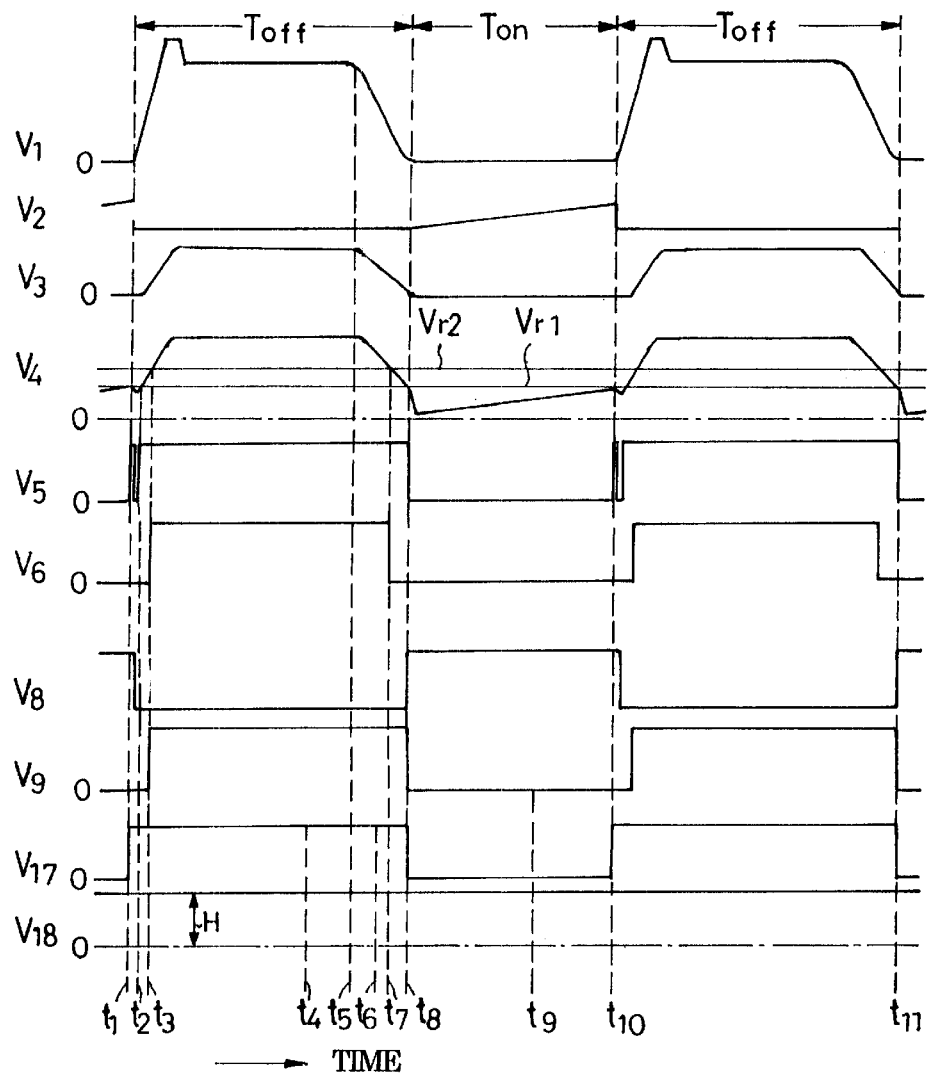
FIG. 14 is a waveform diagram showing the $V_1$, $V_2$, $V_3$, $V_4$, $V_5$ and $V_6$ of FIGS. 1 and 2 and the $V_8$, $V_9$, $V_{17}$ and $V_{18}$ of FIG. 13 when the fifth preferred form of dc-to-dc converter according to the invention is heavily loaded.
Figure 15:
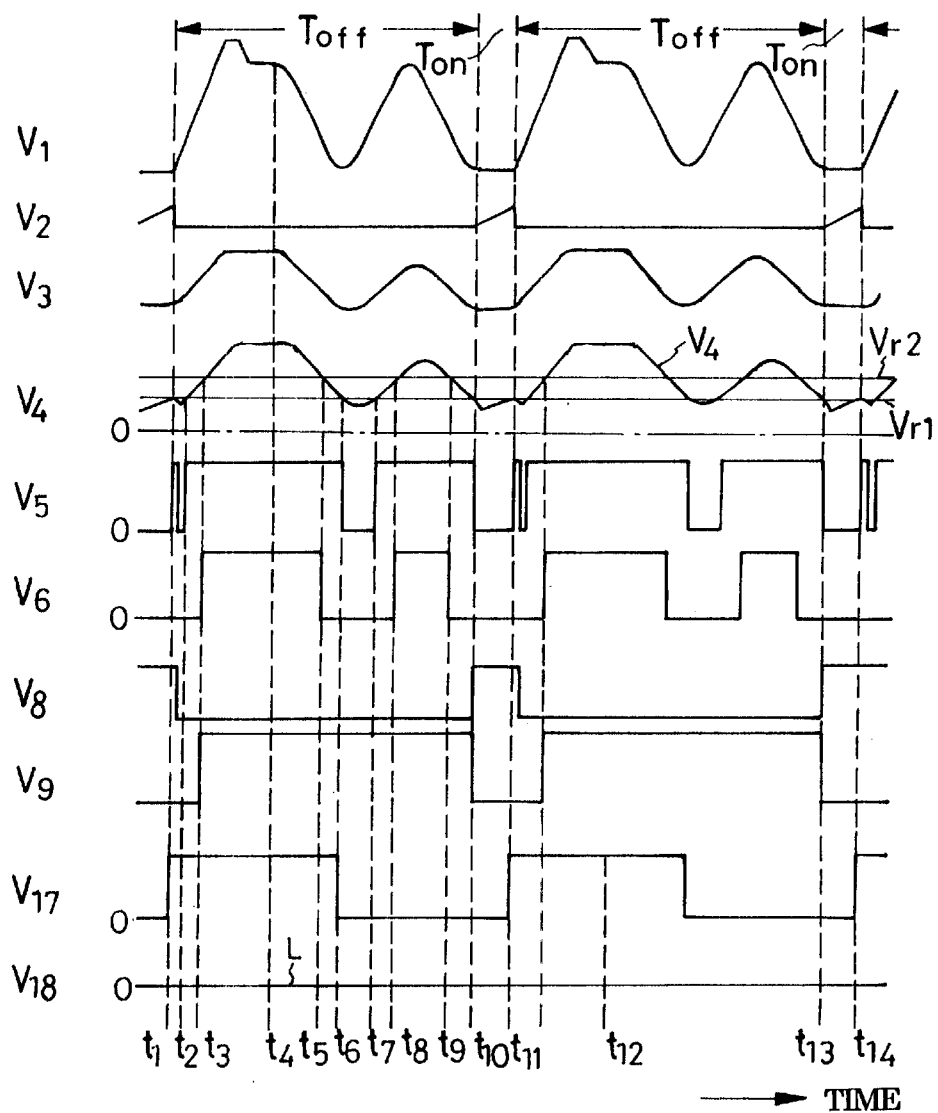
FIG. 15 is a waveform diagram showing the $V_1$, $V_2$, $V_3$, $V_4$, $V_5$ and $V_6$ of FIGS. 1 and 2 and the $V_8$, $V_9$, $V_{17}$ and $V_{18}$ of FIG. 13 when the fifth preferred form of dc-to-dc converter according to the invention is lightly loaded.

The fifth preferred form of dc-to-dc converter shown in FIG. 13 is similar to the FIG. 1 embodiment except that the first circuit 71 for nonconducting period termination and flyback voltage duration detector circuit 101 of the first embodiment are modified as shown at 71a and 101a, respectively, in FIG. 13.

The modified first circuit 71a for nonconducting period termination is similar to the FIG. 4 circuit 71 except for the absence of the wave-shaping circuit 77. Thus the modified circuit 71a comprises only the D flip-flop 78 and the flip-flop 79 with priority to resetting. The flip-flop 78 has a clock input T connected to the first comparator 46, FIG. 2, by way of a conductor 55a, and a data input D connected to the inverting output of the flip-flop 100, FIG. 5, by way of the conductor 85. Inputting the signal $V_{13}$ on the conductor 85 in synchronism with the trailing edges of the output pulses, shown at $V_5$ in FIGS. 14 and 15, from the first comparator 46, the flip-flop 78 puts out the signal $V_8$ from its inverting output. The other flip-flop 79 puts out the signal $V_9$ as in FIG. 4, for delivery to the nonconducting period pulse forming circuit 95, FIG. 5.

Comprising the delay circuit 104 and the NOR gate 105, the modified flyback voltage duration detector circuit I0la of FIG. 13 is similar to its FIG. 5 counterpart 100 except for the absence of the flip-flop 106 and the AND gate 107. The delay circuit 104 is connected to the conductor 55a for imparting a slight delay to the output $V_5$ from the first comparator 46. The NOR gate 105 has one input connected directly to the first comparator output conductor 55a, and another input to the delay circuit 104. Thus, as shown in both FIGS. 14 and 15, the NOR gate 105 provides the flyback detection signal $V_{17}$ similar to that shown in FIGS. 6 and 7.

This fifth embodiment offers the advantage of greater simplicity in the constructions of the first circuit 71a for nonconducting period termination and the flyback voltage duration detector circuit 101a, in addition to the advantages set forth in connection with the first embodiment. However, this embodiment does not suit extremely high switching frequency applications, but does suit rather low frequency applications, as it uses the trailing edges of the first comparator output pulses $V_5$, as at $t_1$ and $t_{10}$ in FIG. 14 and $t_1$. $t_{11}$ and $t_{14}$ in FIG. 15.

Sixth Preferred Form

Figure 16:
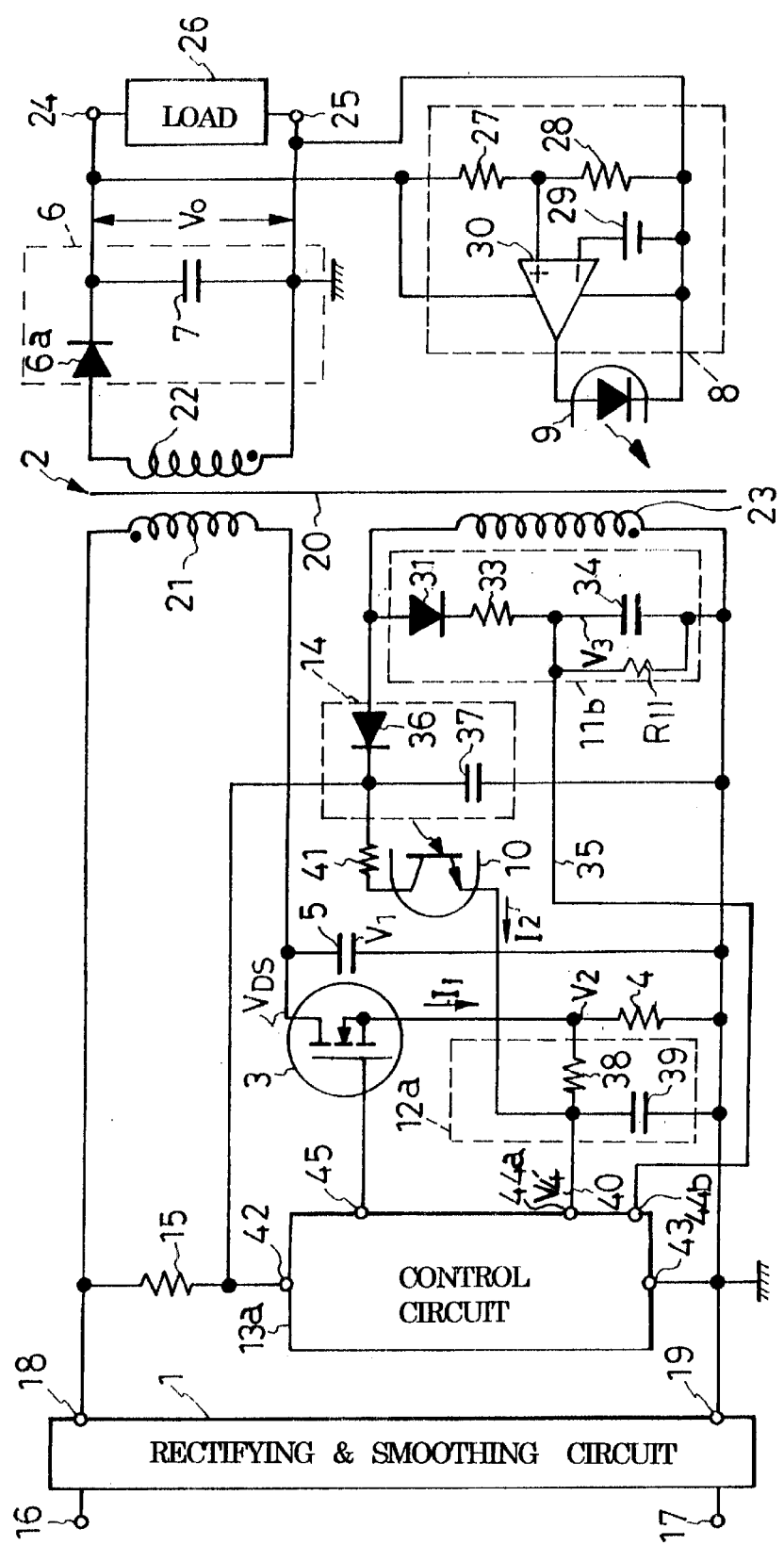
FIG. 16 is a circuit diagram of a sixth preferred form of dc-to-dc converter according to the invention.

The sixth preferred form of dc-to-dc converter shown in FIG. 16 differs from the FIG. 1 embodiment in having a modified summing circuit 12a, a modified control circuit 13a, and a modified switch voltage detector circuit 11b. The modified summing circuit 12a does not have the modified switch voltage detector circuit 11b connected thereto. As a result, the modified summing circuit 12a puts out a modified sum signal $V_4'$ indicative of the sum of the current detection signal $V_2$ from the current detecting resistor 4 and the output from the voltage detector circuit 8, for delivery to the terminal 44a of the modified control circuit 13a. The output conductor 35 of the modified switch voltage detector circuit 11b is connected to the terminal 44b, newly introduced here, of the control circuit 13a. This switch voltage detector circuit 11b is analogous with the FIG. 1 switch voltage detector circuit 11 except for the absence of the diode 32 and the connection of a discharge resistor $R_{11}$ in parallel with the capacitor 34.

Figure 17:
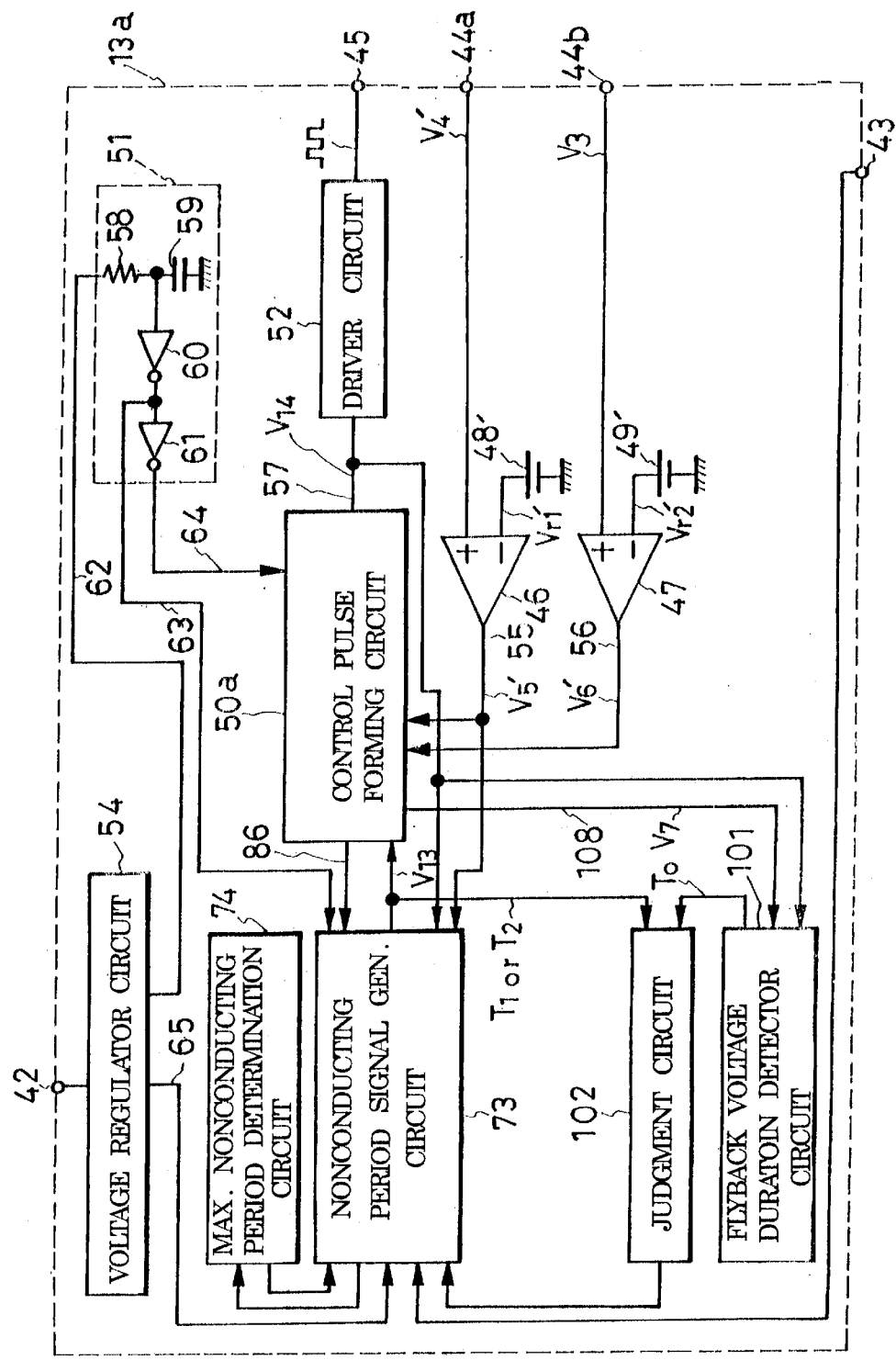
FIG. 17 is a block diagram showing in more detail the control circuit of FIG. 16.

As illustrated in more detail in FIG. 17, the modified control circuit 13a is similar to the FIG. 2 control circuit 13 except that the impedance change circuit 53 is omitted, that the positive input of the first comparator 46 is connected to a terminal 44a, that the positive input of the second comparator 47 is connected to another terminal 44b, which is newly introduced here, and that a slightly modified control pulse forming circuit 50a is provided in place of the FIG. 2 circuit 50. Additionally, in FIG. 17, an impedance change circuit or circuits similar to the FIG. 2 circuit 53, may be provided between the input terminal 44a and the ground and/or between the input terminal 44b and the ground.

Figure 19:
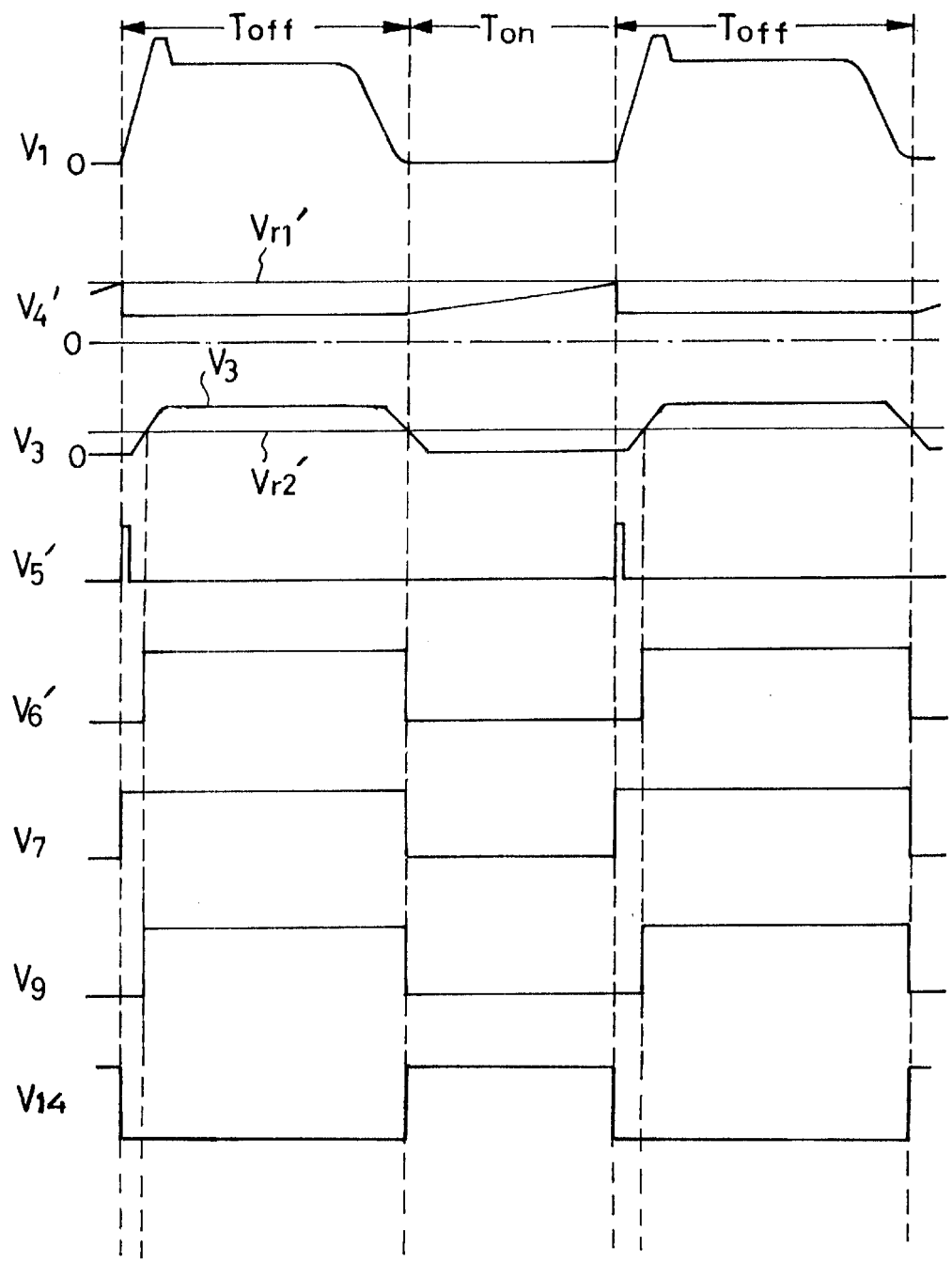
FIG. 19 is a waveform diagram of the voltages appearing at various parts of FIGS. 16–18 when the sixth preferred of dc-to-dc converter according to the invention is heavily loaded.
Figure 20:
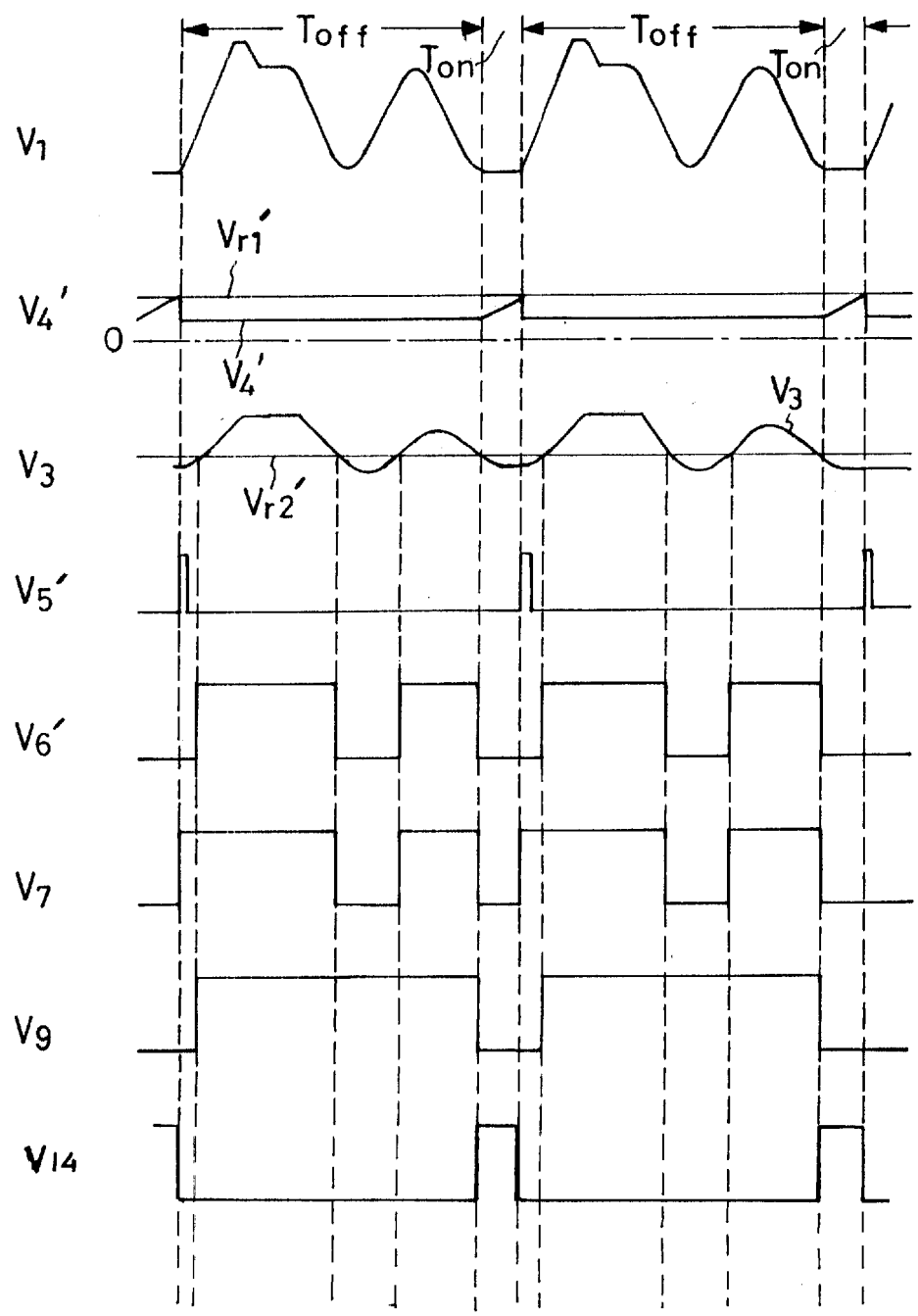
FIG. 20 is a waveform diagram of the voltages appearing at various parts of FIGS. 16–18 when the sixth preferred of dc-to-dc converter according to the invention is lightly loaded.

As is apparent from both FIG. 19, which shows the voltage waveforms appearing in various parts of the FIG. 17 converter when it is heavily loaded, and FIG. 20, a similar waveform diagram when the converter is lightly loaded, the first comparator 46 compares the sawtooth-like sum signal $V_4'$ and the first reference voltage $V_{r1}'$ and provides a first comparator output $V_5'$. This first comparator output $V_5'$ contains pulses indicative of the ends of the conducting periods $T_{on}$ of the switching device 3.

The second comparator 47 compares the switch voltage signal $V_3$ and the second reference voltage $V_{r2}'$ from the source 49' and produces an output $V_6'$. As is also apparent from FIGS. 19 and 20, the trailing edges of the pulses contained in the output $V_6'$ from the second comparator 47 indicates the moments the voltage $V_1$ across the switching device 3 drops close to zero.

Figure 18:
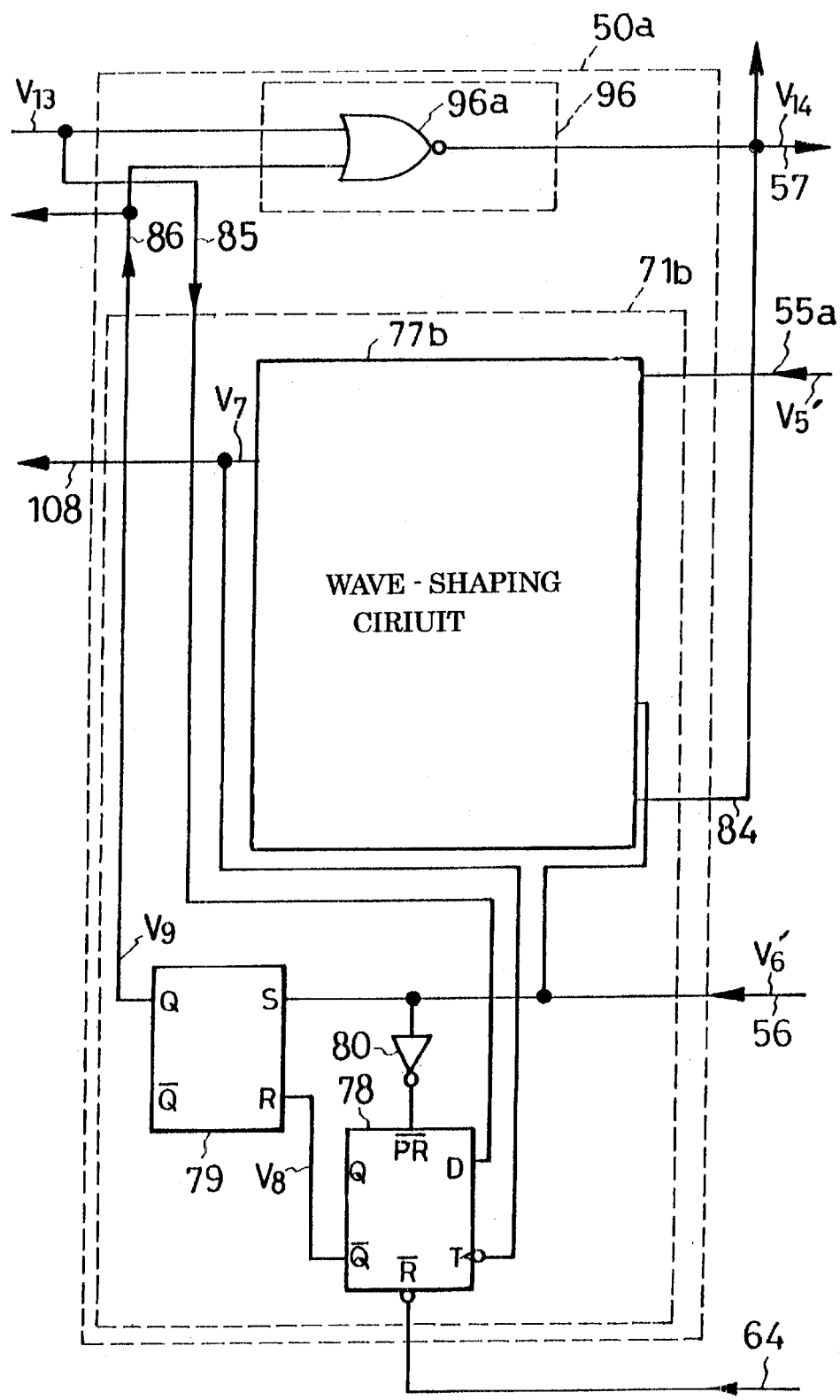
FIG. 18 is a block diagram showing in more detail the nonconducting period terminating circuit included in the pulse generator circuit of FIG. 17.

The modified control pulse forming circuit 50a of FIG. 17 is similar to its FIG. 3 counterpart 50 except that the first circuit 71 for nonconducting period termination, included in the FIG. 3 circuit 50, is modified as indicated at 71b in FIG. 18. The modified first circuit 71b is similar to its FIG. 4 counterpart 71 except for having a modified wave-shaping circuit 77b. The modified wave-shaping circuit 77b is designed to provide the output $V_7$ of FIGS. 19 and 20 in response to the first and the second comparator outputs $V_5'$ and $V_6'$ of FIGS. 19 and 20 and the control pulses $V_{14}$ over the conductor 84, FIG. 5. Being identical with the FIGS. 6 and 7 waveform $V_7$, the FIGS. 19 and 20 waveform $V_7$ can be utilized as in the first disclosed embodiment of the invention. Thus, except for the addition of the input terminal 44b, this sixth embodiment offers the same advantages as the first.

FIG. 19 shows the waveforms of the signals $V_1$, $V_4'$, $V_3$, $V_5'$, $V_6'$, $V_7$, $V_9$ and $V_{14}$ of the FIGS. 16–18 embodiment just like their FIG. 6 counterparts, when the FIG. 16 converter is heavily loaded. FIG. 20 shows the waveforms of the same signals $V_1$. $V_4'$, $V_3$, $V_5'$, $V_6'$, $V_7$, $V_9$ and $V_{14}$ of the FIGS. 16–18 embodiment just like their FIG. 7 counterparts, when the FIG. 16 converter is lightly loaded. The ends of the conducting periods $T_{on}$ of the switching device 3 are determined by the pulses of the signal $V_5'$. The beginnings of the conducting periods $T_{on}$, or the ends of the nonconducting periods $T_{off}$ on the other hand, are determined when the nonconducting period termination signal $V_9$ goes low after the first minimum nonconducting period $T_1$ or second minimum nonconducting period $T_2$ which has been determined as in the first disclosed embodiment by the minimum nonconducting period determination comparator 92.

Having the first and second minimum nonconducting periods $T_1$ and $T_2$ as in the first disclosed embodiment, the sixth preferred form of dc-to-dc converter provides the same advantages therewith.

Seventh Preferred Form

A seventh preferred form of dc-to-dc converter will now be described with reference to FIGS. 21–26. As will be understood from a comparison of FIGS. 1 and 21, the seventh preferred form differs from the first in not having the summing circuit 12 and having a modified control circuit 13b and a modified switch voltage detector circuit 11b. The modified control circuit 13b has a voltage feedback control signal input terminal 44a', a switch voltage detection signal input terminal 44b, and a current detection signal input terminal 44c. Connected to the phototransistor 10, the voltage feedback control signal input terminal 44a' inputs a current signal $I_2$ indicative of the voltage $V_0$ between the pair of dc output terminals 24 and 25. The switch voltage detection signal input terminal 44b is equivalent to that indicated by the same reference characters in FIG. 16, being connected to the switch voltage detector circuit 11b of the same construction as in FIG. 16. The current detection signal input terminal 44c is connected to the current detecting resistor 4 for inputting the voltage $V_2$ across the same for protection from overcurrent.

Figure 22:
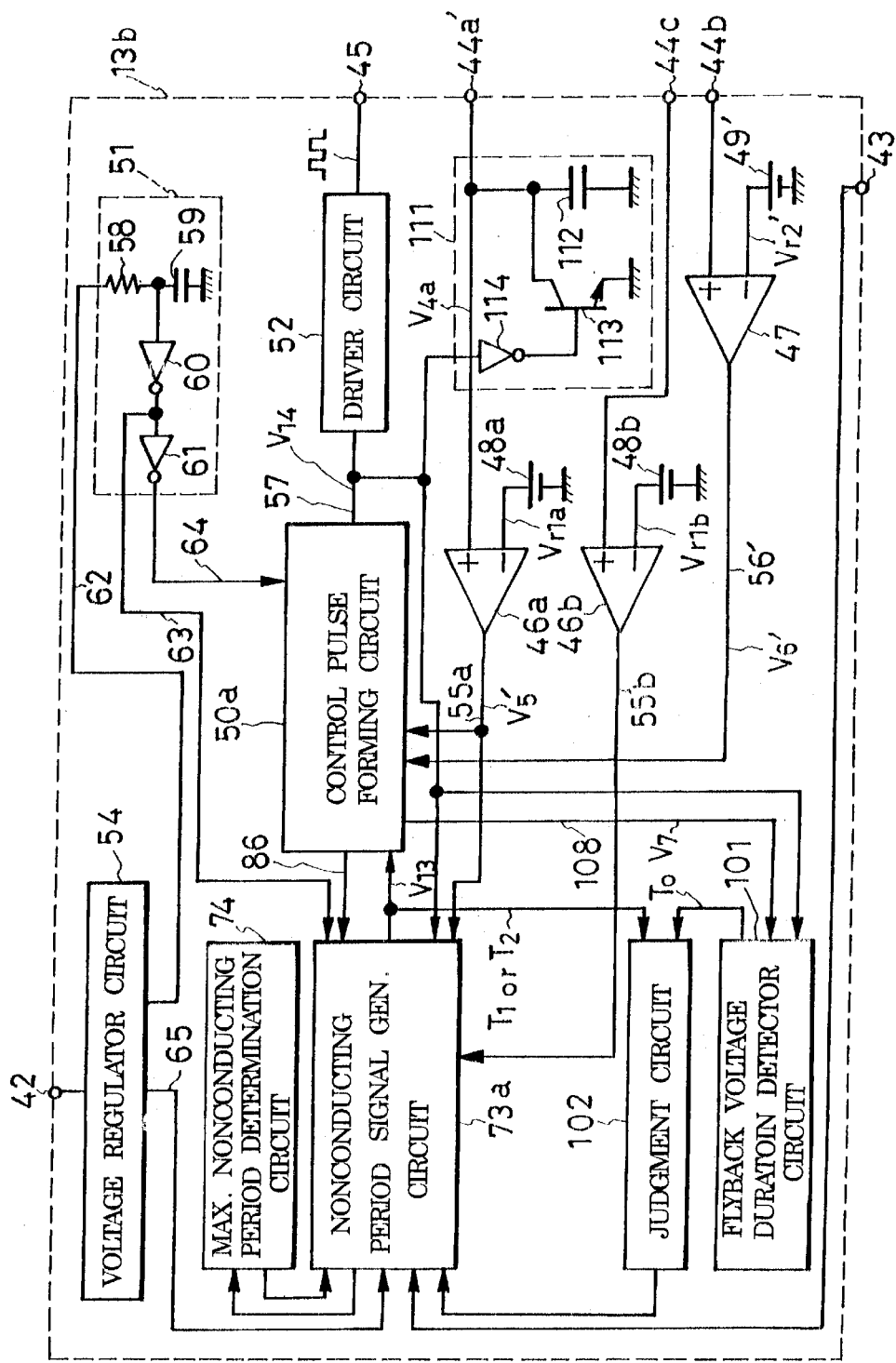
FIG. 22 is a circuit diagram showing in more detail the control circuit of FIG. 21.

The modified control circuit 13b is constructed as drawn in FIG. 22. This circuit 13b is similar to its FIG. 17 counterpart 13a in having a comparator 46a for conducting period termination and a comparator 46b for overcurrent protection in substitution for the comparator 46 of the FIG. 17 control circuit 13a, and in further having a sawtooth generator circuit 111 for conducting period termination and a modified nonconducting period signal generator circuit 73a. Like its FIG. 17 counterpart, the FIG. 22 comparator 47 for nonconducting period termination is connected to the switch voltage detection signal input terminal 44b for the same purpose therewith.

The sawtooth generator circuit 111 for nonconducting period termination comprises a capacitor 112, a discharge switch 113, and a NOT circuit 114. Connected to the voltage feedback control signal input terminal 44a, the capacitor 112 is charged by the current $I_2$ supplied through the phototransistor 10, FIG. 21. The current $I_2$ is proportional to the output voltage $V_0$, so that the capacitor 112 is charged at a rate depending upon the output voltage.

Connected in parallel with the capacitor 112, the discharge switch 113 in the form of a transistor has its control terminal or base connected via the NOT circuit 114 to the conductor 57 over which is supplied the switch control signal indicated at $V_{14}$ in FIG. 6. The transistor 113 is therefore nonconductive during the conducting periods $T_{on}$ of the switching device 3 and conductive during its nonconducting periods $T_{off}$. The capacitor 112 is discharged, and prevented from being charged, during the conducting periods of the switch 113. During the nonconducting periods of the switch 113, on the other hand, the capacitor 112 is gradually charged with the current $I_2$ supplied through the phototransistor 10 of FIG. 21. The voltage $V_{4a}$ across the capacitor 112 is therefore sawtooth-shaped.

The comparator 46a for conducting period termination has its positive input connected to the capacitor 112, and its negative input to the first reference voltage source 48a. Therefore, comparing the sawtooth voltage $V_{4a}$ across the capacitor 112, and the first reference voltage $V_{r1a}$ from the source 48a, both as plotted in FIGS. 25 and 26, the comparator 46a generates pulses, indicated at $V_5'$ in FIGS. 25 and 26, when the sawtooth voltage $V_{4a}$ rises to the reference voltage $V_{r1a}$. These pulses $V_5'$ are used for terminating the conducting periods of the switching device 3. The capacitor 112 will be charged relatively quickly when the output voltage $V_0$ is higher than the reference voltage, so that the voltage $V_{4a}$ across the capacitor 112 will reach the reference voltage $V_{r1a}$ as quickly, resulting in a shorter conducting period $T_{on}$ of the switching device 3. A reversal of this procedure will occur when the output voltage $V_0$ is less than the reference voltage. It is thus seen that the voltage $V_{4a}$ across the capacitor 112, FIG. 22, performs the same functions as does the sum signal $V_4$ of the FIG. 1 embodiment.

The comparator 46b for overcurrent prevention has its positive input connected to the current detection signal input terminal 44c, and its negative input to the source 48b of the reference voltage $V_{r1b}$. This reference voltage $V_{r1b}$ is set higher than the peak detection voltage $V_2$ of the current flowing through the switching device 3 under rated load. When the current detection signal grows higher than the reference voltage $V_{r1b}$, the comparator 46b will go high, indicating overcurrent. The high output will be directed by way of the conductor 55b to the pulse generator circuit 50b.

Figure 21:
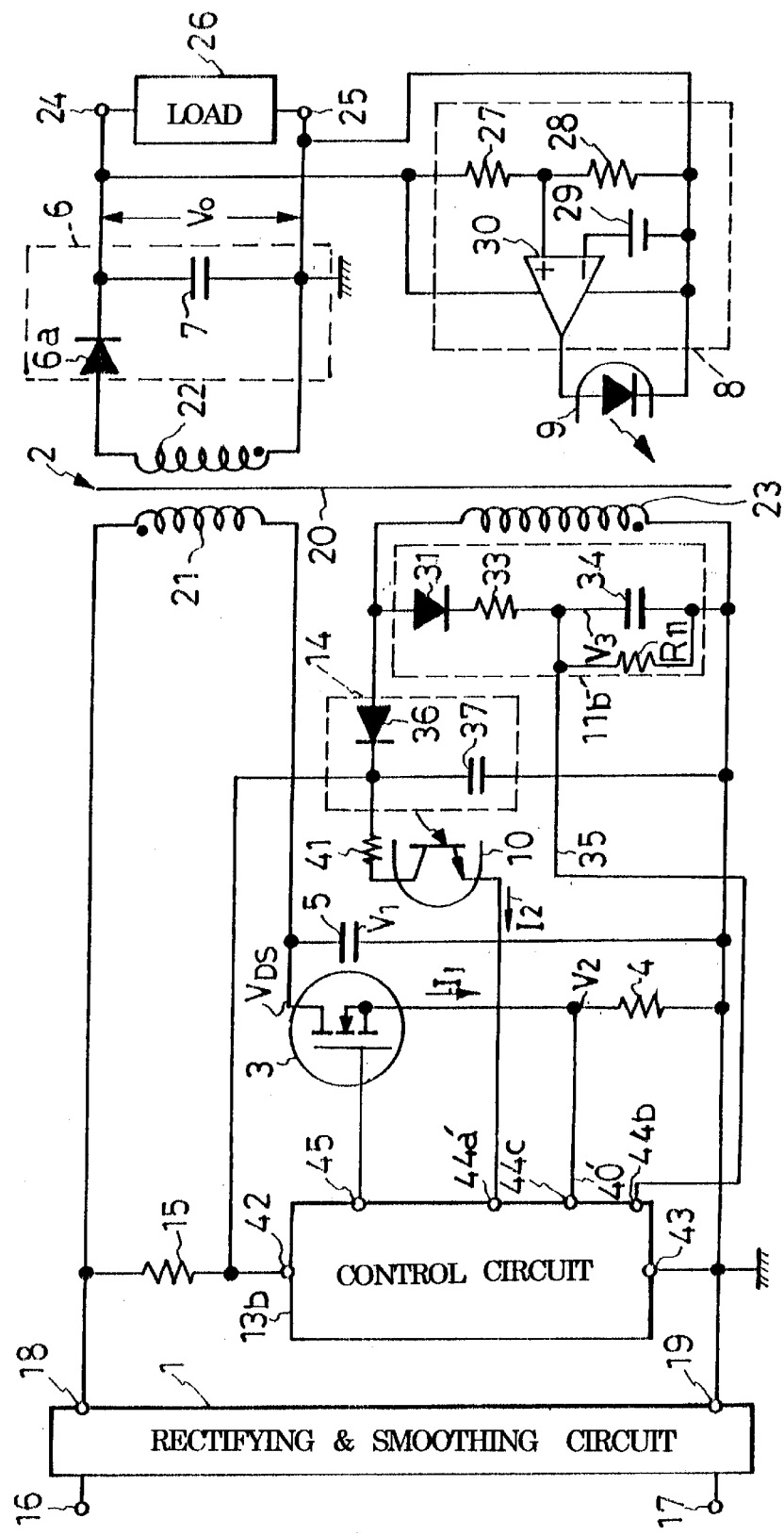
FIG. 21 is a circuit diagram of a seventh preferred form of dc-to-dc converter according to the invention.
Figure 23:
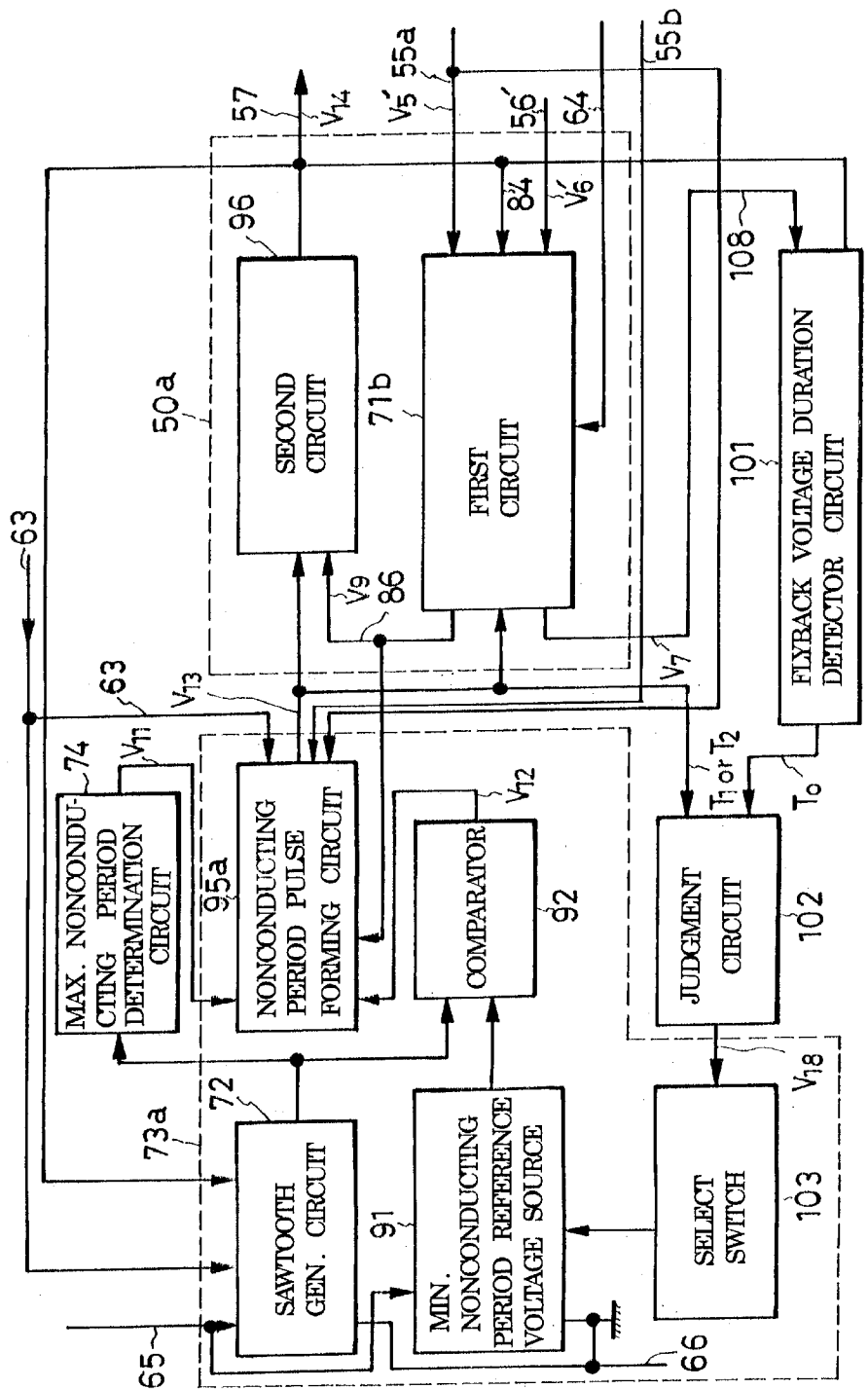
FIG. 23 is a block diagram showing in more detail the pulse generator circuit of FIG. 22.

FIG. 23 shows the same parts of the FIG. 21 converter as FIG. 3 does of the FIG. 1 converter. The control pulse forming circuit 50a shown in this figure is of the same construction as that identified by the same reference characters in FIGS. 17 and 18. The first circuit 71b for nonconducting period termination is of the same construction as that identified by the same reference characters in FIG. 18.

The nonconducting period signal generator circuit 73a, FIG. 23, is similar to its FIG. 3 counterpart 73 except for having a nonconducting period pulse forming circuit 95a which is a modification of the FIG. 3 nonconducting period pulse forming circuit 95. The modified nonconducting period pulse forming circuit 85a has two conductors 55a and 55b connected thereto instead of the conductor 55 of FIG. 3.

Figure 24:
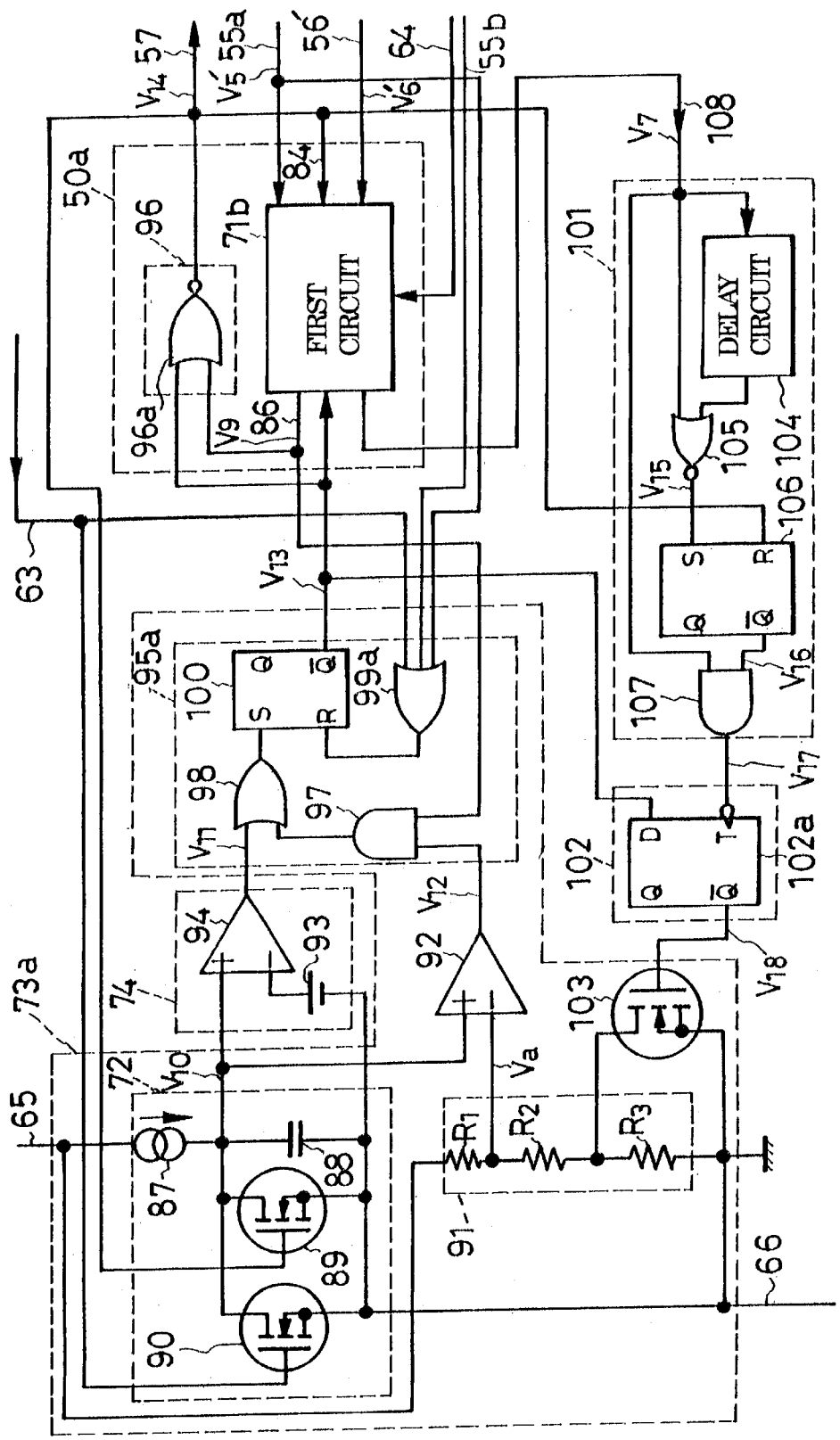
FIG. 24 is a circuit diagram showing in more detail the sawtooth generator circuit, minimum nonconducting period determination circuit, maximum nonconducting period determination circuit, control pulse forming circuit, and reference voltage switching circuit of FIG. 23.

As illustrated in more detail in FIG. 24, which shows parts similar to those shown by FIG. 5, the nonconducting period pulse forming circuit 95a is similar to its FIG. 5 counterpart except that the two-input OR gate 99 of FIG. 5 is replaced by a three-input OR gate 99a. The OR gate 99a has a first input connected to the conductor 63 as in FIG. 5, a second input connected to the conductor 55a over which is sent the signal $V_5'$ indicative of the termination of the conducting periods, and a third input connected to the overcurrent detection signal conductor 55b. The conductor 55a is connected to the comparator 46a, FIG. 22, and the conductor 55b to the comparator 46b, FIG. 22. The OR gate 99a will reset the flip-flop 100 when either of its three inputs is high.

Figure 25:
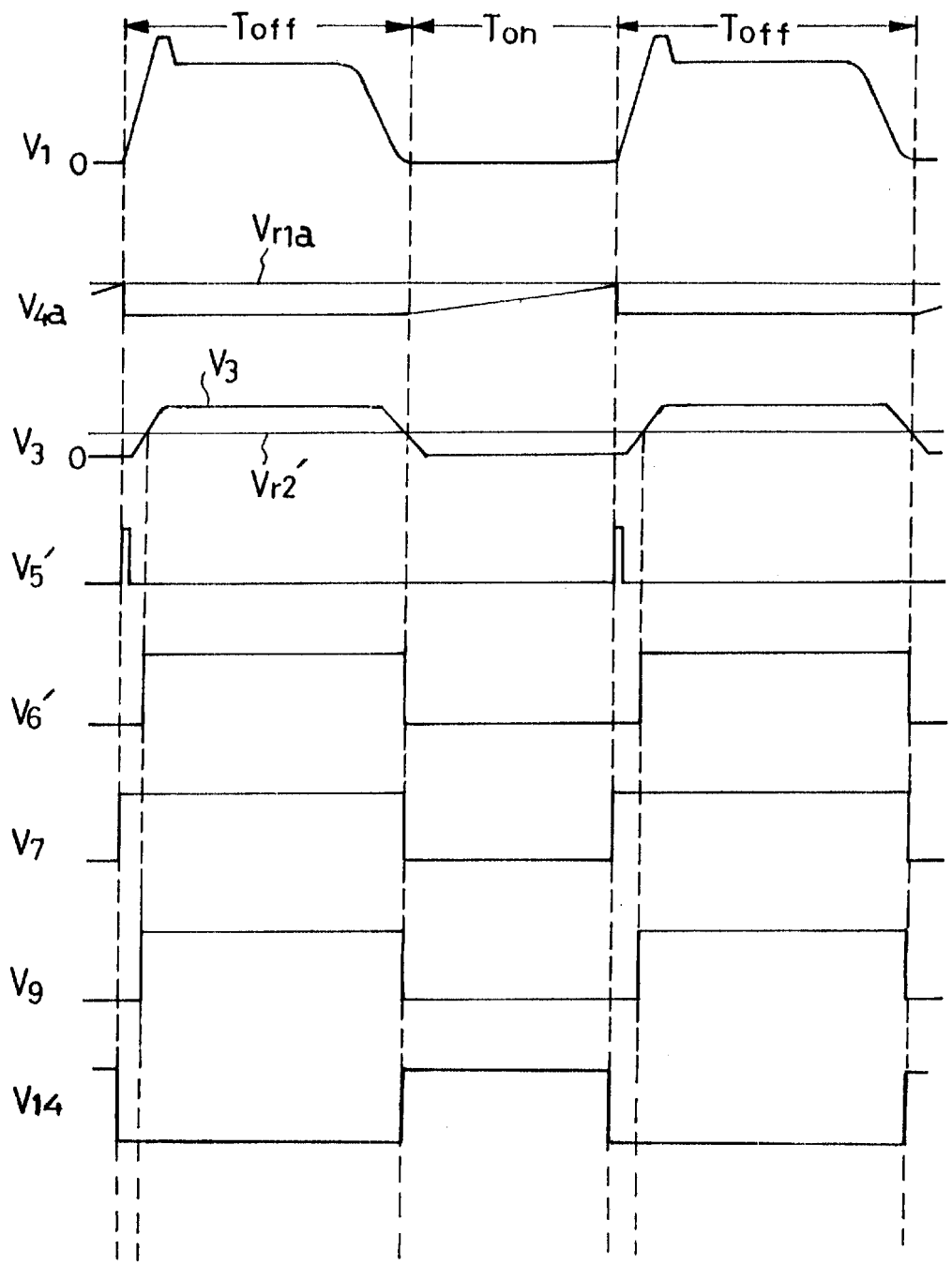
FIG. 25 is a waveform diagram of the voltages indicated at $V_1$, $V_{4a}$, $V_3$, $V_5'$, $V_6'$, $V_7$, $V_9$ and $V_{14}$ of FIGS. 21–24 when the dc-to-dc converter of FIG. 21 is heavily loaded.
Figure 26:
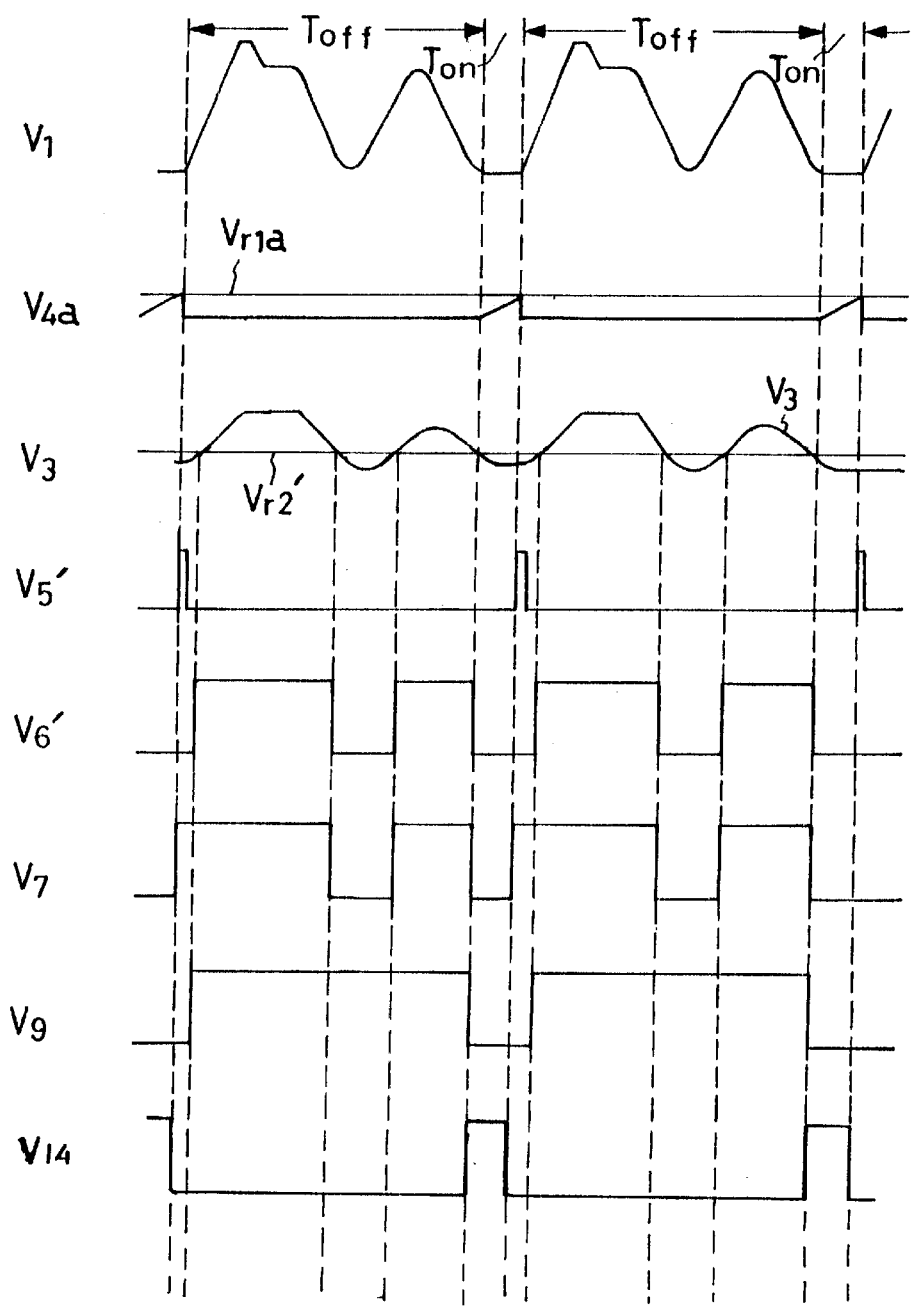
FIG. 26 is a waveform diagram of the voltages indicated at $V_1$, $V_{4a}$, $V_3$, $V_5'$, $V_6'$, $V_7$, $V_9$ and $V_{14}$ of FIGS. 21–24 when the dc-to-dc converter of FIG. 21 is lightly loaded.

FIG. 25 shows, as does FIG. 6, the waveforms $V_1$, $V_{4a}$, $V_3$, $V_5'$, $V_6'$, $V_7$, $V_9$ and $V_{14}$ appearing in various parts of the FIGS. 21–24 embodiment when the load 26 is heavy. FIG. 26 similarly shows the waveforms $V_1$, $V_{4a}$, $V_3$, $V_5'$, $V_6'$, $V_7$, $V_9$ and $V_{14}$ appearing in various parts of the FIGS. 21–24 embodiment when the load 26 is light. The ends of the conducting periods $T_{on}$ of the switching device 3 are determined by the pulses of the signal $V_5'$. The beginnings of the conducting periods $T_{on}$, or the ends of the nonconducting periods $T_{off}$, are each determined when the nonconducting period termination signal $V_9$ goes low after the end of the first minimum nonconducting period $T_1$ or second minimum nonconducting period $T_2$ that has been determined by the nonconducting period signal generator circuit 73 as in the first embodiment of the invention.

The seventh preferred form of dc-to-dc converter has the first and the second minimum nonconducting period $T_1$ and $T_2$ like the first preferred form, so that it possesses the same advantages therewith.

Eighth Preferred Form

Figure 27:
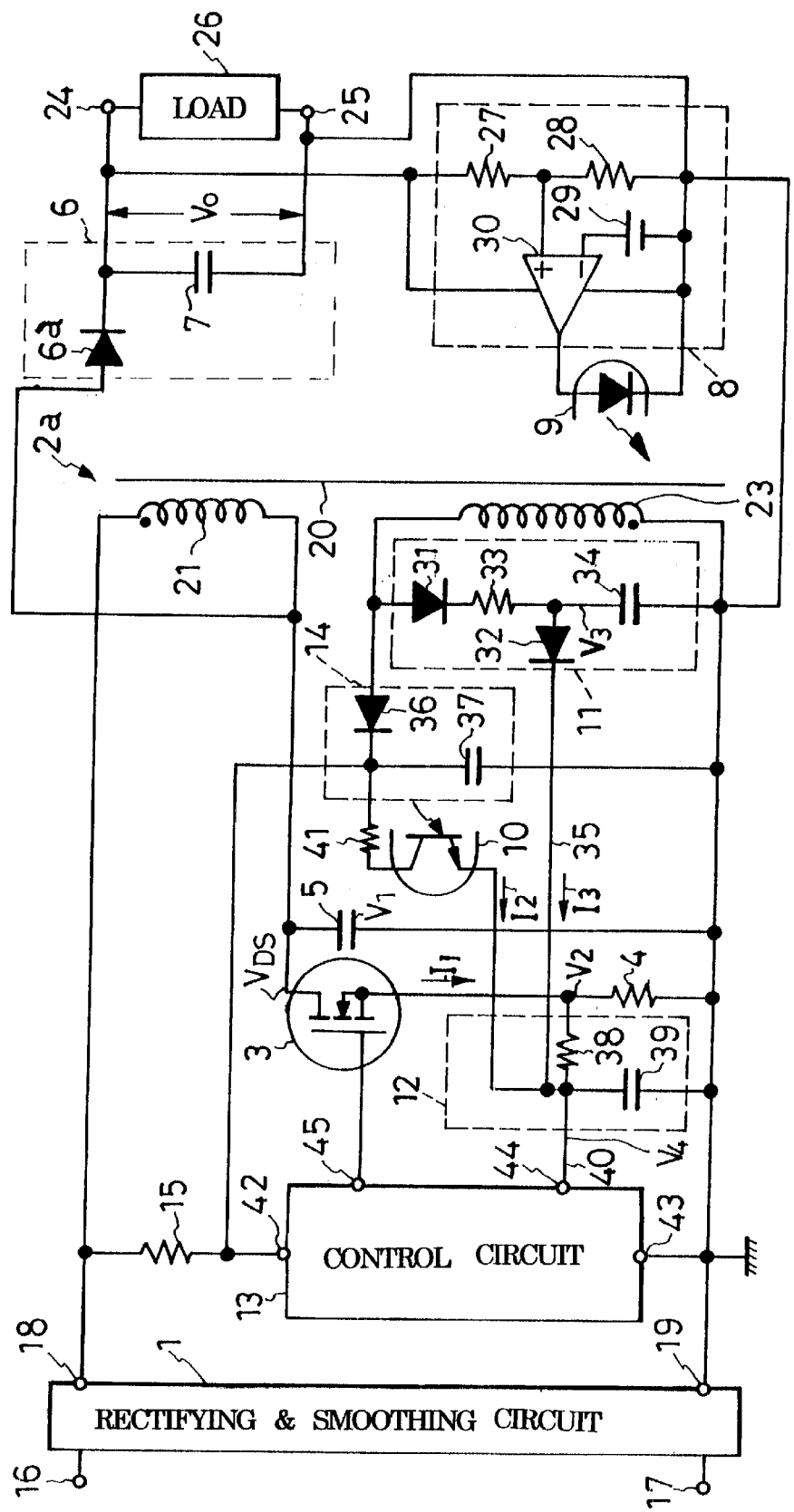
FIG. 27 is a circuit diagram of an eighth preferred form of dc-to-dc converter according to the invention.

FIG. 27 shows an eighth preferred form of dc-to-dc converter according to the invention, which differs from the FIG. 1 converter in having a reactor 2a in place of the transformer 2 and in not having an equivalence of the transformer secondary 22. The output rectifying and smoothing circuit 6 is connected in parallel with the switching device 3 in order that the energy stored on the primary winding 21 during the conducting periods of the switching device 3 may be supplied to the load 26 during the nonconducting periods of the switching device. Energy is stored on the reactor 2a during the conducting periods of the switching device 3 as then the output rectifying diode 6 is reverse biased. During the nonconducting periods of the switching device 3, on the other hand, the output rectifying diode 6 is forward biased with the consequent release of the stored energy from the reactor 2a. The capacitor 7 is thus charged with the sum of the dc voltage of the rectifying and smoothing circuit 1 and the voltage of the primary winding 21. In short this dc-to-dc converter acts as a step-up switching regulator.

The FIG. 27 converter has the same control circuit 13 as that of the first disclosed embodiment and so gains the same advantages therewith. The control circuit 13 of FIG. 27 is replaceable by either of the control circuits 13a and 13b of the sixth an the seventh embodiment.

Ninth Preferred Form

Figure 28:
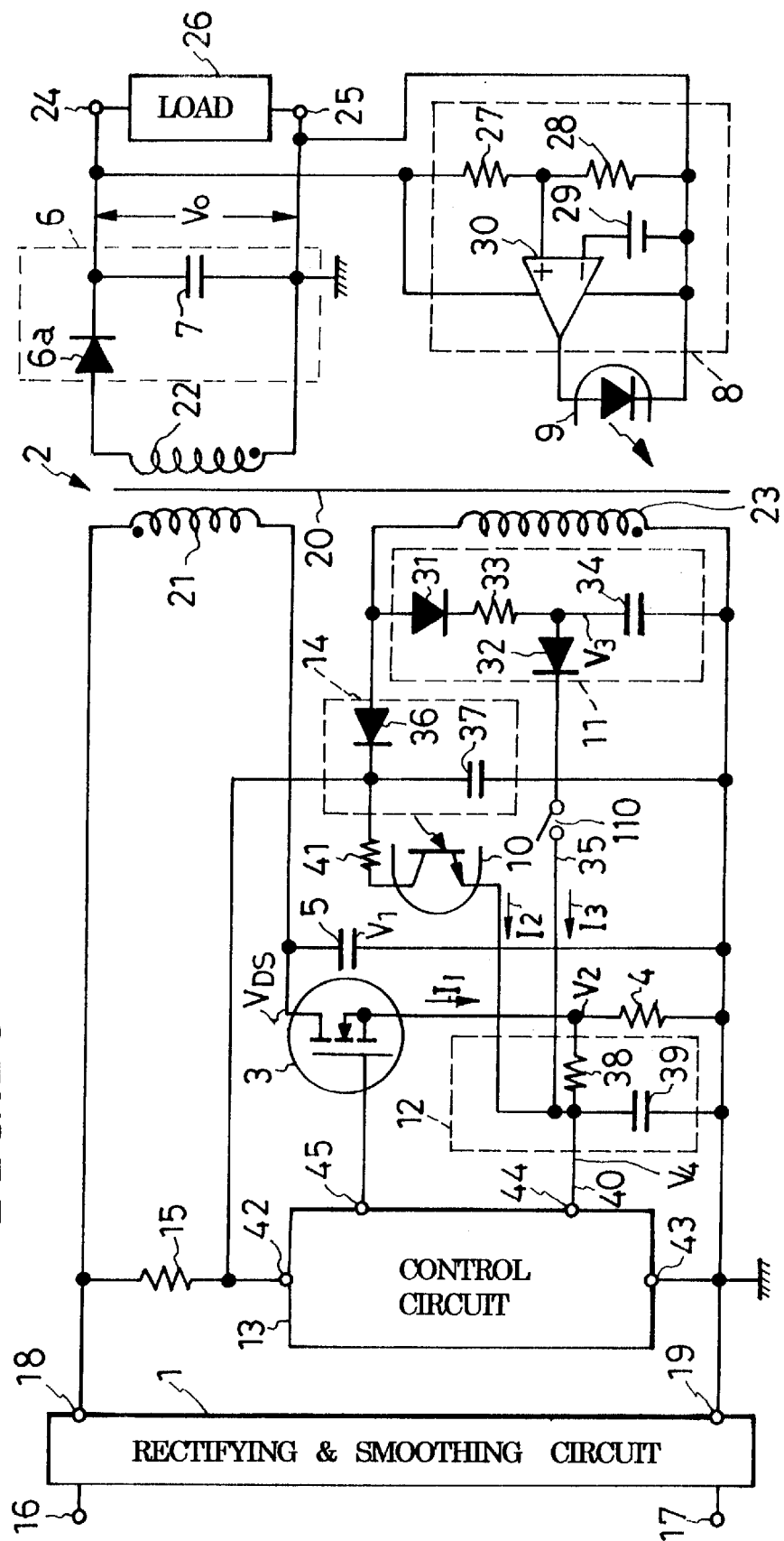
FIG. 28 is a circuit diagram of a ninth preferred form of dc-to-dc converter according to the invention.

The ninth preferred form of dc-to-dc converter shown in FIG. 28 is akin to the FIG. 1 converter except for the provision of a switch 110 between the switch voltage detector circuit 11 and the summing circuit 12. The switch 110 is designed to disconnect the voltage detector circuit 11 from the summing circuit 12 when the voltage requirement of the load 26 is very low, as in standby mode.

With the switch 110 opened, the output from the switch voltage detector circuit 11 will not take part in the creation of the control pulses $V_{14}$ for the switching device 3. As at the startup time of the converter, the control pulses $V_{14}$ will be formed independently of the output from the minimum nonconducting period determination circuit 13, and the nonconducting periods $T_{off}$ will be determined from the output from the maximum nonconducting period determination circuit 74. The switching device 3 may then be driven at a relatively low switching frequency, so that the number of switchings per unit length of time can be made even less than when the switching device is controlled under the limitation of the second minimum nonconducting period $T_2$. The zero-voltage switching of the switching device 3 by virtue of resonance when it is turned on is not effected in this standby mode in which the switch 110 is open. The efficiency of the dc-to-dc converter is improved through drastic curtailment of the switchings.

In addition to the advantages set forth in connection with the first disclosed embodiment of the invention, this ninth embodiment offers the benefit of adopting any of three different control modes depending upon the load. Utmost efficiency may be realized according to the magnitude of the load. The switch 110 of FIG. 28 may be provided in each of the second to eighth embodiments of the invention.

Tenth Preferred Form

Figure 29:
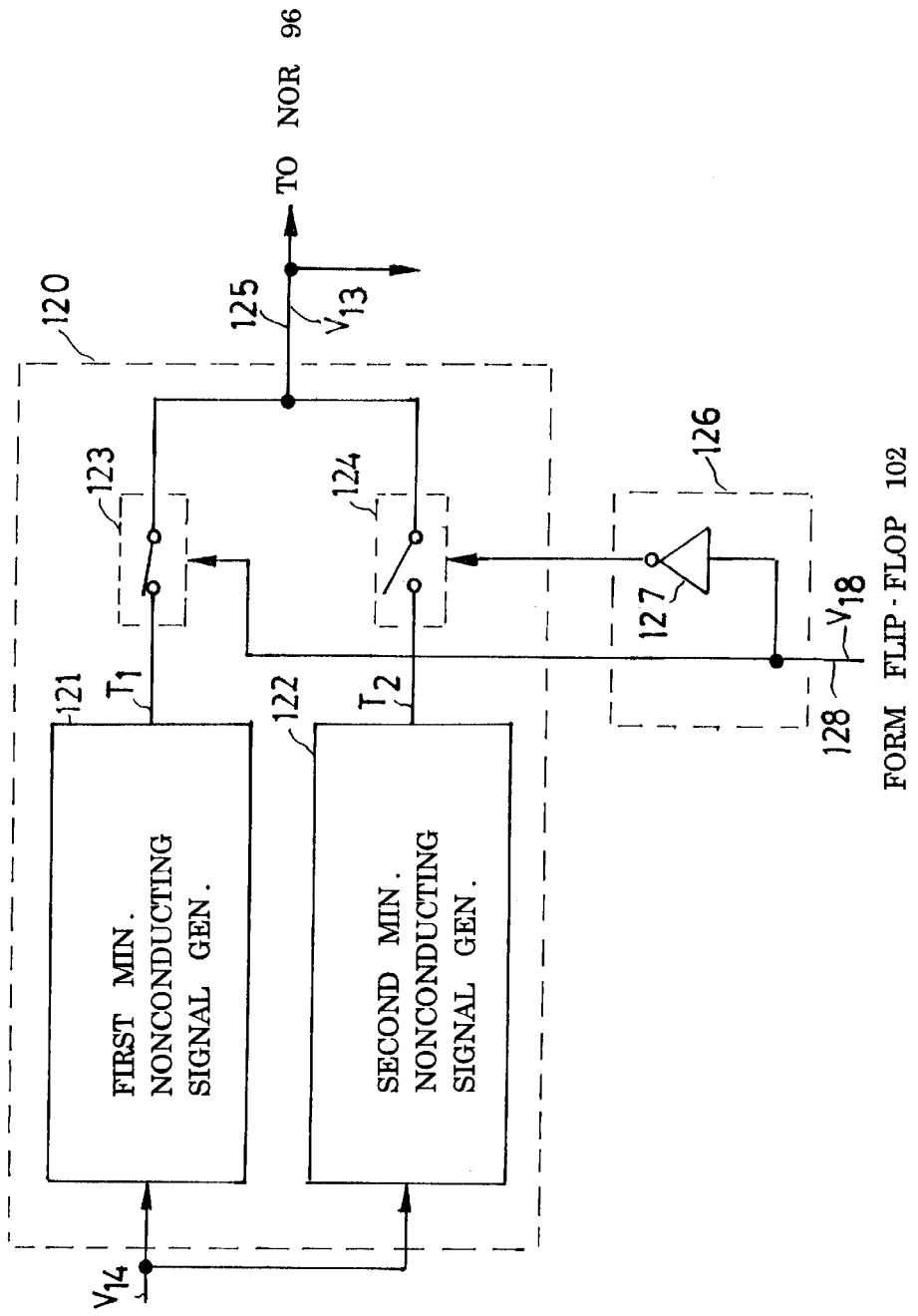
FIG. 29 is a partial circuit diagram of a tenth preferred form of dc-to-dc converter according to the invention.

The tenth preferred form of dc-to-dc converter according to the invention is analogous with the FIGS. 1–5 embodiment except that the nonconducting period signal generator circuit 73, FIG. 5, of the latter is modified into a minimum nonconducting period signal generator circuit shown at 120 in FIG. 29. The modified minimum nonconducting period signal generator circuit 120 has a first and a second minimum nonconducting period signal generator 121 and 122 for independently setting up the first and the second minimum nonconducting period $T_1$ and $T_2$. The first and the second minimum nonconducting period signal generator 121 and 122 generates signals indicative of the first and the second minimum nonconducting period $T_1$ and $T_2$, indicated at $V_{13}$ in FIGS. 6 and 7, in response to the trailing edges of the pulses $V_{14}$, FIGS. 6 and 7, for closing the switching device 3.

Between the first and the second minimum nonconducting period signal generator 121 and 122 and their common output conductor 125 there are connected a first and a second select switch 123 and 124 which are selectively turned on and off by a switch control circuit 126 including a NOT circuit 127. The switch control circuit 128 has its input conductor 128 connected to an equivalence of the flip-flop 102, FIG. 5. The input conductor 128 is connected directly to the control terminal of the first select switch 123 and via the NOT circuit 127 to the control terminal of the second select switch 124. Thus the first and the second select switch 123 and 124 are turned on and off in opposite relationship to each other.

More specifically, when the signal $V_{18}$ on the input conductor 128 is high, as in FIG. 6, indicating that $T_1$ is less than $T_0$, the first select switch 123 will be closed, with the consequent delivery of the first minimum nonconducting period signal, which is substantially identical with that shown at $V_{13}$ in FIG. 6, to the NOR circuit 96, FIG. 5, etc. over the output conductor 125. On the other hand, when the signal $V_{18}$ on the input conductor 128 is low, as in FIG. 17, indicating that $T_0$ is less than $T_2$, the second select switch 124 will be closed. There will then be obtained the second minimum nonconducting period signal which is substantially the same as that shown at $V_{13}$ in FIG. 7. Thus the tenth embodiment of the invention offers the same advantages as the first.

The minimum nonconducting period signal generator circuit 120 of FIG. 29 is applicable to the second to the ninth preferred forms of dc-to-dc converters according to the invention as well.

Eleventh Preferred Form

Figure 30:
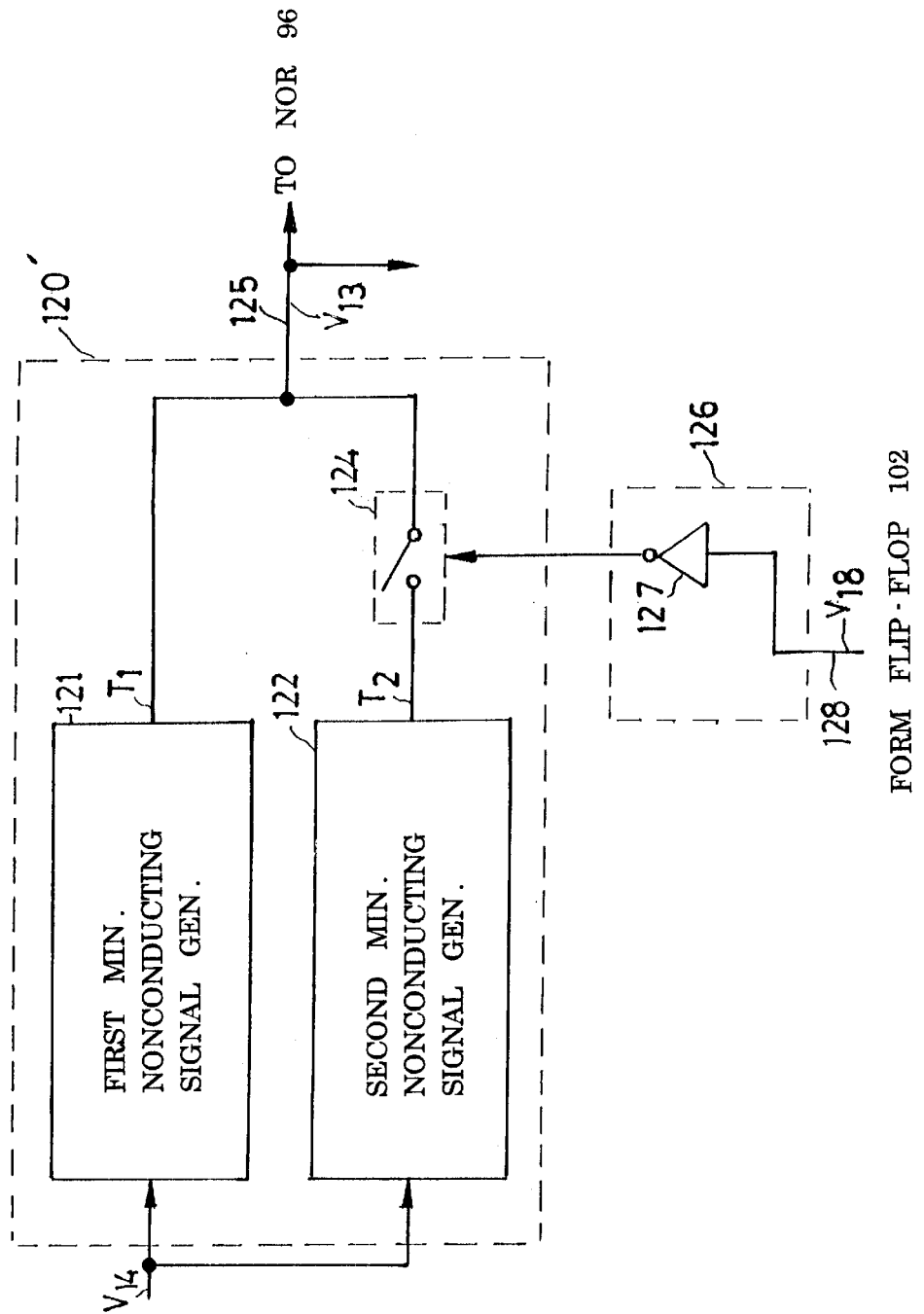
FIG. 30 is a partial circuit diagram of an eleventh preferred form of dc-to-dc converter according to the invention.

FIG. 30 shows a modification 120' of the FIG. 29 minimum nonconducting period signal generator circuit 120. The modified minimum nonconducting period signal generator circuit 120' is similar to the original circuit 120 except for the absence of the first select switch 123.

The single switch 124 of the FIG. 30 embodiment is to be turned off when pulses for the first minimum nonconducting period $T_1$ are desired, and on when pulses for the second minimum nonconducting period $T_2$ are desired. It follows, then, that both first and second minimum nonconducting period signal generators 121 and 122 are connected to the output conductor 125 when the second minimum nonconducting period pulses $T_2$ are required. However, since the two minimum nonconducting period signal generators 121 and 122 synchronously put out the first minimum nonconducting period pulses and the second minimum nonconducting period pulses, the first minimum nonconducting period pulses are masked by the second minimum nonconducting period pulses. Consequently, the FIG. 30 minimum nonconducting signal generator 120' functions the same away as the FIG. 29 circuit.

The second minimum nonconducting period signal generator 122 of the FIG. 30 circuit is replaceable by the FIG. 8 circuit for generating the pulses indicative of the difference $T_a$ between $T_1$ and $T_2$. In that case, when the second minimum nonconducting period $T_2$ is demanded, there will be obtained pulses indicative of the sum of the first minimum nonconducting period $T_1$ and the additional period $T_a$.

Twelfth Preferred Form

Figure 31:
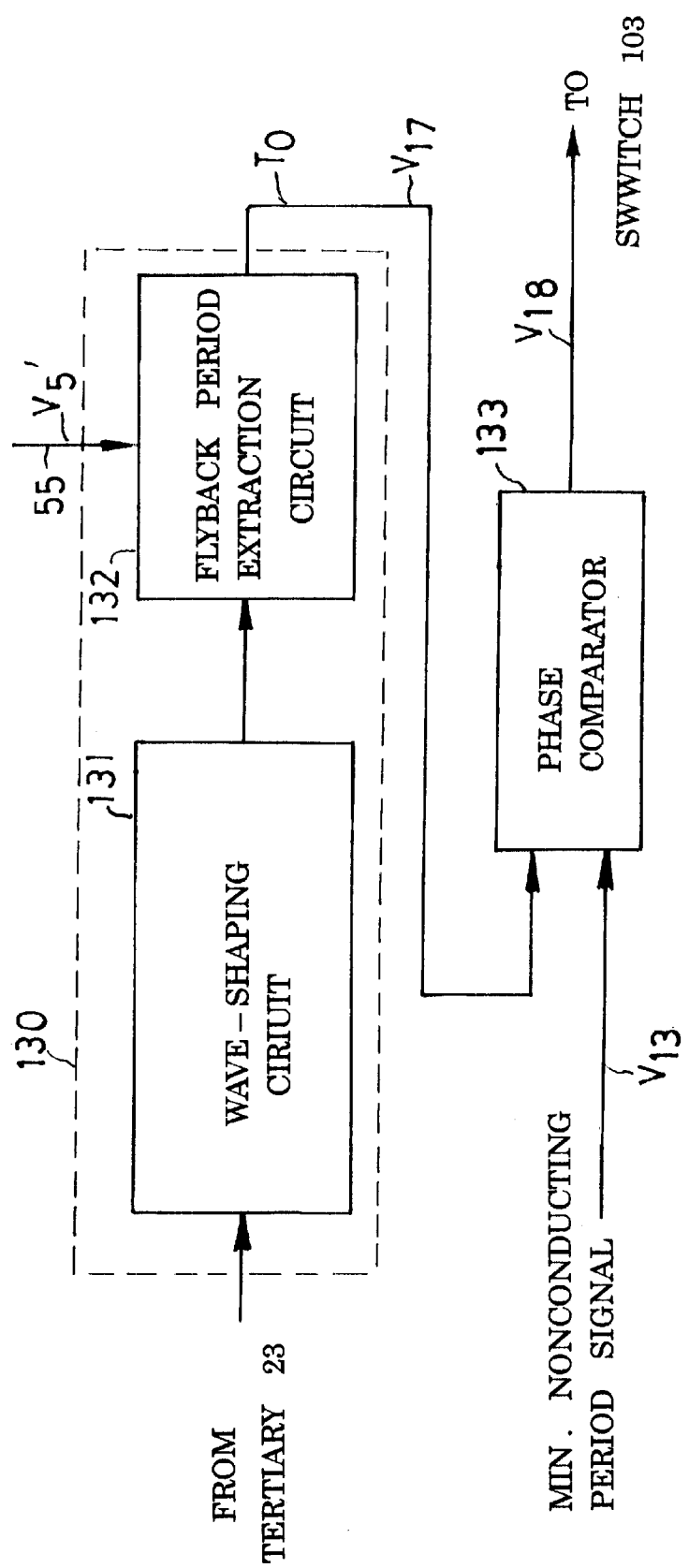
FIG. 31 is a partial circuit diagram of a twelfth preferred form of dc-to-dc converter according to the invention.

The twelfth preferred form of dc-to-dc converter according to the invention is similar to the sixth, shown in FIGS. 16–18, except that the flyback voltage duration detector circuit 101 and judgment circuit 102 of that embodiment are modified as shown in FIG. 31. In the sixth embodiment the means for providing the signal indicative of the flyback voltage duration serve also as the switch voltage detector circuit 11b and the first circuit 71b for nonconducting period termination. In this twelfth embodiment shown in FIG. 31, on the other hand, the flyback voltage duration detector circuit 130 is connected directly to the tertiary winding 23 of the FIG. 16 transformer 2.

The flyback voltage duration detector circuit 130 comprises a wave-shaping circuit 131 and a flyback period extraction circuit 132. The wave-shaping circuit 131 comprises a comparator for shaping the voltage across the tertiary 23 into a rectangular wave and hence providing a signal essentially identical with that shown at $V_7$ in FIGS. 19 and 20. Connected to this wave-shaping circuit 131, the flyback period extraction circuit 132 is designed to extract pulses representative of the flyback voltage periods $T_0$ by eliminating undesired pulses due to the ringing voltage which is generated during the nonconducting periods $T_{off}$ when the load is light as in FIG. 20. The flyback period extraction circuit 132 is additionally connected to the comparator 46, FIG. 17, by way of the conductor 55 for extracting the pulses $V_7$, FIGS. 19 and 20, which are generated in synchronism with the pulses $V_5'$, FIGS. 19 and 20. Consequently, the flyback period extraction circuit 132 puts out a signal indicative of the flyback voltage duration $T_0$ like the signal $V_{17}$, FIGS. 6 and 7.

The phase comparator 133, FIG. 31, compares the phases of the signal $V_{17}$ indicative of the flyback voltage periods $T_0$ from the flyback period extraction circuit 132, and the signal $V_{13}$, FIGS. 6 and 7, indicative of the first or second minimum nonconducting period $T_1$ or $T_2$ from the nonconducting period pulse forming circuit 95, FIG. 5, and puts out the signal shown at $V_{18}$ in FIGS. 6 and 7. In other words, comparing the phases of the trailing edges of the pulses $V_{17}$ and those of the pulses $V_{13}$, the phase comparator 133 will go high as at $V_{18}$ in FIG. 6 when the trailing edges of the pulses indicative of $T_0$ lag behind those of the pulses indicative of $T_i$ as in FIG. 6, and go low as at $V_{18}$ in FIG. 7 when the trailing edges of the pulses indicative of $T_0$ lead those of pulses indicative of $T_2$ as in FIG. 7. It is thus seen that the FIG. 31 converter gains the same advantages as the FIGS. 1–6 embodiment. The circuitry of this FIG. 31 embodiment is applicable to the first to fifth, and seventh to eleventh, embodiments of the invention as well.

Possible Modifications

The present invention is not to be limited by the foregoing embodiments but admits of the following modifications:

1. The transformer 2 could be replaced by the FIG. 27 reactor 2a, too, in the second to seventh, and ninth to twelfth, preferred forms of dc-to-dc converters. Also, the primary winding 21 could be tapped, and the diode 6 connected to this tap.

2. The switching device 3 could take the form of some other semiconductor switch such as a bipolar transistor or an insulated-gate bipolar transistor.

3. The summing circuit 12 or 12a could be an adder circuit employing an operational amplifier.

4. The output voltage detector circuit 8 could be coupled to the summing circuit 12 or 12a via an electric circuit rather than via the light-emitting diode 9 and phototransistor 10.

5. The resonance capacitor 5 could be connected in parallel with only the switching device 3, with the capacitor serving as parasitic capacitance for the switching device.

6. A switch such as an FET could be connected in parallel with the diode 6 and turned on in synchronism with the conduction of the diode.

7. Current detection could be made by some such sensor as a Hall-effect device instead of by the resistor.

8. The transformer 2 could be provided with a quaternary winding, and to this winding a second load could be connected via means similar to the diode 6 and capacitor 7 of FIG. 1.

INDUSTRIAL APPLICABILITY

The dc-to-dc converters according to the invention lend themselves to use as supply circuits of electric appliances.

What is claimed is:

1. A dc-to-dc converter for delivering direct-current power to a load (26) characterized by comprising:

a dc power supply (1) for providing a unidirectional voltage;

a switching device (3) connected between terminals (18) and (19) of said power supply (1) and having a first and a second main terminal and a control terminal;

inductance means (2 or 2a) connected in series with said switching device (3) and adapted to store energy during the conducting periods of said switching device and to release the energy during the nonconducting periods of said switching device;

a rectifying and smoothing circuit (6) connected to said inductance means (2 or 2a);

output voltage detector means (8, 10) for detecting a signal indicative of the output voltage of said rectifying and smoothing circuit (6);

switch voltage detector means (11, 11a or 11b) for providing a signal indicative of a voltage between said first and said second main terminal of said switching device (3); and switch control means (13) connected to said output voltage detector means (8, 10) and said switch voltage detector means (11, 11a or 11b) and said switching device (3) for producing a switch control signal for on-off control of said switching device and for applying the switch control signal to said control terminal of said switching device, said switch control means having a function of determining the conducting periods ($T_{on}$) of said switching device so as to keep constant the output voltage in response to the output of said output voltage detector means (8, 10), a function of forming a signal indicative of a first minimum nonconducting period ($T_1$) to which the nonconducting periods ($T_{off}$) of said switching device are to be limited, a function of forming a signal indicative of a second minimum nonconducting period ($T_2$) which is longer than the first minimum nonconducting period ($T_1$), a function of selectively providing the first and the second minimum nonconducting period signals, a function of detecting the duration ($T_0$) of the flyback voltage of said inductance means (2 or 2a), a function of judging whether the flyback voltage duration ($T_0$) is shorter than the first minimum nonconducting period ($T_1$) or not, a function of judging whether the flyback voltage duration ($T_0$) is longer than the second minimum nonconducting period ($T_2$) or not, a function of limiting the nonconducting periods ($T_{off}$) of said switching device (3) under the second minimum nonconducting period ($T_2$) when the flyback voltage duration ($T_0$) proves to be shorter than the first minimum nonconducting period ($T_1$), a function of limiting the nonconducting periods ($T_{off}$) of said switching device (3) under the first minimum nonconducting period ($T_1$) when the flyback voltage duration ($T_0$) proves to be longer than the second minimum nonconducting period ($T_2$), and a function of terminating the nonconducting periods ($T_{off}$) of said switching device (3) when the signal indicative of the voltage of said switching device, obtained by said switch voltage detector means (11, 11a or 11b) upon termination of the first ($T_1$) or second ($T_2$) minimum nonconducting period, grows equal to or less than a predetermined reference value ($Vr_1$ or $Vr_2'$).

2. A dc-to-dc converter as claimed in claim 1, characterized in that said switch control means (13) comprises:

switch control signal forming means (46, 46a, 47, 50 or 50a) connected to said output voltage detector means (8, 10) and said switch voltage detector means (11, 11a or 11b) for forming a switch control signal for on-off control of said switching device (3), said switch control signal forming means having a function of determining the conducting periods ($T_{on}$) of said switching device so as to keep the output voltage constant in response to the output from said output voltage detector means (8, 10), and a function of terminating the nonconducting periods ($T_{off}$) of said switching device when the signal indicative of the voltage across said switching device, obtained from said switch voltage detector means (11, 11a or 11b) grows equal to or less than the predetermined reference value ($Vr_1$ or $VR_2'$);

a minimum nonconducting period signal generator circuit (73, 120 or 120') for selectively putting out a signal indicative of the first minimum nonconducting period ($T_i$), and a signal indicative of the second minimum nonconducting period ($T_2$), which is longer than the first period ($T_1$), for limiting the nonconducting periods ($T_{off}$) of said switching device (3), said first and second minimum nonconducting period signals being selectively delivered to said switch control signal forming means;

flyback voltage duration detector means (101 or 130) for detecting the duration ($T_0$) of the flyback voltage of said inductance means (2 or 2a); and judgment means (102 or 133) connected to said nonconducting period signal generator circuit and said flyback voltage detector means and having a function of ascertaining whether the flyback voltage duration ($T_0$), detected by said flyback voltage duration detector means (101 or 130), is shorter than the first minimum nonconducting period ($T_1$) or not, a function of ascertaining whether the flyback voltage duration ($T_0$) is longer than the second minimum nonconducting period ($T_2$) or not, a function of causing said minimum nonconducting period signal generator circuit (73, 120 or 120') to deliver the signal indicative of the second minimum nonconducting period ($T_2$) to said switch control signal forming means when the flyback voltage duration ($T_0$) proves to be shorter than the first minimum nonconducting period ($T_1$), and a function of causing said minimum nonconducting period signal generator circuit (73 or 120) to deliver the signal indicative of the first minimum nonconducting period ($T_1$) to said switch control signal forming means when the flyback voltage duration ($T_0$) proves to be longer than the second minimum nonconducting period ($T_2$).

3. A dc-to-dc converter as claimed in claim 1 or 2, characterized in that the time difference between the first minimum nonconducting period ($T_1$) and the second minimum nonconducting period ($T_2$) is from 0.1 to 10 microseconds.

4. A dc-to-dc converter as claimed in claim 1 or 2, characterized by further comprising a resonant capacitor (5) connected in parallel with said switching device (3) in order to reduce switching losses when said switching device is turned off.

5. A dc-to-dc converter as claimed in claim 2, characterized by further comprising current detector means (4) for detecting the current flowing through said switching device (3), said switch control signal forming means comprising:

summing means (12) connected to said current detector means (4) and said output voltage detector means (8) and said switch voltage detector means (11) for forming a sum signal ($V_4$) combining the output from said current detector means and the output from said output voltage detector means and the output from said switch voltage detector means, said sum signal being such that the peak of said sum signal during the conducting periods of said switching device is less than the peak of said sum signal during the nonconducting periods of said switching device;

a first reference voltage source (48) for providing a first reference voltage ($V_{r1}$) indicative of the allowable peak of said current;

a second reference voltage source (49) for providing a second reference voltage ($V_{r2}$) which is intermediate the voltage of said sum signal ($V_4$) immediately before the completion of said stored energy from said inductance means (2 or 2a) and said first reference voltage ($V_{r1}$);

a first comparator (46) connected to said summing means (12) and said first reference voltage source (48) for comparing said sum signal ($V_4$) and said first reference voltage ($V_{r1}$);

a second comparator (47) connected to said summing means (12) and said second reference voltage source (49) for comparing said sum signal ($V_4$) and said second reference voltage ($V_{r2}$); and a control pulse forming circuit (50 or 50a) connected to said first and said second comparators (46 and 47) and said minimum nonconducting period signal generator circuit (73 or 120) and the control terminal of said switching device (3) for forming control pulses for driving said switching device on the bases of the outputs from said first and said second comparator, said control pulses being such that said conducting periods ($T_{on}$) start when said first comparator indicates that said sum signal ($V_4$) has grown less than said first reference voltage ($V_{r1}$) after the lapse of said first or said second minimum nonconducting period following the end of each said conducting period ($T_{on}$), and that said conducting periods end when said sum signal ($V_4$) grows higher than said first reference voltage after the beginning of each said conducting period.

6. A dc-to-dc converter as claimed in claim 5, further comprising an initialization signal generator circuit (51) for generating an initialization signal for starting the on-off operation of said switching device (3), characterized in that said minimum nonconducting period signal generator circuit (73) comprises:

a sawtooth generator circuit (72) connected to the outputs of said initialization signal generator circuit (51) and the output of said control pulse forming circuit (50)

a reference voltage source (91) for determination of the minimum nonconducting periods for selectively providing a first minimum nonconducting period determination reference voltage ($V_{a1}$) and a second minimum nonconducting period determination reference voltage ($V_{a2}$);

a reference voltage select switch (103) connected to said minimum nonconducting period determination reference voltage source (91) for selectively providing said first minimum nonconducting period determination reference voltage ($V_{a1}$) and said second minimum nonconducting period determination reference voltage ($V_{a2}$);

a minimum nonconducting period determination comparator (92) connected to said sawtooth generator mean (72) and said minimum nonconducting period determination reference voltage source (91) for comparing said sawtooth voltage ($V_{10}$) and the output ($V_a$) from said minimum nonconducting period determination reference voltage source; and a nonconducting period pulse forming circuit (95) connected to said minimum nonconducting period determination comparator (92) and said control pulse forming circuit (50) and said first comparator (46) for forming pulses indicative of said first minimum nonconducting period ($T_1$) or pulses indicative of said second minimum nonconducting period ($T_2$) when said first comparator (46) indicates that said sum signal ($V_4$) has reached said first reference voltage ($V_{r1}$) after the appearance of the control pulses indicative of said conducting periods ($T_{on}$).

7. A dc-to-dc converter as claimed in claim 6, characterized in that said control pulse forming circuit (50) comprises:

a first circuit (71 or 71a) connected to said initialization signal generator means (51) and said first and said second comparator (46, 47) and said minimum nonconducting period pulse forming circuit (95) for putting out a signal ($V_9$) indicative of the end of each nonconducting period ($T_{off}$) of said switching device (3) when said first comparator (46) indicates the crossing of said first reference voltage ($V_{r1}$) by said sum signal ($V_4$) after the end of said first ($T_1$) or second ($T_2$) minimum nonconducting period; and a second circuit (96) connected to said first circuit (71 or 71a) and said minimum nonconducting period pulse forming circuit (95) and the control terminal of said switching device (3) for starting the production of the control pulses indicative of said conducting periods ($T_{on}$) when the output from said first circuit (71 or 71a) indicates the end of each said nonconducting period ($T_{off}$) when the output from said minimum nonconducting period pulse forming circuit (95) does not indicate said first ($T_1$) or second ($T_2$) minimum nonconducting period, and for terminating the production of the control pulses when the output from said first comparator (46) indicates that said sum signal ($V_4$) has reached the first reference level ($V_{r1}$).

8. A dc-to-dc converter as claimed in claim 7, characterized in that the sum signal ($V_4$) put out by said summing means (12) has a waveform such that it upwardly crosses the first reference voltage ($V_{r1}$) when said switching device (3) shifts from a conducting period ($T_{on}$) to a nonconducting period ($T_{off}$), then downwardly crosses the first reference voltage, then upwardly crosses the first reference voltage, and, upon completion of the release of the stored energy from said inductance means (2 or 2a), downwardly crosses the first reference voltage;

that said first circuit (71 or 71a) comprises a wave-shaping circuit (77) and a flip-flop (78);

that said wave-shaping circuit (77) is connected to said first and said second comparator (46, 47) for providing a signal ($V_7$) in which a decay that is caused in the output (V5) from said first comparator (46) immediately after the transition of said switching device (3) from a conducting ($T_{on}$) to a nonconducting ($T_{off}$) period is compensated for; and that said flip-flop (78) is a D flip-flop having a clock terminal (1) connected to said wave-shaping circuit (77), a data input terminal (D) connected to said minimum nonconducting period pulse forming circuit (95), a preset terminal ($\overline{PR}$) connected to said second comparator (47) via a NOT circuit (80), and a reset terminal ($\overline{R}$) connected to said initialization signal generator circuit (51), in order to be reset by said initialization signal, to be preset by the output from said second comparator (47) when the sum signal ($V_4$) upwardly crosses the second reference voltage ($V_{r2}$), and to put in the output from said minimum nonconducting period pulse forming circuit (95) on being clocked by the trailing edge of each output pulse of said wave-shaping circuit (77).

9. A dc-to-dc converter as claimed in claim 8, characterized in that said first circuit (71) further comprises a second flip-flop (79) which is set by the output from said second comparator (47) when the sum signal ($V_4$) upwardly crosses the second reference voltage ($V_{r2}$) and which is reset by the pulses ($V_8$) issuing from the phase-inverting output of said D flip-flop (78), in order to terminal the nonconducting periods when so reset.

10. A dc-to-dc converter as claimed in claim 8, characterized in that said first circuit (71a) comprises a first and a second flip-flop (78, 79);

that said first flip-flop (78) is a D flip-flop having a clock terminal (T) connected to said first comparator (46) in order to be blocked by the output from said first comparator when the sum signal ($V_4$) downwardly crosses the first reference voltage ($V_{r1}$), and a data input terminal (D) connected to said minimum nonconducting period pulse forming circuit (95); and that said second flip-flop (79) is an RS flip-flop with priority to setting and has a set input terminal (S) connected to said second comparator (47) for being set by the output therefrom indicative of the upward crossing of second reference voltage ($V_{r2}$) by the sum signal ($V_4$), and a reset input terminal (R) connected to the phase inverting terminal of said first flip-flop (78) for being reset by the leading edges of the pulses issuing from the phase-inverting output terminal of said first flip-flop (78).

11. A dc-to-dc converter as claimed in claim 8, 9 or 10, characterized in that said second circuit (96) is a two-input NOR gate (96a) having a first input connected to said minimum nonconducting period pulse forming circuit (95), and another input connected to said first circuit (71 or 71a), the output from said NOR gate (96a) being used as the switch control signal.

12. A dc-to-dc converter as claimed in claim 8, 9 or 10, characterized in that said minimum nonconducting period pulse forming circuit (95) comprises:

an AND gate (97) having a first input terminal connected to said minimum nonconducting period determination comparator (92), and a second input connected to said first circuit (71 or 71a); and a flip-flop (100) adapted to be set in response to the output from said AND gate (97) and to be reset in response to the initialization signal from said initialization signal generator circuit (51) and to the output from said first comparator (46) when the sum signal ($V_4$) upwardly crosses the first reference voltage ($V_{r1}$).

13. A dc-to-dc converter as claimed in claim 8, wherein said flyback voltage duration detector means (101) is connected to said first and said second circuit (71, 96) for ascertaining a sum ($T_0$) of a first period from the beginning of each nonconducting period ($T_{off}$) to the end of the release of the stored energy from said inductance means (2) and a second period from the end of the first period to the moment the sum signal first crosses the first reference voltage ($V_{r1}$) following the end of the first period, in response to the switch control signal ($V_{14}$) formed by said second circuit (98) and the output ($V_7$) from said wave-shaping circuit (77).

14. A dc-to-dc converter as claimed in claim 13, characterized in that said minimum nonconducting period determination reference voltage source (91) comprises a voltage divider circuit for providing the reference voltage by dividing a dc voltage;

that said judgment means comprises a D flip-flop (102) for changing the reference voltage, said flip-flop (102) having a clock input terminal (T) connected to said flyback voltage duration detector circuit (101 or 130), and a data input terminal (D) connected to said minimum nonconducting period pulse forming circuit (95); and that said reference voltage changing switch (103) is connected to said voltage dividing circuit so as to change the voltage-dividing ratio thereof in response to the output from said reference voltage changing flip-flop (102).

15. A dc-to-dc converter as claimed in claim 1, wherein current detector means (4) is provided for detecting the current flowing through said switching device (3), characterized in that said switch control signal forming means comprises:

summing means (12a) for forming a sum signal ($V_4'$) of the output from said current detector means (4) and the output from said output voltage detector means (8);

a first reference voltage source (48') for providing a first reference voltage ($V_{r1}'$);

a second reference voltage source (49') for providing a second reference voltage ($V_{r2}'$) which is intermediate in magnitude between the output voltage of said switch voltage detector means (11b) immediately before the completion of the release of the stored energy from said inductance means (2 or 2a) and the minimum value of the output voltage of said switch voltage detector means (11b);

a first comparator (46) connected to said summing means (12a) and said first reference voltage source (48') for comparing the sum signal ($V_4'$) and the first reference voltage ($V_{r1}'$);

a second comparator (47) connected to said switch voltage detector means (11b) and said second reference voltage source (49') for comparing the output from said switch voltage detector means (11b) and the second reference voltage ($V_{r2}'$); and a control pulse forming circuit (50a) connected to said first and said second comparator (46, 47) and said minimum nonconducting period signal generator circuit (73) and the control terminal of said switching device (3) for forming control pulses for controlling said switching device (3), in order to initiate each said conducting period ($T_{on}$) in response to the output ($V_3$) from said second comparator (47) when the output ($V_3$) from said switch voltage detector means (11b) becomes less than the second reference voltage ($V_{r2}$) upon lapse of the first ($T_1$) or second ($T_2$) minimum nonconducting period following the end of the previous conducting period ($T_{on}$), and to terminate each said conducting period ($T_{on}$) in response to the output from said first comparator (46) when the sum signal ($V_4$) becomes higher than the first reference voltage ($V_{r1}'$) after the beginning of that conducting period ($T_{on}$).

16. A dc-to-dc converter as claimed in claim 2, characterized in that said switch control signal forming means comprises:

a sawtooth generator circuit (111) for conducting period termination connected to said output voltage detector means (8) for generating the sawtooth voltage ($V_{4a}$) including a ramp voltage proportional to the output from said output voltage detector means (8), in synchronism with the beginning of each conducting period ($T_{on}$) of said switching device (3);

a first reference voltage source (48a) for providing a reference voltage ($V_{r1a}$) for determination of the moment each said conducting period ($T_{on}$) of said switching device is to be terminated;

a second reference voltage source (49') for providing a reference voltage ($V_{r2}'$) for nonconducting period termination having a level intermediate the output voltage of said switch voltage detector means (11b) immediately before the completion of the discharge of the stored energy from said inductance means (2 or 2a) and the minimum value of the output voltage of said switch voltage detector means (11b);

a first comparator (46a) connected to said conducting period termination sawtooth generator circuit (111) and said first reference voltage source (48a) for comparing the sawtooth voltage ($V_{4a}$) and the reference voltage ($V_{r1a}$) for conducting period termination;

a second comparator (47) connected to said switch voltage detector means (11b) and said second reference voltage source (49') for comparing the output from said switch voltage detector means (11b) and the reference voltage ($V_{r2}'$) for nonconducting period termination; and a control pulse forming circuit (50a) connected to said first and said second comparator (46a, 47) and said minimum nonconducting period signal generator circuit and the control terminal of said switching device (3) for forming control pulses for controlling said switching device, the control pulses being so formed that each said conducting period ($T_{on}$) begins when said second comparator (47) indicates that the switch voltage detection signal ($V_3$) becomes less than the reference voltage ($V_{r2}'$) for nonconducting period termination upon lapse of the first ($T_1$) or second ($T_2$) minimum nonconducting period following the end of the previous conducting period ($T_{on}$), and that each conducting period ($T_{on}$) terminates when the output from said first comparator (48a) indicates that the sawtooth voltage ($V_{4a}$) becomes higher than the reference voltage ($V_{r1a}$) for conducting period termination following the beginning of that conducting period ($T_{on}$).

17. A dc-to-dc converter as claimed in claim 1, characterized in that said inductance means comprises a transformer (2) having a magnetic core and a primary, a secondary and a tertiary winding (21, 22, 23) which are wound around said core and which are electromagnetically coupled together, said primary winding (21) being connected in series with said switching device, said secondary winding (22) being connected to said output rectifying and smoothing circuit (6), said tertiary winding (23) being connected to said switch voltage detector means (11).

18. A dc-to-dc converter as claimed in claim 1, characterized in that said switch voltage detector means (11) is connected in parallel with said switching device (3).

19. A dc-to-dc converter as claimed in claim 1, characterized in that said inductance means comprises a transformer (2) having a magnetic core and a primary, a secondary and a tertiary winding (21, 22, 23) which are wound around said core and which are electromagnetically coupled together, said primary winding (21) being connected in series with said switching device, said secondary winding (22) being connected to said output rectifying and smoothing circuit (6), said tertiary winding (23) being connected to said output voltage detector means.

20. A dc-to-dc converter as claimed in claim 17, characterized in that switch voltage detector means (11) comprises:
   a serial circuit of a first diode (31), a resistor (33) and a delay capacitor (34) connected in parallel with said tertiary winding; and
   a second diode (32) connected to said delay capacitor (34) for deriving a voltage across the same.

21. A dc-to-dc converter as claimed in claim 17, characterized in that said switch voltage detector means (11a) comprises a diode (31) and a resistor (33) connected to said tertiary winding (23).

22. A dc-to-dc converter as claimed in claim 1, characterized in that said inductance means comprises a reactor (2a) having a winding (21) connected in series with said switching device (3), said output rectifying and smoothing circuit being connected in parallel with said switching device.

23. A dc-to-dc converter as claimed in claim 1, characterized by further comprising maximum nonconducting period determination means (74) for determining a maximum nonconducting period which is longer than the minimum nonconducting period, said switch control signal forming means forming a switch control signal based on the maximum nonconducting period determined by said maximum nonconducting period determination means when it is impossible to form a switch control signal based on the minimum nonconducting period.

24. A dc-to-dc converter as claimed in claim 1, characterized by further comprising a switch (110) connected to the output side of said switch voltage detector means (11, 11a or 11b), said switch (11) being adapted to be selectively turned on and off.

25. A dc-to-dc converter as claimed in claim 2, characterized in that said minimum nonconducting period signal generator circuit (120) comprises:
   a first minimum nonconducting period signal generator (121) for generating a signal indicative of the first minimum nonconducting period ($T_1$);
   a second minimum nonconducting period signal generator (122) for generating a signal indicative of the second minimum nonconducting period ($T_2$); and
   switching means (123,124) for selectively providing the signal indicative of the first minimum nonconducting period ($T_1$) and the signal indicative of the second minimum nonconducting period ($T_2$) from said first and said second minimum nonconducting period signal generator (121, 122).

26. A dc-to-dc converter as claimed in claim 2, characterized in that said flyback voltage duration detector means (130) comprises:
   a wave-shaping circuit (131) for shaping into a rectangular wave the voltage generated from said inductance means (2 or 2a) during the nonconducting periods of said switching device; and
   a flyback period extraction circuit (132) connected to said wave-shaping circuit (131) for extracting from the output therefrom only the rectangular wave indicative of the flyback voltage.

27. A dc-to-dc converter as claimed in claim 2, characterized in that said judgment means comprises a phase comparator.

* * * * *

UNITED STATES PATENT AND TRADEMARK OFFICE
CERTIFICATE OF CORRECTION

PATENT NO.    : 6,445,598 B1
DATED         : September 3, 2002
INVENTOR(S)   : Tomoyasu Yamada It is certified that error appears in the above-identified patent and that said Letters Patent is hereby corrected as shown below:

<u>Title page, Item [54] and Column 1, line 1,</u>
Title, insert -- TO- -- after the first occurrence of "DC-";

<u>Title page,</u>
Item [86], delete "Date: Aug. 3, 2001" and insert -- Date: Aug. 9, 2001 -- therefor;

<u>Column 1,</u>
Line 53, delete "de vice" and insert -- device -- therefor;

<u>Column 5,</u>
Line 15, delete "To" and insert -- $T_o$ -- therefor;
Line 67, delete "flip-flip" and insert -- flip-flop -- therefor;

<u>Column 16,</u>
Line 47, delete "too" and insert -- $T_{10}$ -- therefor;

<u>Column 20,</u>
Line 66, delete "do";

<u>Column 21,</u>
Line 26, delete "an" and insert -- and -- therefor;

<u>Column 22,</u>
Line 66, delete "Vb" and insert -- $V_b$ -- therefor;

<u>Column 23,</u>
Line 27, delete "Va" and insert -- $V_a$ -- therefor;

<u>Column 27,</u>
Line 35, delete "I01a" and insert -- $101_a$ -- therefor;

<u>Column 33,</u>
Line 55, delete "$T_i$" and insert -- $T_1$ -- therefor;

<u>Column 35,</u>
Line 48, delete "($T_i$)," and insert -- ($T_1$), -- therefor;

<u>Column 37,</u>
Line 13, insert -- ; -- after "(50)";

UNITED STATES PATENT AND TRADEMARK OFFICE
CERTIFICATE OF CORRECTION

PATENT NO. : 6,445,598 B1
DATED : September 3, 2002
INVENTOR(S) : Tomoyasu Yamada It is certified that error appears in the above-identified patent and that said Letters Patent is hereby corrected as shown below:

Column 38,
Line 26, delete "(1)" and insert -- (T) -- therefor;

Column 40,
Line 4, delete "($V_{rl'}$)" and insert -- ($V_{rl'}$) -- therefor.

Signed and Sealed this

Seventeenth Day of February, 2004

JON W. DUDAS
*Acting Director of the United States Patent and Trademark Office*